(12) United States Patent
Chang et al.

(10) Patent No.: US 10,312,976 B2
(45) Date of Patent: Jun. 4, 2019

(54) METHOD AND APPARATUS FOR OPTIMIZING CONFIGURATIONS FOR TRANSCEIVING UP TO TEN DATA STREAMS VIA FOUR ANTENNAS

(71) Applicant: Dell Products, LP, Round Rock, TX (US)

(72) Inventors: Ching Wei Chang, Cedar Park, TX (US); Suresh K. Ramasamy, Austin, TX (US); Youngsoo Cho, Cedar Park, TX (US); Ricardo R. Velasco, Cumming, GA (US)

(73) Assignee: Dell Products, LP, Round Rock, TX (US)

( * ) Notice: Subject to any disclaimer, the term of this patent is extended or adjusted under 35 U.S.C. 154(b) by 22 days.

(21) Appl. No.: 15/803,413

(22) Filed: Nov. 3, 2017

(65) Prior Publication Data

US 2019/0140706 A1 May 9, 2019

(51) Int. Cl.
*H04B 7/0413* (2017.01)
*H04W 24/02* (2009.01)
*H04W 88/10* (2009.01)

(52) U.S. Cl.
CPC .......... *H04B 7/0413* (2013.01); *H04W 24/02* (2013.01); *H04W 88/10* (2013.01)

(58) Field of Classification Search
CPC .................................................. H04B 7/0413
USPC ....................................................... 370/328
See application file for complete search history.

(56) References Cited

U.S. PATENT DOCUMENTS

| | | | |
|---|---|---|---|
| 7,605,763 | B2 | 10/2009 | Finn |
| 8,139,670 | B1 | 3/2012 | Son |
| 8,923,208 | B2 | 12/2014 | Dayal |
| 2007/0009262 | A1 | 1/2007 | Perkins |
| 2012/0329395 | A1 | 12/2012 | Husted |
| 2015/0036656 | A1 | 2/2015 | McCarthy |

OTHER PUBLICATIONS

Yi Yu, "Physical Layer Model Design for Wireless Networks," Dissertation, Aug. 2006, Texas A&M Southeast University, 145 pages.

*Primary Examiner* — Joel Ajayi
(74) *Attorney, Agent, or Firm* — Prol Intellectual Property Law, PLLC; H. Kenneth Prol

(57) ABSTRACT

A mobile information handling system executing code instructions of a dynamic antenna co-existence control system may comprise a plurality of transceiving antennas mounted in a small form factor case for the mobile information handling system, a plurality of cellular and Wi-Fi communications modules transceiving signals according to a plurality of data streams, an adaptive massive MIMO multiplexer coupling the communications modules to the four transceiving antennas, a memory storing a data stream multiplexing configuration table, and a processor. The processor may execute code instructions of the dynamic antenna coexistence control system to receive trigger inputs describing an operational condition of the mobile information handling system, identify one or more of the plurality of configurations of the plurality of data streams as an optimal configuration for enhancing throughput based on the trigger inputs, and instruct the adaptive massive MIMO multiplexer to operate according to the optimal configuration.

20 Claims, 13 Drawing Sheets

MULTIPLEXER CONFIGURATION SCHEME TABLE 302

| | | Radio Operation | | Antenna Elements | | | | Multiplexer 1 Sate | Multiplexer 2 Sate |
|---|---|---|---|---|---|---|---|---|---|
| | Wireless Modes | Cellular Band Combination | | 1 | 2 | 3 | 4 | | |
| Standalone | Cellular 2x2 MIMO | 1CA | 690M - 6GHz | LTE | LTE | off | off | N/A | N/A |
| | | 2CA | LB+MB+HB +UHB+LTE U | LTE | LTE | off | off | N/A | N/A |
| | | 3CA | 690M - 6GHz | LTE | LTE | off | off | N/A | N/A |
| | | 4CA | 690M - 6GHz | LTE | LTE | off | off | N/A | N/A |
| | | 5CA | 690M - 6GHz | LTE | LTE | off | off | N/A | N/A |
| | Cellular 4x4 MIMO | 1 Carrier | 1.4G - 6GHz | LTE | LTE | LTE | LTE | 1 | 1 |
| | | 2 Carriers | MB+HB +UHB+LTE U | LTE | LTE | LTE | LTE | 1 | 1 |
| | | 3 Carriers | 1.4G - 6GHz | LTE | LTE | LTE | LTE | 1 | 1 |
| | WiFi 2x2 | | | off | off | WiFi 2.4/5G | WiFi 2.4/5G+BT | 2 | 2 |
| Concurrent | Cellular 2x2 & WiFi 2x2 | 1CA | 690M - 6GHz | LTE | LTE | WiFi 2.4/5G | WiFi 2.4/5G+BT | 2 | 2 |
| | | 2CA | LB+MB+HB +UHB+LTE U | LTE | LTE | WiFi 2.4/5G | WiFi 2.4/5G+BT | 2 | 2 |
| | | 3CA | 690M - 6GHz | LTE | LTE | WiFi 2.4/5G | WiFi 2.4/5G+BT | 2 | 2 |
| | | 4CA | 690M - 6GHz | LTE | LTE | WiFi 2.4/5G | WiFi 2.4/5G+BT | 2 | 2 |
| | | 5CA | 690M - 6GHz | LTE | LTE | WiFi 2.4/5G | WiFi 2.4/5G+BT | 2 | 2 |
| | Cellular 4x4 & WiFi 2x2 | 1 Carrier | 1.4G - 6GHz | LTE | LTE | LTE+ WiFi 2.4/5G | LTE+ WiFi 2.4/5G+BT | 3 | 3 |
| | | 2 Carriers | MB+HB +UHB+LTE U | LTE | LTE | LTE+ WiFi 2.4/5G | LTE+ WiFi 2.4/5G+BT | 3 | 3 |
| | | 3 Carriers | 1.4G - 6GHz | LTE | LTE | LTE+ WiFi 2.4/5G | LTE+ WiFi 2.4/5G+BT | 3 | 3 |

| 304 COLUMN 1 | 306 COLUMN 2 | 308 COLUMN 3 | 310 COLUMN 4 | 312 COLUMN 4 | 314 COLUMN 5 | 326 COLUMN 6 |

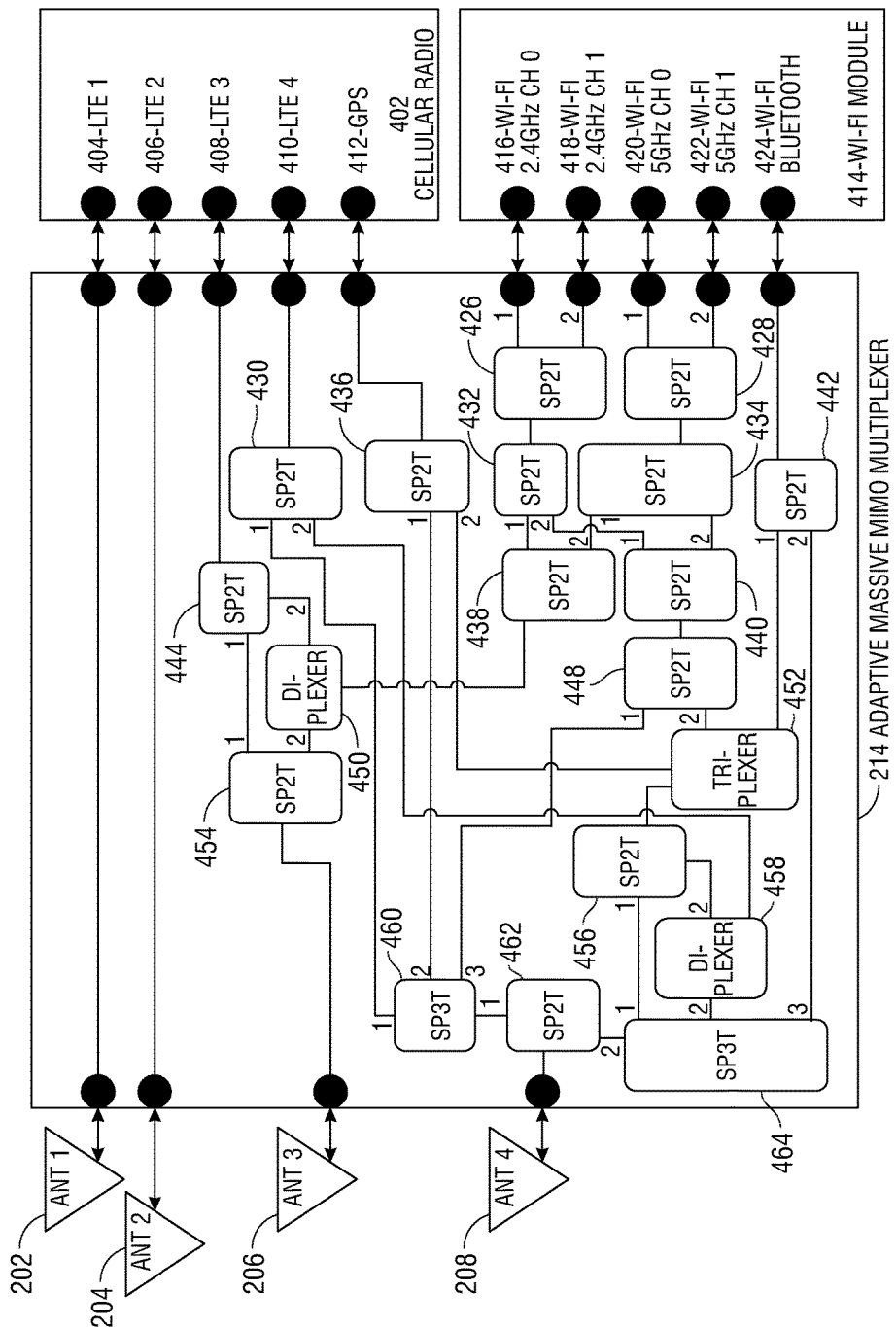

STANDALONE MODE DATA STREAM CONFIGURATION SCHEME TABLE 502

| Multiple Radio (7 or 10 Multiple Inputs) | | | | 4 Multiple Inputs | | | |
|---|---|---|---|---|---|---|---|
| Wireless Modes | | | Band Combination | 1 | 2 | 3 | 4 |
| Cellular 2x2 MIMO | 1CA | | All LTE Bands 700M - 6GHz | LTE | LTE | off | off |
| | 2CA | | All LTE Bands 700M - 6GHz | LTE | LTE | off | off |
| | 3CA | | All LTE Bands 700M - 6GHz | LTE | LTE | off | off |
| | 4CA | | All LTE Bands 700M - 6GHz | LTE | LTE | off | off |
| | 5CA | | All LTE Bands 700M - 6GHz | LTE | LTE | off | off |
| Cellular 4x4 MIMO | 1 Carrier | LB | 700 - 960 | LB | LB | LB | LB |
| | | 1.5GHz | 1476 - 1559 | 1.5G | 1.5G | 1.5G | 1.5G |
| | | MB | 1710 - 2200 | M | M | M | M |
| | | HB | 2305 - 2690 | H | H | H | H |
| | | UHB (3.5GHz) | 3400 - 3800 | UHB | UHB | UHB | UHB |
| | | LTE-U/LAA(DL) | 5150 - 5925 | LTE U/LAA | LTE U/LAA | LTE U/LAA | LTE U/LAA |
| | 2 Carriers | Mid+Mid | | M+M | M+M | M+M | M+M |
| | | Mid+High | | M+H | M+H | M+H | M+H |
| | | High+High | | H+H | H+H | H+H | H+H |
| | | Low+Mid | | L+M | L+M | M | M |
| | | Low+High | | L+H | L+H | H | H |
| WiFi 2x2 MIMO | | | | off | off | WiFi 2.4/5G | WiFi 2.4/5G |
| Bluetooth 1x1 | | | | off | off | off | Bluetooth |
| GPS 1x1 | | | | off | off | off | GPS |

504 COLUMN 1 — 506 COLUMN 2 — 508 COLUMN 3 — 510 COLUMN 4 — 512 COLUMN 5 — 514 COLUMN 6

CONCURRENT MODE DATA STREAM CONFIGURATION SCHEME TABLE 602

| Multiple Radio (7 or 10 Multiple Inputs) | | | | | 4 Multiple Inputs | |
|---|---|---|---|---|---|---|
| Cellular 2x2 & WiFi 2x2 BT 1x1 & GPS | 1CA | All LTE Bands | 700M - 6GHz | LTE | WiFi 2.4/5G | WiFi 2.4/5G+BT+GPS |
| | 2CA | All LTE Bands | 700M - 6GHz | LTE | WiFi 2.4/5G | WiFi 2.4/5G+BT+GPS |
| | 3CA | All LTE Bands | 700M - 6GHz | LTE | WiFi 2.4/5G | WiFi 2.4/5G+BT+GPS |
| | 4CA | All LTE Bands | 700M - 6GHz | LTE | WiFi 2.4/5G | WiFi 2.4/5G+BT+GPS |
| | 5CA | All LTE Bands | 700M - 6GHz | LTE | WiFi 2.4/5G | WiFi 2.4/5G+BT+GPS |
| Cellular 3x3 & WiFi 2x2 BT 1x1 & GPS | 1 Carrier | HB | 2305-2690M | H | H+ WiFi 5G | WiFi 2.4/5G+BT+GPS |
| | | LTE-U/LAA | 5150-5925M | LTE U | LTE U+ WiFi 2.4G | WiFi 2.4/5G+BT+GPS |
| Cellular 4x4 & WiFi 2x2 BT 1x1 & GPS | 1 Carrier 2 Carriers | LB | 700-960M | LB | LB+ WiFi 5G/2.4G | LB+ WiFi 2.4/5G+BT+GPS |
| | | 1.5GHz | 1476-1559M | 1.5G | 1.5G+ WiFi 5G/2.4G | 1.5G+ WiFi 2.4/5G+BT+GPS |
| | | MB | 1710-2200M | M | M+ WiFi 5G/2.4G | M+ WiFi 2.4/5G+BT+GPS |
| | | HB | 2305-2690M | H | H+ WiFi 5G | H+ WiFi 5G+BT+GPS |
| | | UHB (3.5GHz) | 3400-3800M | UHB | UHB+ WiFi 5G/2.4G | UHB+ WiFi 2.4/5G+BT+GPS |
| | | LTE-U/LAA(DL) | 5150-5925M | LTE U/LAA | LTE U/LAA+ WiFi 2.4G | LTE U/LAA+ WiFi 2.4+BT+GPS |

COLUMN 1 (604) | COLUMN 2 (606) | COLUMN 3 (608) | COLUMN 4 (610) | COLUMN 5 (612) | COLUMN 6 (614)

FIG. 6

702 MULTIPLEXER STATE TABLE

| Multiplexer Elements | Antenna 3 Signal(s) Transceived | | | | | | | | |
|---|---|---|---|---|---|---|---|---|---|
| | LTE 3 | Wi-Fi 2.4GHz Channel 0 | Wi-Fi 2.4GHz Channel 1 | Wi-Fi 5GHz Channel 0 | Wi-Fi 5GHz Channel 1 | LTE+Wi-Fi 2.4GHz Channel 0 | LTE+Wi-Fi 2.4GHz Channel 1 | LTE+Wi-Fi 5GHz Channel 0 | LTE+Wi-Fi 5GHz Channel 1 |
| 426 | | 1 | 2 | | | 1 | 2 | | |
| 428 | | | 1 | 1 | 2 | | 1 | 2 | |
| 432 | | 1 | | 1 | 1 | 1 | 1 | 1 | 1 |
| 434 | | 1 | 1 | 2 | 2 | 1 | 1 | 1 | 1 |
| 438 | | 1 | 1 | 1 | 1 | 2 | 2 | 2 | 2 |
| 444 | 1 | | | | | | | | |
| 454 | 1 | 2 | 2 | 2 | 2 | 2 | 2 | 2 | 2 |

802 MULTIPLEXER STATE TABLE

| | | | | | | | | Antenna 4 Signal(s) Transceived | | | | | | | |
|---|---|---|---|---|---|---|---|---|---|---|---|---|---|---|---|
| Multi-plexer Elements | LTE 4 | Wi-Fi 2.4GHz Channel 0 | Wi-Fi 2.4GHz Channel 1 | Wi-Fi 5GHz Channel 0 | Wi-Fi 5GHz Channel 1 | GPS | Blue-tooth (BT) | Wi-Fi 2.4GHz Channel 0 +BT+GPS | Wi-Fi 2.4GHz Channel 1 +BT+GPS | Wi-Fi 5GHz Channel 0 +BT+GPS | Wi-Fi 5GHz Channel 1 +BT+GPS | LTE+Wi-Fi 2.4GHz Channel 0 +BT+GPS | LTE+Wi-Fi 2.4GHz Channel 1 +BT+GPS | LTE+Wi-Fi 5GHz Channel 0 +BT+GPS | LTE+Wi-Fi 5GHz Channel 1 +BT+GPS |
| 426 | | 1 | | | | | | 1 | | | | 1 | | | |
| 428 | | | 2 | 1 | 2 | | | | 2 | 1 | 2 | | 1 | 2 | 2 |
| 430 | 1 | | | | | | | | | | | | | | |
| 432 | | 2 | 2 | 2 | 2 | | | 2 | 2 | 2 | 2 | 2 | 2 | 2 | 2 |
| 434 | | 2 | 2 | 2 | 2 | | | 2 | 2 | 2 | 2 | | | | |
| 436 | | 1 | | 2 | | 1 | | 2 | 1 | 2 | 2 | 1 | | | |
| 440 | | 1 | 1 | 2 | 1 | | | 1 | 2 | 1 | 1 | 1 | 1 | 1 | 1 |
| 442 | | | | | | | 2 | | | | | | | | |
| 448 | | 1 | 1 | 1 | 1 | | | 2 | 2 | 2 | 2 | 2 | 2 | 2 | 2 |
| 456 | | 3 | 3 | 3 | 3 | | | | | | | | | | |
| 460 | 1 | 1 | 1 | 3 | 1 | 2 | 2 | 1 | 1 | 1 | 1 | 2 | 2 | 2 | 2 |
| 462 | 1 | | | | | | | | | | | | | | |
| 464 | | | | | | | 3 | | | | | | | | |

← Multiplexer Switch Element Mode 804  806  808  810  812  814  816  818  820  822  824  826  828  830  832

FIG. 8

METHOD AND APPARATUS FOR OPTIMIZING CONFIGURATIONS FOR TRANSCEIVING UP TO TEN DATA STREAMS VIA FOUR ANTENNAS

FIELD OF THE DISCLOSURE

The present disclosure generally relates to transceiving cellular and Wi-Fi data streams simultaneously via four antennas in a mobile information handling system. The present disclosure more specifically relates to optimizing the configuration of the data streams transceived based on received trigger inputs indicating operational and/or environmental conditions of the mobile information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, Wi-Fi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a multiplexer configuration scheme table according to an embodiment of the present disclosure;

FIG. 4 is a block diagram illustrating an adaptive massive MIMO multiplexer according to an embodiment of the present disclosure;

FIG. 5 is a graphical diagram illustrating a standalone mode data stream configuration scheme table according to an embodiment of the present disclosure;

FIG. 6 is a graphical diagram illustrating a concurrent mode data stream configuration scheme table according to an embodiment of the present disclosure;

FIG. 7 is a graphical illustration of a multiplexer state table according to an embodiment of the present disclosure;

FIG. 8 is a graphical illustration of a multiplexer state table according to an embodiment of the present disclosure;

The use of the same reference symbols in different drawings may indicate similar or identical items.

DETAILED DESCRIPTION OF THE DRAWINGS

Figure 1:
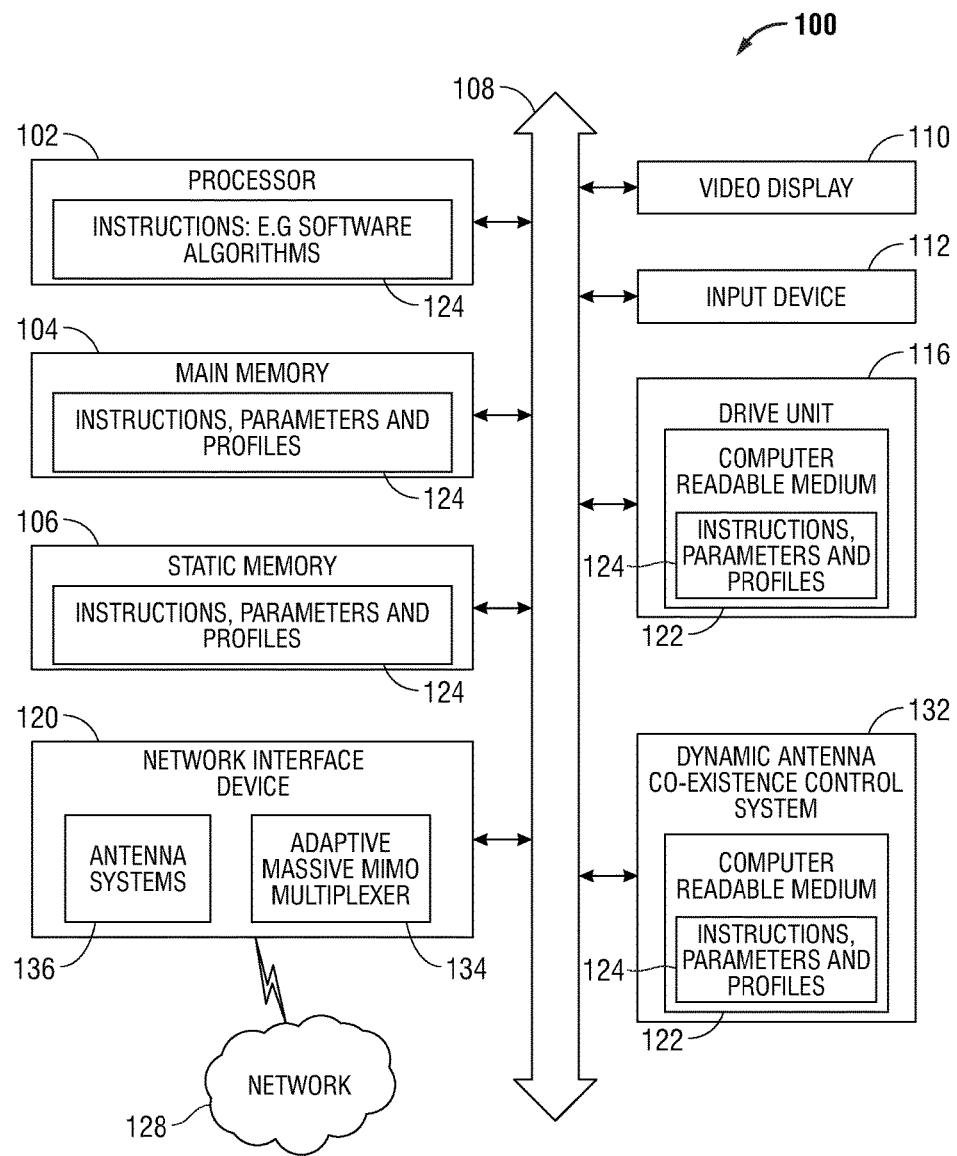
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. While the simplest solution to this need may involve addition of multiple transceiving antennas within the mobile information handling system, with each antenna dedicated to a single type of signal, this solution conflicts with a competing need to keep the mobile information handling system slim and lightweight, and also presents a host of potential problems associated with interference between each of the antennas, and of increased exposure of the user to potentially harmful electrical signals. For example, the advanced LTE standard support 4×4 (four antennas simultaneously transceiving) multiple input/multiple output (MIMO) signals dedicated solely to cellular signals. In mobile information handling systems incorporating four antennas, supporting the 4×4 MIMO abilities of the advanced LTE standard would require dedication of all of the four antennas solely to cellular signals, disallowing simultaneous transceiving of Wi-Fi, Bluetooth, and GPS signals, or addition of transceiving antennas to the mobile information handling system, increasing the bulkiness of the device, and presenting several concerns relating to interference and increased absorption rates by the user. A solution is needed to allow for simultaneous transceiving of four MIMO cellular signals, two or more Wi-Fi signals, a Bluetooth signal, and/or a GPS signal, without increasing the number of antennas incorporated within the mobile information handling system, while taking into account operating conditions and environmental conditions of the mobile information handling system, such as potential interference between the antennas, power management issues, specific absorption rate of the user, cellular conditions, Wi-Fi conditions, Bluetooth conditions, application requirements, and conditions relating to the location of the mobile information handling system.

Embodiments of the present disclosure address this issue by providing a dynamic antenna co-existence control system directing operation of an adaptive massive MIMO multiplexer to simultaneously transceive more than four signals from only four antennas within a mobile information handling system. The adaptive massive MIMO multiplexer in embodiments of the present disclosure may couple signals incoming from more than four radio module nodes to four antennas through a plurality of multiplexers, and/or di-pole switches. Each of the multiplexers and/or di-pole switches in embodiments may operate in one of several available modes, such that several multiplexer configurations are possible. Each multiplexer configuration may direct a signal to or from a radio module node to a different antenna, and/or combine that signal with another signal from one or more other radio module nodes. For example, a first multiplexer configuration may direct each of four LTE signals from a cellular radio module to one of the four antennas, while a second multiplexer configuration may direct signals from two of the LTE signals to two of the four antennas, and may direct the third and fourth antennas, respectively to each transmit and receive a combination of one of the remaining two LTE signals, one of two Wi-Fi signals, a Bluetooth signal, and/or a GPS signal.

One or more multiplexer configuration scheme tables in embodiments of the present disclosure may include a description of the signals transceived by each of the four antennas caused by each of the possible multiplexer combinations the adaptive massive MIMO multiplexer is capable of achieving. A first multiplexer configuration scheme table in embodiments of the present disclosure may describe the transceiving of signals according to a standalone mode, in which each of the four antennas of the mobile information handling system do not simultaneously transceive differing signals. In other words, in standalone mode, in order to transceive 4×4 MIMO LTE signals, 2×2 MIMO Wi-Fi signals, 1×1 Bluetooth signal, and a 1×1 GPS signal, each of the four antennas may need to toggle between multiple signals, thus transceiving one type of signal at a time. A second multiplexer configuration scheme table in embodiments of the present disclosure may describe the transceiving of signals according to a concurrent mode, in which one or more of the four antennas of the mobile information handling system may combine and simultaneously transceive a plurality of signal types. For example, one of the plurality of multiplexer combinations associated with the concurrent mode may direct signals from two of the LTE signals to two of the four antennas, and may direct the third and fourth antennas, respectively, to each transceive a combination of one of the remaining two LTE signals, one of two Wi-Fi signals, a Bluetooth signal, and/or a GPS signal. The choice of which signals to transmit from which antennas, and thus the choice of the multiplexer combination schemes to employ optimally in embodiments of the present disclosure may depend upon one or more operating conditions of the mobile information handling system, and/or analysis of the environment in which the mobile information handling system is operating.

The dynamic antenna co-existence control system in embodiments of the present disclosure may be coupled to one or more sensors capable of determining the operating conditions of the mobile information handling system, and/or analyzing the environment in which the mobile information handling system is operating. For example, sensors in embodiments of the present disclosure may include sensors capable of determining power management conditions, cellular radio module conditions, Wi-Fi radio conditions, Bluetooth radio conditions, application conditions, and/or conditions related to the location of the mobile information handling system. Each of these conditions may be associated with one or more trigger inputs that may be transmitted from one or more of the plurality of sensors to the dynamic antenna co-existence control system. Trigger inputs potentially prompt determination that a change in the multiplexer configuration scheme employed by the adaptive massive MIMO multiplexer is needed in order to account for current operating conditions and/or environmental conditions of the mobile information handling system. For example, a trigger input received by the dynamic antenna co-existence control system indicating the remaining power of the mobile information handling system is low may result in a determination that the adaptive massive MIMO multiplexer should switch from a concurrent mode that requires greater power consumption to a standalone mode, in order to conserve power. This is only one possible example of a trigger input indicating a change in the multiplexer configuration may be needed, and the dynamic antenna co-existence control system may be capable of determining an optimal multiplexer configuration scheme for several different combinations of received trigger inputs in embodiments of the present disclosure.

The dynamic antenna co-existence control system in embodiments of the present disclosure may also be coupled to the adaptive massive MIMO multiplexer such that the dynamic antenna co-existence control system directs the state in which each of the multiplexers or di-pole switches within the adaptive massive MIMO multiplexer operates. By directing the state in which each of the multiplexers or di-pole switches operates, the dynamic antenna co-existence control system in embodiments of the present disclosure may dictate the multiplexer configuration of the adaptive massive MIMO multiplexer at any given time, depending on the determination of the optimal configuration based on the operating conditions and/or environmental conditions of the mobile information handling system. In such a way, embodiments of the present disclosure provide a solution that allows for simultaneous transceiving of four MIMO cellular signals, two or more Wi-Fi signals, a Bluetooth signal, and/or a GPS signal, without increasing the number of antennas incorporated within the mobile information handling system, while taking into account operating conditions and environmental conditions of the mobile information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the dynamic antenna co-existence control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile, semi-mobile, and/or stationary information handling system. The information handling system 100 can also include a disk drive unit 116.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include an adaptive massive MIMO Multiplexer 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The adaptive massive MIMO multiplexer 134 may include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute a dynamic antenna co-existence control system, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the dynamic antenna co-existence control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including one or more multiplexer configuration scheme tables and/or one or more data stream configuration scheme tables. The disk drive unit 116 and static memory 106 also contain space for data storage. Further, the instructions 124 may embody one or more of the methods or logic as described herein. For example, instructions relating to the dynamic antenna co-existence control system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the dynamic antenna co-existence control system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The dynamic antenna co-existence control system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a dynamic antenna co-existence control system 132 that may be operably connected to the bus 108. The dynamic antenna co-existence control system 132 computer readable medium 122 may also contain space for data storage. The dynamic antenna co-existence control system 132 may perform tasks related to receiving trigger inputs indicating operating or environmental conditions of the information handling system, determining an optimal data stream configuration for transceiving via the antenna system 136 based on the received trigger inputs, and directing the adaptive massive MIMO multiplexer 134 to operate according to the identified optimal data stream configuration. The memory 104 may store one or more data stream configuration tables and/or multiplexer/switch element configuration tables.

In an embodiment, the dynamic antenna co-existence control system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BF SK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
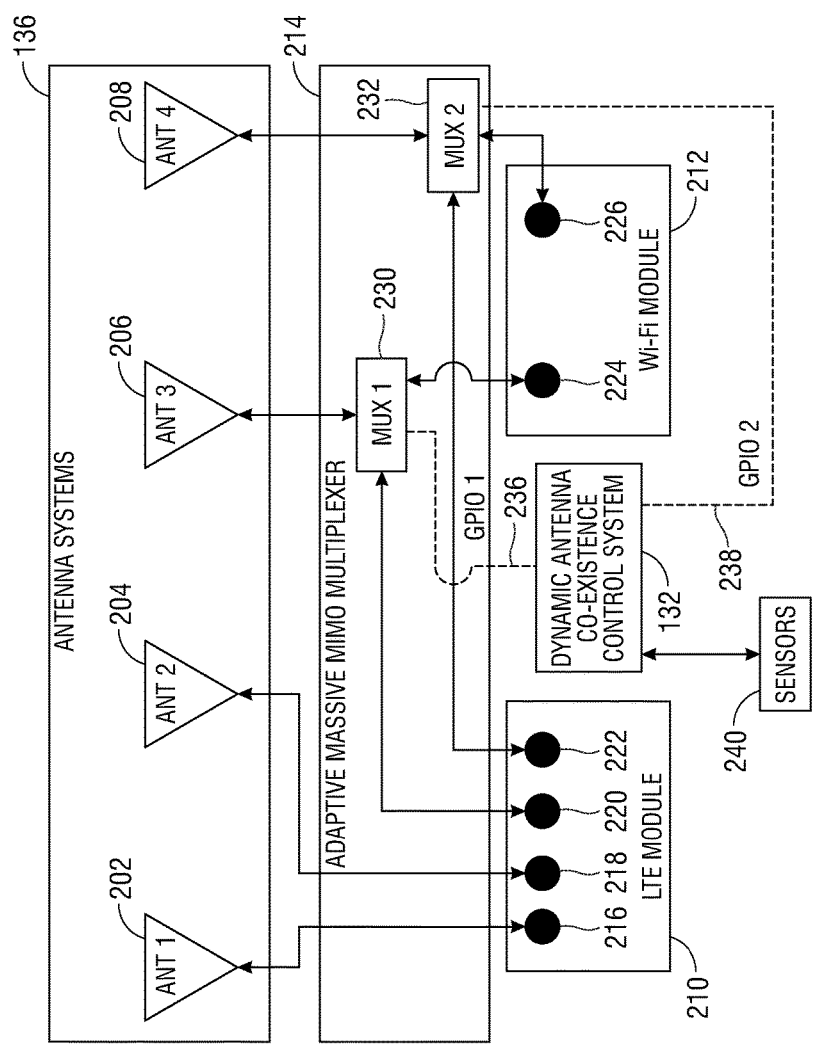
FIG. 2 is a block diagram illustrating a dynamic antenna co-existence control system according to an embodiment of the present disclosure.

FIG. 2 is a block diagram illustrating a dynamic antenna co-existence control system directing the flow of signals from an LTE module and a Wi-Fi module to four separate antennas according to an embodiment of the present disclosure. As shown in FIG. 2, an adaptive massive MIMO multiplexer in an embodiment may couple signals incoming from more than four radio module nodes to four antennas through a plurality of multiplexers. For example, the adaptive massive MIMO multiplexer 214 in an embodiment may direct the flow of signals transceived from a first antenna (ANT 1) 202, a second antenna (ANT 2) 204, a third antenna (ANT 3) 206 and a fourth antenna (ANT 4) 208 within the antenna systems 136, to and from LTE Module 210, and Wi-Fi Module 212. The adaptive massive MIMO multiplexer 214 may direct signals to and/or from a first node 216, a second node 218, a third node 220, and a fourth node 222 of the LTE module 210. Each of the first 216, second 218, third 220, and fourth 222 nodes of the LTE module 210 may transmit different cellular streams. Each cellular stream may vary, for example, based on the frequency or band at which it is transceived, the number of carriers, and/or the modulation scheme used. The adaptive massive MIMO multiplexer 214 in an embodiment may further direct streams to and/or from a first node 224, and a second node 226 of the Wi-Fi module 212. Each of the first 224 and second 226 nodes of the Wi-Fi module 212 may transceive Wi-Fi streams according to different types of Wi-Fi networks (e.g. WPAN, WLAN, WWAN), two different frequencies (e.g. 2.4 GHz, and 5 GHz), and/or two different channels (e.g. channel 0 and channel 1). Further, the second node 226 of Wi-Fi module 212 may transceive a Wi-Fi signal and/or a Bluetooth signal. Other embodiments contemplate additional nodes of the Wi-Fi module 212 dedicated to any additional frequencies available according to future IEEE 802 specifications.

The adaptive massive MIMO multiplexer 214 in an embodiment may further include a plurality of multiplexers used to direct streams from the LTE module 210 and Wi-Fi module 212 to each of the four antennas 202-208 according to one of a plurality of different paths. The adaptive massive MIMO multiplexer 214 may alter the paths of streams between the LTE module 210, Wi-Fi module 212, and antennas 202-208 through the use of a plurality of multiplexers, such as, for example, a first multiplexer (MUX 1) 230, and a second multiplexer (MUX 2) 232. Each of the multiplexers MUX 1 230 and MUX 2 232 may further include combinations of one or more diplexers, triplexers, quadplexers, or any other kind of multiplexer devices, and/or one or more pole switches, including, but not limited to dipole switches, and tripole switches, as described in greater detail below with reference to FIG. 4.

MUX 1 230 in an embodiment may operate in a stand-alone mode to switch between a first state coupling the third node 220 of the LTE module 210 with the third antenna 206 causing antenna 3 206 to transceive an LTE data stream, and a second state coupling the first node 224 of the Wi-Fi module 212 to antenna 3 206, causing antenna 3 206 to transceive either an LTE data stream, or a Wi-Fi stream. Alternatively, MUX 1 230 in an embodiment may operate in a third state, or concurrent mode to multiplex outgoing signals to a single signal, or demultiplexing incoming signals into multiple signals, causing antenna 3 206 to simultaneously transceive both an LTE data stream associated with the third node 220 of the LTE module 210, and a Wi-Fi data stream associated with the first node 224 of the Wi-F module 212.

MUX 2 232 in an embodiment may operate in a stand-alone mode to switch between a first state coupling the fourth node 222 of the LTE module 210 to antenna 4 208, causing antenna 4 to transceive an LTE data stream, and a second state coupling the second node 226 of the Wi-Fi module 212, causing antenna 4 208 to transceive a Wi-Fi stream, or a combination Wi-Fi and Bluetooth data stream. Alternatively, MUX 2 232 in an embodiment may operate in a third state, or concurrent mode to multiplex outgoing signals to a single signal, or demultiplex incoming signals into multiple signals, causing antenna 4 to simultaneously transceive both an LTE data stream associated with the fourth node 222 of the LTE module 210 and a Wi-Fi stream or combination Wi-Fi/Bluetooth data stream associated with the second node 226 of the Wi-Fi Module 212.

The dynamic antenna co-existence control system 132 may be operably connected to each of MUX 1 230, and MUX 2 232, and may operate to determine the state in which each of the multiplexers operates. For example, the dynamic antenna co-existence control system 132 in an embodiment may direct MUX 1 230 via GPIO 2 236 to operate in either its first, second, or third state, and may direct MUX 2 232 via GPIO 3 238 depending upon the optimal configuration of data streams given current operational or environmental conditions of the mobile information handling system. As described in greater detail below with reference to FIG. 4, each of MUX 1 230 and MUX 2 232 may further include a combination of multiplexers and switches, each of which may be capable of operating in a plurality of states. The dynamic antenna co-existence control system 132 in an embodiment may be operably connected to each of these multiplexer/switch devices by a GPIO line, and may be capable of controlling the state in which each of these multiplexer/switch devices operate via one of these GPIO lines.

The dynamic antenna co-existence control system 132 in an embodiment may further receive trigger inputs from sensors 240. Sensors 240 in an embodiment may include one or more devices that gather data to describe current operational or environmental conditions of the mobile information handling system. For example, sensors 240 may include sensors that detect operating conditions including but not limited to power management trigger inputs, cellular trigger inputs, Wi-Fi trigger inputs, Bluetooth trigger inputs, application trigger inputs, and other sensor inputs. Power management trigger inputs in an embodiment may include but not be limited to, for example, the transmitting power for each of the antennas 1-4 202-208 in the antenna systems 136, amount of battery power remaining, whether the mobile information handling system is currently plugged in and drawing power, whether the mobile information handling system is currently set to a high power mode (set to optimize throughput of data streams at the expense of remaining battery power), or a low power mode (set to optimize remaining battery power at the expense of throughput), and analytical information relating past power consumption to past transceiving configurations and usage.

Cellular, Wi-Fi, and Bluetooth trigger inputs in an embodiment may include but not be limited to, for example, performance values for each of the data streams currently transceiving (e.g. interference, traffic, error rate, throughput), whether a nearby Bluetooth enabled pairing device has been detected, each of the bandwidths at which nearby cellular base stations are capable of transmitting, the number of carriers nearby cellular base stations may process, which channels nearby Wi-Fi access points may process, the frequencies nearby Wi-Fi access points may process, whether nearby Wi-Fi access points or cellular base stations are transmitting over-the-air messages, and the modulation schemes employed by nearby Wi-Fi access points and cellular base stations. Application trigger inputs in an embodiment may include but not be limited to, for example, determination that currently running applications are streaming data, requiring higher throughput values. Other sensor trigger inputs in an embodiment may include but not be limited to, for example, environmental condition information, such as determination that the mobile information handling system is operating indoors, outdoors, in an urban environment, in a suburban environment, in a rural environment, is currently travelling at a speed indicating driving or flying, at a preset location having known cellular or Wi-Fi properties, or detection of a human body part nearby a currently transceiving antenna.

Because each of MUX 1 230, and MUX 2 232 may operate in one of a plurality of available states, several multiplexer configurations are possible. For example, as described above, each of the multiplexers MUX 1 230 and MUX 2 232 may operate according to three separate states. As described in greater detail below, the signals transceived by each of the four antennas corresponding to each of these possible multiplexer configurations may be stored in a multiplexer configuration scheme table in an embodiment, which may be accessible by the dynamic antenna co-existence control system 132. In an embodiment, the dynamic antenna co-existence control system may reference the multiplexer configuration scheme table to determine the optimal multiplexer configuration scheme based on operating or environmental conditions indicated by trigger inputs received by the dynamic antenna co-existence control system from the one or more sensors 240.

FIG. 3 is a graphical diagram illustrating a multiplexer configuration scheme table associated with an adaptive massive MIMO multiplexer receiving six inputs, according to an embodiment of the present disclosure. As described above, one or more multiplexer configuration scheme tables in embodiments of the present disclosure may include a description of the types of signals transceived by each of the four transceiving antennas caused by each of the possible multiplexer combinations the adaptive massive MIMO multiplexer is capable of achieving. For example, the multiplexer configuration scheme table 302 shown in FIG. 3 includes a description of each of the signals being transceived by each of four antennas coupled to the multiplexers within the adaptive massive MIMO multiplexer described above with respect to FIG. 2.

The multiplexer configuration scheme table describes the signals transceived by each of the four antennas operating in multiple standalone modes, and multiple concurrent modes. For example, as shown in FIG. 3, column 1 304 describes three separate standalone modes, including cellular 2×2 MIMO, cellular 4×4 MIMO, and Wi-Fi 2×2, as well as two separate concurrent modes, including cellular 2×3 and Wi-Fi 2×2 and cellular 4×4 and Wi-Fi 2×2. As another example, column 2 306 describes the cellular band combinations achievable in every wireless mode, including the number of carriers and the frequency bands in which each antenna transceiving cellular may transceive. As another example, column 3 308 describes the signals transceived by antenna 1 in each wireless mode, column 4 310 describes the signals transceived by antenna 2 in each wireless mode, column 5 312 describes the signals transceived by antenna 3 in each wireless mode, and column 6 314 describes the signals transceived by antenna 4 in each wireless mode.

As shown in FIG. 3, the multiplexer configuration scheme table 302 in an embodiment may describe the signals transceived by each of the four antennas in three different variations or sub-modes of a standalone mode, including a standalone 2×2 cellular MIMO sub-mode, a standalone 4×4 cellular MIMO sub-mode, and a standalone Wi-Fi 2×2 sub-mode. For example, the group of rows 316 in an embodiment may describe the signals transceived by each antenna and multiplexer configurations for standalone cellular 2×2 MIMO mode, the group of rows 318 in an embodiment may describe the signals transceived by each antenna and multiplexer configurations for standalone cellular 4×4 MIMO mode, and the group of rows 320 in an embodiment may describe the signals transceived by each antenna and multiplexer configurations for standalone Wi-Fi 2×2 MIMO mode.

As also shown in FIG. 3 in group of rows 316, in a standalone cellular 2×2 MIMO sub-mode, antennas 1 and 2 may transceive cellular signals (LTE or other known standards, including but not limited to GSM, 2G, 3G, 4G, 5G, and LTE Advanced), while antennas 3 and 4 do not transceive signals. In other words, in the standalone cellular 2×2 MIMO sub-mode described in the group of rows 316, only two of the antennas are in operation simultaneously. As shown in 316, when operating in the standalone cellular 2×2 MIMO sub-mode, antennas 1 and 2 in an embodiment may each transceive a cellular signal of differing frequencies (so long as both frequencies are between 690 MHz and 6 GHz), differing bands, including but not limited to low-band (LB), medium band (MB), high band (HB), ultra-high band (UHB) and LTE unlicensed spectrum (LTE-U), and different carriers (between 1 and 5).

Operating in a standalone cellular 4×4 MIMO sub-mode, as shown in group of rows 318 in FIG. 3, antennas 1 through 4 may each transceive cellular signals (LTE or other known standards, including but not limited to GSM, 2G, 3G, 4G, 5G, and LTE Advanced). Thus, the standalone cellular 4×4 MIMO sub-mode may more efficiently utilize available antenna resources in an embodiment than the 2×2 MIMO mode in which two of the antennas are left dormant. As shown in 318 of FIG. 3, when operating in the standalone cellular 4×4 MIMO sub-mode, antennas 1 through 4 may each transceive a cellular signal of differing frequencies (so long as both frequencies are between 690 MHz and 6 GHz), differing bands, including low-band (LB), medium band (MB), high band (HB), ultra-high band (UHB) and LTE unlicensed spectrum (LTE-U), and different carriers (between 1 and 5).

Operating in a standalone Wi-Fi 2×2 sub-mode in an embodiment, as shown in row 320 of FIG. 3, antennas 3 and 4 may each transceive a Wi-Fi signal (WLAN, WWAN, unlicensed WLAN, unlicensed WWAN, Wi-MAX or any other Wi-Fi signal, frequency, band, or channel known and in use), while antennas 1 and 2 do not transceive any signals. As shown in FIG. 3 at row 320, each of antennas 3 and 4 operating in standalone Wi-Fi 2×2 sub-mode may transmit Wi-Fi signals according to differing bandwidths (e.g. 2.4 GHz, and 5 GHz), and/or antenna 4 may transmit (either alone or in combination with a Wi-Fi signal) an additional Bluetooth signal. Because the antennas operating in standalone mode in an embodiment may operate according to only one of the three available sub-modes at a time, antennas 1 through 4 may toggle between each of the three sub-modes over time. Thus, when operating in standalone mode, the four antennas in an embodiment may not simultaneously transmit a Wi-Fi signal and a cellular signal.

The multiplexer configuration scheme table 302 in an embodiment may also describe the signals transceived by the antennas operating in a concurrent mode, in which the antennas simultaneously transceive both cellular and Wi-Fi signals. For example, the group of rows 322 in an embodiment may describe the signals transceived by each antenna and multiplexer configurations for concurrent cellular 2×2 and Wi-Fi 2×2 mode, and the group of rows 324 in an embodiment may describe the signals transceived by each antenna and multiplexer configurations for concurrent cellular 4×4 and Wi-Fi 2×2 mode.

As also shown in FIG. 3 at group of rows 322, in a concurrent cellular 2×2 and Wi-Fi 2×2 sub-mode, antennas 1 and 2 may transceive cellular signals (LTE or other known standards, including but not limited to GSM, 2G, 3G, 4G, 5G, and LTE Advanced), while antennas 3 and 4 may transceive cellular and Wi-Fi signals. In other words, in the concurrent cellular 2×2 and Wi-Fi 2×2 sub-mode described in FIG. 3 at 322, each of the four antennas are in operation simultaneously, more efficiently utilizing the available antenna resources than in any of the standalone sub-modes. When operating in the concurrent cellular 2×2 and Wi-Fi 2×2 sub-mode, antennas 1 and 2 in an embodiment may each transceive a cellular signal of differing frequencies (so long as both frequencies are between 690 MHz and 6 GHz), differing bands, including but not limited to low-band (LB), medium band (MB), high band (HB), ultra-high band (UHB) and LTE unlicensed spectrum (LTE-U), and different carriers (between 1 and 5). As also shown in FIG. 3 at 322, each of antennas 3 and 4 operating in a concurrent cellular 2×2 and Wi-Fi 2×2 sub-mode may transmit Wi-Fi signals according to differing bandwidths (e.g. 2.4 GHz, and 5 GHz), and/or antenna 4 may transmit (either alone or in combination with a Wi-Fi signal) an additional Bluetooth signal.

Operating in a concurrent cellular 4×4 and Wi-Fi 2×2 sub-mode, as shown at group of rows 324 in FIG. 3, antennas 1 through 4 may each transceive cellular signals (LTE or other known standards, including but not limited to GSM, 2G, 3G, 4G, 5G, and LTE Advanced). Thus, the concurrent cellular 4×4 and Wi-Fi 2×2 sub-mode may more efficiently utilize available antenna resources in an embodiment than the concurrent cellular 2×2 and Wi-Fi 2×2 mode, or any of the standalone sub-modes. As shown in FIG. 3 at 324, when operating in the concurrent cellular 4×4 and Wi-Fi 2×2 sub-mode, antennas 1 through 4 may each transceive a cellular signal of differing frequencies (so long as both frequencies are between 1.4 GHz and 6 GHz), differing bands, including medium band (MB), high band (HB), ultra-high band (UHB) and LTE unlicensed spectrum (LTE-U), and different carriers (between 1 and 3). As also shown in FIG. 3 at 324, each of antennas 3 and 4 operating in a concurrent cellular 4×4 and Wi-Fi 2×2 sub-mode may transmit (alone or in combination with a cellular signal) Wi-Fi signals according to differing bandwidths (e.g. 2.4 GHz, and 5 GHz), and/or antenna 4 may transmit (either alone or in combination with a Wi-Fi signal) an additional Bluetooth signal.

As described above, the dynamic antenna co-existence control system 132 in an embodiment may reference the multiplexer configuration scheme table 302 in order to determine the optimal multiplexer configuration scheme based on received trigger inputs, and to determine the states in which each multiplexer should be placed in order to achieve the optimal configuration. For example, with reference to the adaptive massive MIMO multiplexer 214 shown in FIG. 2 and as shown in column 7 326 of FIG. 3, the states of MUX 1 230 and MUX 2 232 are irrelevant in achieving the standalone cellular 2×2 MIMO sub-mode because MUX 1 230 and MUX 2 232 operate to determine the streams transceived by antennas 3 206 and 4 208, respectively, and both antenna 3 206 and antenna 4 208 are in an off state in the standalone cellular 2×2 MIMO sub-mode.

As another example, with reference to FIG. 2, and as also shown in column 7 326 of FIG. 3, in order to achieve the standalone cellular 4×4 MIMO sub-mode in an embodiment, the dynamic antenna co-existence control system 132 in an embodiment may place MUX 1 230 in state 1, coupling the stream from the third node 220 of the LTE sub module 210 to antenna 3 206, and may place MUX 2 232 in state 1, coupling the stream from the fourth node 222 of the LTE sub module 210 to antenna 4 208. As another example, with reference to the adaptive massive MIMO multiplexer 214 shown in FIG. 2, and as also shown in column 7 326 of FIG. 3, in order to achieve the concurrent cellular 2×2 and Wi-Fi 2×2 sub-mode in an embodiment, the dynamic antenna co-existence control system 132 in an embodiment may place MUX 1 230 in state 2, coupling the stream from the first node 224 of the Wi-Fi sub module 212 to antenna 3 206, and may place MUX 2 232 in state 2, coupling the stream from the second node 226 of the Wi-Fi sub module 212 to antenna 4 208. As yet another example, with reference to the adaptive massive MIMO multiplexer 214 shown in FIG. 2, and as also shown in column 7 326 of FIG. 3, in order to achieve the concurrent cellular 4×4 and Wi-Fi 2×2 sub-mode in an embodiment, the dynamic antenna co-existence control system 132 in an embodiment may place MUX 1 230 in state 3, coupling the combined streams from the third node 220 of the LTE sub module 210 and the first node 224 of the Wi-Fi sub module 212 to antenna 3 206, and may place MUX 2 232 in state 3, coupling the combined streams from the fourth node 222 of the LTE sub module 210 and the second node 226 of the Wi-Fi sub module 212 to antenna 4 208.

As described in greater detail below, the choice of which of the sub-modes according to which to operate may be based on receipt of one or more trigger inputs describing the current operating or environmental conditions of the mobile information handling system comprising the antennas, adaptive massive MIMO multiplexer, and dynamic antenna co-existence control system.

FIG. 4 is a block diagram illustrating an adaptive massive MIMO multiplexer directing the flow of signals from ten different data stream nodes to four separate antennas according to an embodiment of the present disclosure. As shown in FIG. 4, and as described above, each multiplexer directing the flow of data streams between antennas and data stream nodes in an embodiment may include one or more diplexers, triplexers, or other multiplexers, and one or more pole switches, including, but not limited to dipole switches and tripole switches. Each of the diplexers, triplexers, dipole switches and tripole switches shown in FIG. 4 may operate according to a plurality of states, and may be operably connected to the dynamic antenna co-existence control system (not shown) via a GPIO control line (not shown), allowing the dynamic antenna co-existence control system to set the operating state of each of these devices. Varying combinations of each devices' states may result in a different multiplexer configuration scheme.

The adaptive massive MIMO multiplexer 214 in an embodiment may operate to direct data streams between a cellular module 402 and antenna 1 (ANT 1) 202, antenna 2 (ANT 2) 204, antenna 3 (ANT 3) 206, and antenna 4 (ANT 4) 208, and may further direct data streams between a Wi-Fi module 414 and antenna 3 206 and antenna 4 208. Cellular module 402 in an embodiment may include a plurality of nodes, including but not limited to a first LTE node 404 transceiving a cellular data stream, a second LTE node 406 transceiving a second cellular data stream, a third LTE node 408 transceiving a third cellular data stream, a fourth LTE node 410 transceiving a fourth cellular data stream, and a GPS node 412 transceiving a GPS data stream or signal. Although each of the cellular data streams shown in FIG. 4 are being transmitted according to the LTE standard, each of the nodes 404-410 in other embodiments may transceive cellular data streams according to any currently available cellular standard or any standard yet to be developed. Each of the four data streams transceived by nodes 404-410 in an embodiment may be separate signals, or the same signal, and may each stream may be transceived at a different frequency than the others, in a different bandwidth than the others, have a different modulation scheme than the others, or have a different number of carriers than the others.

The Wi-Fi module 414 in an embodiment may include a plurality of nodes, including but not limited to a first Wi-Fi node 416 transceiving a 2.4 GHz Wi-Fi data stream on channel 0, a second Wi-Fi node 418 transceiving a 2.4 GHz data stream on channel 1, a third Wi-Fi node 420 transceiving a 5 GHz data stream on channel 0, a fourth Wi-Fi node 422 transceiving a 5 GHz data stream on channel 1, and a Bluetooth node 424 transceiving a Bluetooth data stream. Although each of the Wi-Fi data streams shown in FIG. 4 are transceiving at either the 2.4 GHz or 5 GHz frequencies, in other embodiments, any of the Wi-Fi nodes 416-422 may transceive at any available Wi-Fi frequency, including within an unlicensed band. Further, although each of the Wi-Fi data streams shown in FIG. 4 are transceiving on either channel 0 or channel 1, each of the Wi-Fi nodes 416-422 may transceive on any available channel.

In the embodiment described with reference to FIG. 4, the adaptive massive MIMO multiplexer can be said to allow for up to ten inputs, including five nodes in the cellular module 402 and five nodes in the Wi-Fi module 414. In other embodiments, the Wi-Fi module 414 may only include a portion of the Wi-Fi nodes shown in FIG. 4. For example, in other embodiments, the Wi-Fi module 414 may only include one node transceiving at the 2.4 GHz frequency (regardless of channel), and one node transceiving at the 5 GHz frequency (regardless of channel), and may transceive Bluetooth data streams via the third Wi-Fi node 420, omitting a need for Bluetooth node 424. In such embodiments, the adaptive massive MIMO multiplexer 214 may allow for up to seven inputs, rather than ten, including five nodes in the cellular module 402 and two nodes in the Wi-Fi module 414.

In an embodiment, the adaptive massive MIMO multiplexer 214 may couple the first LTE node 404 directly to the first antenna 202, and couple the second LTE node 406 directly to the second antenna 204. In such a configuration, as long as the first antenna 202 is operating in an on state, it is always transceiving the data stream associated with the first LTE node 404. Similarly, in such a configuration, as long as the second antenna 204 is operating in an on state, it is always transceiving the data stream associated with the second LTE node 406.

The adaptive massive MIMO multiplexer 214 may also couple a plurality of nodes from the cellular module 402 and a plurality of nodes from the Wi-Fi module 214 to antenna 3 206 and antenna 4 208 via a plurality of diplexers, triplexers, dipoles, and/or tripoles which may each operate according to a plurality of states, as directed by the dynamic antenna co-existence control system (not shown). A dipole switch in an embodiment may operate to direct an incoming signal from a single device to one of two different devices, or to direct an outgoing signal to a single device to one of two different devices. A tripole switch in an embodiment may operate to direct an incoming signal from a single device to one of three different devices, or to direct an outgoing signal to a single device from one of three different devices. A diplexer in an embodiment may operate to combine two data streams received from two different devices into a single stream and direct the combined stream to a single device, or to separate a combined stream received from a single device into two data streams and direct each of the separated data streams to a separate single device. A triplexer in an embodiment may operate to combine three data streams received from three different devices into a single stream and direct the combined stream to a single device, or to separate a combined stream received from a single device into three data streams and direct each of the separated data streams to a separate single device. Combinations of dipoles, tripoles, diplexers, and triplexers can form the multiplexers described above with reference to FIG. 2, which are capable of choosing one of a plurality of available nodes to couple to an antenna, combining data streams from a plurality of nodes and transmitting the combined stream to an antenna, and receiving a combined stream from an antenna, separating the combined stream into multiple data streams, and transmitting each of the separated data streams to a separate node. The plurality of dipole switches, tripole switches, diplexers, and triplexers shown in FIG. 4 may thus operate in an embodiment to direct antennas 3 and 4 to transceive various different single data streams or combined streams.

The adaptive massive MIMO multiplexer 214 in an embodiment may include a dipole switch (SP2T) 426 which may operate according to a first state to couple the 2.4 GHz data stream on channel 0 of the first Wi-Fi node 416 to dipole switch 432, or according to a second state to couple the 2.4 GHz data stream on channel 1 of the second Wi-Fi node 418 to dipole switch 432. As another example, the adaptive massive MIMO multiplexer 214 may include a dipole switch (SP2T) 428 which may operate according to a first state to couple the 5 GHz data stream on channel 0 of the third Wi-Fi node 420 to dipole switch 434, or according to a second state to couple the 5 GHz data stream on channel 1 of the fourth Wi-Fi node 422 to dipole switch 434.

As another example, dipole switch 430 may operate according to a first state to couple the fourth LTE node 410 to the tripole (SP3T) switch 460, or according to a second state to couple the fourth LTE node 410 to the diplexer 458. As another example, the dipole switch 432 in an embodiment may operate according to a first state to couple the dipole switch 426 to the dipole switch 438, or according to a second state to couple the dipole switch 426 to the dipole switch 440. In such a way, the dipole switch 432 in an embodiment may transmit a 2.4 GHz Wi-Fi signal on either channel 0 (associated with the first Wi-Fi node 416) or on channel 1 (associated with the second Wi-Fi node 418), dependent upon the state in which the dipole switch 426 is set, to either dipole switch 432, or dipole switch 440. As yet another example, the dipole switch 434 in an embodiment may operate according to a first state to couple the dipole switch 428 to the dipole switch 438, or according to a second state to couple the dipole switch 428 to the dipole switch 440. In such a way, the dipole switch 434 in an embodiment may transmit a 5 GHz Wi-Fi signal on either channel 0 (associated with the third Wi-Fi node 420) or on channel 1 (associated with the fourth Wi-Fi node 422), dependent upon the state in which the dipole switch 428 is set, to either dipole switch 438, or dipole switch 440.

Dipole switch 436 in an embodiment may operate according to a first state to couple the GPS node 412 of the cellular module 402 to the tripole switch 460, or according to a second state to couple the GPS node 412 to the triplexer 452. As also shown in FIG. 4, dipole switch 438 in an embodiment may operate in a first state to couple dipole switch 432 to the diplexer 450, or in a second state to couple the dipole switch 434 to the diplexer 450. In such a way, dipole switch 438 may allow transmission to or receipt from diplexer 450 (dependent upon the states in which dipole switch 426, dipole switch 432, dipole switch 428, and dipole switch 434 are operating) of a 2.4 GHz Wi-Fi stream on either channel 0 or channel 1, or a 5 GHz Wi-Fi stream on either channel 0 or channel 1. As also shown in FIG. 4, dipole switch 440 in an embodiment may operate in a first state to couple dipole switch 432 to dipole switch 448, or in a second state to couple the dipole switch 434 to dipole switch 448. In such a way, dipole switch 440 may allow transmission to or receipt from dipole switch 448 (dependent upon the states in which dipole switch 426, dipole switch 432, dipole switch 428, and dipole switch 434 are operating) of a 2.4 GHz Wi-Fi stream on either channel 0 or channel 1, or a 5 GHz Wi-Fi stream on either channel 0 or channel 1. As also shown in FIG. 4, dipole switch 442 in an embodiment may operate in a first state to couple the Bluetooth node 424 to the triplexer 452, or according to a second state to couple the Bluetooth node 424 to the tripole switch 464.

In an embodiment, dipole switch 444 in an embodiment may operate according to a first state to couple the third LTE node 408 with the dipole switch 454, or according to a second state to couple the third LTE node 408 to the diplexer 450. As also shown in FIG. 4, dipole switch 448 in an embodiment may operate according to a first state to couple dipole switch 440 to tripole switch 460, or according to a second state to couple dipole switch 440 to triplexer 452. In such a way, dipole switch 448 in an embodiment may allow for transmission to or receipt from triplexer 452 of a 2.4 GHz Wi-Fi stream on either channel 0 or channel 1, or a 5 GHz Wi-Fi stream on either channel 0 or channel 1. Also in such a way, dipole switch 448 in an embodiment may allow for transmission to or receipt from tripole switch 460 of a 2.4 GHz Wi-Fi stream on either channel 0 or channel 1, or a 5 GHz Wi-Fi stream on either channel 0 or channel 1.

Diplexer 450 in an embodiment may operate to combine two data streams received from dipole switch 444 and dipole switch 438, respectively, and transmit the combined stream to dipole switch 454. In such a way, diplexer 450 in an embodiment may operate to transmit to dipole 454 a single stream combining the data stream associated with the third LTE node 408 with a 2.4 GHz Wi-Fi signal on channel 0 associated with the first Wi-Fi node 416, a single stream combining the data stream associated with the third LTE node 408 with a 2.4 GHz Wi-Fi signal on channel 1 associated with the second Wi-Fi node 418, a single stream combining the data stream associated with the third LTE node 408 with a 5 GHz Wi-Fi signal on channel 0 associated with the third Wi-Fi node 420, or a single stream combining the data stream associated with the third LTE node 408 with a 5 GHz Wi-Fi signal on channel 1 associated with the fourth Wi-Fi node 422. Additionally, diplexer 450 in an embodiment may operate to receive a combined data stream received from dipole switch 454, separate the combined stream into two separate streams, and transmit a first data stream to dipole switch 444 and a second data stream to dipole switch 438. In such a way, diplexer 450 in an embodiment may operate to receive a combined data stream, separate the combined stream into two streams, transmit a first stream to the third LTE node 408 and the second stream to either the first Wi-Fi node 416, second Wi-Fi node 418, third Wi-Fi node 420, or fourth Wi-Fi node 422, dependent upon the frequency and channel of the second stream.

Triplexer 452 in an embodiment may operate to combine two or three data streams received from dipole switch 436, dipole switch 448, and dipole switch 442, respectively (depending on the states in which dipoles switches 436, 448, and 442 are operating), and transmit the combined data stream to dipole switch 456. In such a way, triplexer 452 in an embodiment may operate to transmit to dipole switch 456, a single stream combining either or both a GPS data stream (associated with GPS node 412) and a Bluetooth data stream (associated with Bluetooth node 424) with one of four different data streams: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422. Additionally, triplexer 452 in an embodiment may operate to receive a combined data stream received from dipole switch 456, separate the combined stream into two or three separate streams, and transmit the Wi-Fi data stream (regardless of channel or frequency) to dipole switch 448, and transmit either or both a GPS data stream to dipole switch 436 and/or a Bluetooth data stream to dipole switch 442.

Dipole switch 454 in an embodiment may operate according to a first state to couple dipole switch 444 to antenna 3 206, or according to a second state to couple diplexer 450 to antenna 3. In such a way, dipole switch 454 may operate to allow antenna 3 206 to transceive a cellular signal associated with the third LTE node 408, to allow antenna 3 206 to transceive a one of four Wi-Fi data streams, including: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422, or to transceive a signal combining the data stream associated with the third LTE node 408 with one of the above listed four Wi-Fi data streams, depending on the states in which dipole switches 454 and 444 and diplexer 450 are operating, among others.

Dipole switch 456 in an embodiment may operate according to a first state to couple triplexer 452 with tripole switch 464, or according to a second state to couple triplexer 452 with diplexer 458. While operating according to the first state in an embodiment, dipole switch 456 may operate to receive from triplexer 452 and transmit to tripole switch 464, or to receive from tripole switch 464 and transmit to triplexer 452, a single stream combining either or both a GPS data stream (associated with GPS node 412) and a Bluetooth data stream (associated with Bluetooth node 424) with one of four different data streams: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422. While operating according to the second state in an embodiment, dipole switch 456 may operate to receive from triplexer 452 and transmit to diplexer 458, or to receive from diplexer 458 and transmit to triplexer 452, a single stream combining either or both a GPS data stream (associated with GPS node 412) and a Bluetooth data stream (associated with Bluetooth node 424) with one of four different data streams: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422.

Diplexer 458 may operate in an embodiment to combine two separate data streams received from dipole switch 456 and dipole switch 430, respectively, and transmit the combined data stream to the tripole switch 464. For example, diplexer 458 in an embodiment may combine a data stream associated with the fourth LTE node 410 received from diplexer 430 with either or both of a GPS data stream and Bluetooth data stream received from dipole switch 456, and with one of several different combinations of streams and received from dipole switch 456, including: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422. Additionally, diplexer 458, as shown in FIG. 4, may operate in an embodiment to receive a combined data stream from tripole switch 464, separate the combined signal into two separate streams, transmit a first stream to dipole switch 456, and transmit a second stream to dipole switch 430.

Tripole switch 460 in an embodiment may operate according to a first state to couple dipole switch 430 with dipole switch 462, according to a second state to couple dipole switch 436 to dipole switch 462, or according to a third state to couple dipole switch 448 with dipole switch 462. While operating according to the first state, tripole switch 460 may allow for communication between dipole switch 430 and dipole switch 462 of the data stream associated with the fourth LTE node 410. While operating according to the second state, tripole switch 460 may allow for communication between dipole switch 436 and dipole switch 462 of the GPS data stream associated with the GPS node 412. While operating according to the third state, tripole switch 460 may allow for communication between dipole switch 448 and dipole switch 462 of one of four possible Wi-Fi data streams, including: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422.

Tripole switch 464 may operate in an embodiment according to a first state to couple dipole switch 462 to dipole switch 456, according to a second state to couple dipole switch 462 to diplexer 458, or in a third state to couple dipole switch 462 to dipole switch 442. While operating in the first state, tripole switch 464 in an embodiment may allow for communication between dipole switch 462 and dipole switch 456 of a single stream combining either or both a GPS data stream (associated with GPS node 412) and a Bluetooth data stream (associated with Bluetooth node 424) with one of four different data streams: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422. While operating in the second state, tripole switch 464 in an embodiment may allow for communication between dipole switch 462 and diplexer 458 a combined data stream including a data stream associated with the fourth LTE node 410, either or both of a GPS data stream associated with GPS node 412 and Bluetooth data stream associated with Bluetooth node 424, and one of several different combinations of streams, including: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422. While operating in the third state, tripole switch 464 in an embodiment may allow for communication between dipole switch 462 and dipole switch 442 of a Bluetooth data stream associated with Bluetooth node 424.

Dipole switch 462 in an embodiment may operate in a first state to couple tripole switch 460 with antenna 4 208, or according to a second state to couple tripole switch 464 with antenna 4 208. While operating in the first state, dipole switch 462 may direct antenna 4 to transceive one of three different single (non-multiplexed) data streams, including: (1) a single cellular data stream associated with the fourth LTE node 410; (2) a single GPS data stream associated with the GPS node 412; or (3) one of four possible single Wi-Fi data streams. The four possible single Wi-Fi data streams transceived by antenna 4 while dipole switch 462 operates according to the first state may include in an embodiment: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422.

In an embodiment, while operating in the second state, dipole switch 462 may direct antenna 4 208 to transceive one of two different combined data streams, or a Bluetooth data stream associated with Bluetooth node 424. The first of the two different combined data streams dipole switch 462 may direct antenna 4 208 to transceive while operating in the second state may include a stream combining either or both a GPS data stream (associated with GPS node 412) and a Bluetooth data stream (associated with Bluetooth node 424) with one of four different Wi-Fi data streams: (1) a 2.4 GHz Wi-Fi signal on channel 0 associated with the first Wi-Fi node 416; (2) a 2.4 GHz Wi-Fi signal on channel 1 associated with the second Wi-Fi node 418; (3) a 5 GHz Wi-Fi signal on channel 0 associated with the third Wi-Fi node 420; or (4) a 5 GHz Wi-Fi signal on channel 1 associated with the fourth Wi-Fi node 422. The second of the two different combined data streams dipole switch 462 may direct antenna 4 208 to transceive may include all of the data streams directly above (e.g. a GPS data stream associated with GPS node 412, the Bluetooth data stream associated with Bluetooth node 424, and one of the four Wi-Fi data streams associated with Wi-Fi node 416, Wi-Fi node 418, Wi-Fi node 420, or Wi-Fi node 422, respectively) and may further include a cellular data stream associated with the fourth LTE node 410.

As described above, the dynamic antenna co-existence control application may control the states of each of the dipole switches, tripole switches, diplexers, and triplexers (e.g. 426-464 of FIG. 4) within the adaptive massive MIMO multiplexer 214 via a GPIO or other control line (not shown). In such a way, the dynamic antenna co-existence control application may direct the adaptive massive MIMO multiplexer to allow antenna 3 206 and antenna 4 208 to transceive single data streams, or combinations of data streams according to a plurality of multiplexer schemes.

FIG. 5 is a graphical diagram illustrating a standalone mode data stream configuration scheme table associated with an adaptive massive MIMO multiplexer receiving seven or ten inputs, according to an embodiment of the present disclosure. As described above, one or more data stream configuration scheme tables in embodiments of the present disclosure may include a description of the types of signals transceived by each of the four transceiving antennas caused by each of the possible multiplexer combinations the adaptive massive MIMO multiplexer is capable of achieving. For example, the standalone mode data stream configuration scheme table 502 shown in FIG. 5 includes a description of each of the signals being transceived by each of four antennas coupled to the multiplexers within the adaptive massive MIMO multiplexer described above with respect to FIG. 4 operating in standalone mode. The standalone mode data stream configuration scheme table 502 describes the signals transceived by each of the four antennas operating in multiple standalone modes.

As shown in column 1 504, describing each of the standalone wireless modes in an embodiment, a standalone mode data stream configuration scheme table 502 in an embodiment may describe the signals transceived by each of the four antennas in three different variations or sub-modes of a standalone mode, including a standalone 2×2 cellular MIMO sub-mode, a standalone 4×4 cellular MIMO sub-mode, a standalone Wi-Fi 2×2 sub-mode, a standalone Bluetooth 1×1 sub-mode and a standalone GPS 1×1 sub-mode. As shown in column 2 506, table 502 in an embodiment may also describe the cellular band combinations associated with each of the standalone wireless modes described in column 1 504. As shown in column 3 508, table 502 in an embodiment may also describe the data stream transceived by antenna 1 in each standalone wireless mode, column 4 510 may describe the data stream transceived by antenna 2 in each standalone wireless mode, column 5 512 may describe the data stream transceived by antenna 3 in each standalone wireless mode, and column 6 514 may describe the data stream transceived by antenna 4 in each standalone wireless mode.

For example, as shown in the group of rows 516 describing the data stream configuration for standalone cellular 2×2 MIMO sub-mode, in a standalone cellular 2×2 MIMO sub-mode, antennas 1 and 2 may transceive cellular signals (LTE or other known standards, including but not limited to GSM, 2G, 3G, 4G, 5G, and LTE Advanced), while antennas 3 and 4 do not transceive signals. In other words, in the standalone cellular 2×2 MIMO sub-mode described in FIG. 5, only two of the antennas are in operation simultaneously. When operating in the standalone cellular 2×2 MIMO sub-mode, antennas 1 and 2 in an embodiment may each transceive a cellular signal of differing frequencies (e.g. between 700 MHz and 6 GHz), differing bands (including all available LTE bands) and different carriers (between 1 and 5).

As another example, as shown in the group of rows 518 describing the data stream configuration for standalone cellular 4×4 MIMO sub-mode, operating in a standalone cellular 4×4 MIMO sub-mode, antennas 1 through 4 may each transceive cellular signals (LTE or other known standards, including but not limited to GSM, 2G, 3G, 4G, 5G, and LTE Advanced). Thus, the standalone cellular 4×4 MIMO sub-mode may more efficiently utilize available antenna resources in an embodiment than the 2×2 MIMO mode in which two of the antennas are left dormant. When operating in the standalone cellular 4×4 MIMO sub-mode, antennas 1 through 4 may each transceive a cellular signal having either one or two different carriers. When transceiving a signal having only one carrier, antennas 1 through 4 operating in standalone cellular 4×4 MIMO sub-mode may transmit signals of differing frequencies (so long as both frequencies are between 700 MHz and 6 GHz), differing bands, including 1.5 GHz, low-band (LB), medium band (MB), high band (HB), ultra-high band (UHB) and LTE unlicensed spectrum (LTE-U), as shown in FIG. 5. When transceiving a signal having two carriers, antennas 1 through 4 operating in standalone cellular 4×4 MIMO sub-mode may transmit a separate signal, each signal having two different carriers. Further, the two carriers in each signal may correspond to the same frequency, or two different frequencies. For example, antennas 1-4, operating in the standalone cellular 4×4 MIMO sub-mode, may transceive cellular signals having two carriers with both carriers corresponding to a medium bandwidth frequency, or both carriers corresponding to a high bandwidth frequency. As another example, antennas 1-4, operating in the standalone cellular 4×4 MIMO sub-mode, may transceive cellular signals having two carriers with one carrier corresponding to a medium bandwidth frequency and the second carrier corresponding to a high bandwidth frequency. As yet another example, antennas 1 and 2, operating in a standalone cellular 4×4 MIMO sub-mode, may transceive cellular signals having two carriers with one carrier corresponding to a low bandwidth frequency and the second carrier corresponding to a high bandwidth frequency, or with one carrier corresponding to a low bandwidth frequency and the second carrier corresponding to a medium bandwidth frequency. In this last example given directly above, antennas 3 and 4 may transceive signals with only one carrier, that carrier corresponding to the bandwidth frequency of the second carrier of the signals simultaneously transceived by antennas 1 and 2.

As another example, as shown in the group of rows 520 describing the data stream configuration for standalone Wi-Fi 2×2 MIMO sub-mode, operating in a standalone Wi-Fi 2×2 sub-mode in an embodiment, antennas 3 and 4 may each transceive a Wi-Fi signal (WLAN, WWAN, unlicensed WLAN, unlicensed WWAN, Wi-MAX or any other Wi-Fi signal, frequency, band, or channel known and in use), while antennas 1 and 2 do not transceive any signals. Each of antennas 3 and 4 operating in standalone Wi-Fi 2×2 sub-mode may transmit Wi-Fi signals according to differing bandwidths (e.g. 2.4 GHz, and 5 GHz). Further, each Wi-Fi signal in an embodiment may be transceived on the same or a separate channel (e.g. channel 0 or channel 1).

As another example, as shown in the group of rows 522 describing the data stream configuration for standalone Bluetooth 1×1 sub-mode, operating in a standalone Bluetooth 1×1 sub-mode in an embodiment, antenna 4 may transceive only a Bluetooth signal. Similarly and as yet another example, as shown in the group of rows 524 describing the data stream configuration for standalone GPS 1×1 sub-mode, operating in a standalone GPS 1×1 sub-mode in an embodiment, antenna 4 may transceive only a GPS signal. Because the antennas operating in standalone mode in an embodiment may operate according to only one of five available sub-modes at a time, antennas 1 through 4 may toggle between each of the five sub-modes over time. Thus, when operating in standalone mode, the four antennas in an embodiment may not simultaneously transmit a Wi-Fi signal and a cellular signal, and antenna 4 in an embodiment may not simultaneously transmit a Wi-Fi signal, a Bluetooth signal, and/or a GPS signal. As described in greater detail below, the choice of which of the standalone sub-modes according to which to operate, as well as whether to operate in the standalone mode or the concurrent mode, may be based on receipt of one or more trigger inputs describing the current operating or environmental conditions of the mobile information handling system comprising the antennas, adaptive massive MIMO multiplexer, and dynamic antenna co-existence control system.

FIG. 6 is a graphical diagram illustrating a concurrent mode data stream configuration scheme table associated with an adaptive massive MIMO multiplexer receiving seven or ten inputs, according to an embodiment of the present disclosure. The concurrent mode data stream configuration scheme table 602 in an embodiment may describe the signals transceived by the antennas operating in a concurrent mode, in which the antennas simultaneously transceive both cellular and Wi-Fi signals, as well as Bluetooth and GPS signals. As shown in FIG. 6, concurrent mode data stream configuration scheme table 602 in an embodiment may describe the signals transceived by each of the four antennas in three different variations or sub-modes of a concurrent mode, including: (1) a concurrent 2×2 cellular, Wi-Fi 2×2, Bluetooth 1×1, and GPS 1×1 sub-mode; (2) a concurrent 3×3 cellular, Wi-Fi 2×2, Bluetooth 1×1, and GPS 1×1 sub-mode; and (3) a concurrent 4×4 cellular, Wi-Fi 2×2, Bluetooth 1×1, and GPS 1×1 sub-mode.

As shown in column 1 604, describing each of the concurrent wireless modes in an embodiment, a concurrent mode data stream configuration scheme table 602 in an embodiment may describe the signals transceived by each of the four antennas in three different variations or sub-modes of a concurrent mode, including a concurrent cellular 2×2, Wi-Fi 2×2, Bluetooth 1×1, and GPS 1×1 sub-mode, a concurrent cellular 3×3, Wi-Fi 2×2, Bluetooth 1×1, and GPS 1×1 sub-mode, and a concurrent cellular 4×4, Wi-Fi 2×2, Bluetooth 1×1, and GPS 1×1 sub-mode. As shown in column 2 606, table 602 in an embodiment may also describe the cellular band combinations associated with each of the concurrent wireless modes described in column 1 604. As shown in column 3 608, table 602 in an embodiment may also describe the data stream transceived by antenna 1 in each concurrent wireless mode, column 4 610 may describe the data stream transceived by antenna 2 in each concurrent wireless mode, column 5 612 may describe the data stream transceived by antenna 3 in each concurrent wireless mode, and column 6 614 may describe the data stream transceived by antenna 4 in each concurrent wireless mode.

As an example, and as shown in the group of rows labeled 616 in FIG. 6, describing the data stream configuration for the concurrent cellular 2×2, Wi-Fi 2×2, Bluetooth 1×1, and GPS 1×1 sub-mode, in a concurrent cellular 2×2, Wi-Fi 2×2, Bluetooth 1×1, and GPS 1×1 sub-mode, antennas 1 and 2 may transceive cellular signals (LTE or other known standards, including but not limited to GSM, 2G, 3G, 4G, 5G, and LTE Advanced), while antenna 3 may transceive Wi-Fi signals; and antenna 4 may transceive a combination of Wi-Fi, Bluetooth, and/or GPS signals. In other words, in the concurrent cellular 2×2 and Wi-Fi 2×2 sub-mode described in FIG. 6, each of the four antennas are in operation simultaneously, more efficiently utilizing the available combined cellular and Wi-Fi antenna resources than in any of the standalone sub-modes described above with reference to FIG. 5. When operating in the concurrent cellular 2×2, Wi-Fi 2×2, Bluetooth 1×1 and GPS 1×1 sub-mode, antennas 1 and 2 in an embodiment may each transceive a cellular signal of differing frequencies (so long as both frequencies are between 700 MHz and 6 GHz), differing bands, including but not limited to low-band (LB), medium band (MB), high band (HB), ultra-high band (UHB) and LTE unlicensed spectrum (LTE-U), and different carriers (between 1 and 5). Each of antennas 3 and 4 operating in a concurrent cellular 2×2, Wi-Fi 2×2, Bluetooth 1×1, and GPS 1×1 sub-mode may transmit Wi-Fi signals according to differing bandwidths (e.g. 2.4 GHz, and 5 GHz) and different channels (e.g. channel 0 or channel 1), and/or antenna 4 may transmit (either alone or in combination with a Wi-Fi signal) an additional Bluetooth signal and/or GPS signal.

As another example, and as shown in the group of rows labeled 618 in FIG. 6, describing the data stream configuration for the concurrent cellular 3×3, Wi-Fi 2×2, Bluetooth 1×1, and GPS 1×1 sub-mode, operating in a concurrent cellular 3×3, Wi-Fi 2×2, Bluetooth 1×1, GPS 1×1 sub-mode, antennas 1 through 2 may each transceive cellular signals, antenna 3 may transceive a combination cellular and Wi-Fi signal, and antenna 4 may transceive a Wi-Fi signal in combination with either or both a Bluetooth signal and a GPS signal. Thus, the concurrent cellular 3×3 Wi-Fi 2×2, Bluetooth 1×1, GPS 1×1 sub-mode may more efficiently utilize available cellular antenna resources in an embodiment than the concurrent cellular 2×2, Wi-Fi 2×2, Bluetooth 1×1, GPS 1×1 sub-mode, and may more efficiently utilize available combined cellular and Wi-Fi resources than any of the standalone sub-modes described with reference to FIG. 5. When operating in the concurrent cellular 3×3, Wi-Fi 2×2, Bluetooth 1×1, GPS 1×1 sub-mode, antennas 1 through 3 may transceive a cellular signal of differing frequency bands, including low band (LB), 1.5 GHz, medium band (MB), high band (HB), ultra-high band (UHB) and LTE unlicensed spectrum (LTE-U), and a single carrier. Each of antennas 3 and 4 operating in a concurrent cellular 3×3, Wi-Fi 2×2, Bluetooth 1×1, GPS 1×1 sub-mode may transmit (alone or in combination with a cellular signal) Wi-Fi signals according to differing frequencies (e.g. 2.4 GHz, and 5 GHz), and/or antenna 4 may transmit (either alone or in combination with a Wi-Fi signal) an additional Bluetooth signal and/or additional GPS signal.

As yet another example, and as shown in the group of rows labeled 620 in FIG. 6, describing the data stream configuration for the concurrent cellular 4×4, Wi-Fi 2×2, Bluetooth 1×1, and GPS 1×1 sub-mode, operating in a concurrent cellular 4×4, Wi-Fi 2×2, Bluetooth 1×1, GPS 1×1 sub-mode, antennas 1 through 4 may each transceive cellular signals (LTE or other known standards, including but not limited to GSM, 2G, 3G, 4G, 5G, and LTE Advanced). Thus, the concurrent cellular 4×4, Wi-Fi 2×2, Bluetooth 1×1, GPS 1×1 sub-mode may more efficiently utilize available cellular antenna resources in an embodiment than the concurrent cellular 2×2, Wi-Fi 2×2, Bluetooth 1×1, GPS 1×1 sub-mode, or the concurrent cellular 3×3, Wi-Fi 2×2, Bluetooth 1×1, GPS 1×1 sub-mode, and may more efficiently utilize the combined cellular and Wi-Fi antenna resources in any of the standalone sub-modes described with reference to FIG. 5. When operating in the concurrent cellular 4×4, Wi-Fi 2×2, Bluetooth 1×1, GPS 1×1 sub-mode, antennas 1 through 4 may transceive a cellular signal of differing frequency bands, including low band (LB), 1.5 GHz, medium band (MB), high band (HB), ultra-high band (UHB) and LTE unlicensed spectrum (LTE-U), and different carriers (between 1 and 2). Each of antennas 3 and 4 operating in a concurrent cellular 4×4, Wi-Fi 2×2, Bluetooth 1×1, GPS 1×1 sub-mode may transmit (alone or in combination with a cellular signal) Wi-Fi signals according to differing frequencies (e.g. 2.4 GHz, and 5 GHz), and/or antenna 4 may transmit (either alone or in combination with a Wi-Fi signal) an additional Bluetooth signal and/or additional GPS signal.

While operating in the cellular 4×4, Wi-Fi 2×2, Bluetooth 1×1, GPS 1×1 concurrent sub-mode, antennas 3 and 4 may transceive either the 2.4 GHz or 5 GHz Wi-Fi signals along with the LTE signals at most LTE bandwidths. However, as shown in the cell where column 5 612 intersects the top row of the group of rows 618, and in the cells where column 5 612 and column 6 614 intersect the third row from the bottom of the group of rows 620, when transceiving a high-band LTE signal in the cellular 4×4, Wi-Fi 2×2, Bluetooth 1×1, GPS 1×1 concurrent sub-mode, antennas 3 and 4 may only transceive the 5 GHz Wi-Fi signal, and not the 2.4 GHz Wi-Fi signal. Similarly, as shown in the cell where column 5 612 intersects the bottom row of the group of rows 618, and in the cells where column 5 612 and column 6 614 intersect the bottom row of the group of rows 620, when transceiving an unlicensed-band (LTE-U+) LTE signal in the cellular 4×4, Wi-Fi 2×2, Bluetooth 1×1, GPS 1×1 concurrent sub-mode, antennas 3 and 4 may only transceive the 2.4 GHz Wi-Fi signal, and not the 5 GHz Wi-Fi signal. When transceiving a high-band LTE signal in the cellular 3×3, Wi-Fi 2×2, Bluetooth 1×1, GPS 1×1 concurrent sub-mode, antennas 3 may only transceive the 5 GHz Wi-Fi signal, and antenna 3 may not transceive the 5 GHz Wi-Fi signal. Similarly, when transceiving an unlicensed-band (LTE-U+) LTE signal in the cellular 3×3, Wi-Fi 2×2, Bluetooth 1×1, GPS 1×1 concurrent sub-mode, antennas 3 may only transceive the 2.4 GHz Wi-Fi signal, and antenna 3 may not transceive the 5 GHz Wi-Fi signal. The concurrent mode data stream configuration scheme table 602 in an embodiment only allows for these specific conditions in order to avoid potential co-location issues associated with interference between two or more antennas of the mobile information handling system.

Co-location interference issues arise when two antennas transceiving two different signals are placed in close proximity to one another, and the transmission or reception of one of the signals causes extreme interference to the other signal and/or vice versa, such that one or both signals becomes unusable. The identification of which signals will cause co-location interference when transmitted from two or more of the transceiving antennas in an embodiment may occur during the design phase of the information handling system. As such, signals known to present co-location issues may be excluded from tables listing possible combinations of signals from which the dynamic antenna coexistence control system may choose an optimal configuration. By excluding data stream combinations known to present potential co-location issues prior to operation of the adaptive massive MIMO multiplexer and dynamic antenna co-existence control system, potential co-location interference between antennas 1 and 4 in an embodiment may be avoided.

As described in greater detail below, the choice of which of the sub-modes according to which to operate may be based on receipt of one or more trigger inputs describing the current operating or environmental conditions of the mobile information handling system comprising the antennas, adaptive massive MIMO multiplexer, and dynamic antenna co-existence control system.

FIG. 7 is a graphical illustration of a multiplexer state table describing the proper configuration of the adaptive massive MIMO multiplexer required to direct a third antenna to transceive an optimal signal according to an embodiment of the present disclosure. The multiplexer state table 702, as shown in FIG. 7 describes the state to which each of the dipole switches, tripole switches, diplexers, and triplexers within the adaptive massive MIMO multiplexer described above with reference to FIG. 4 may be set in order to cause antenna 3 of the mobile information handling system to transceive a given signal. Once the dynamic antenna co-location control system determines the optimal data stream configuration for a given set of parameters, as described in greater detail below, by referencing the stand-alone mode data stream configuration scheme table of FIG. 5 and/or the concurrent mode data stream configuration scheme table of FIG. 6, the dynamic antenna co-location control system in an embodiment may reference the multiplexer state table of FIG. 7 to determine which states the individual components within the adaptive massive MIMO multiplexer should be set in order to transceive the data stream(s) associated with antenna 3 in the optimal data stream configuration.

For example, column 704 in FIG. 7 describes the states in which each of multiplexer elements 426, 428, 432, 434, 438, 444, and 454 should operate in order for antenna 3 to transceive only an LTE data stream. As another example, column 706 describes the states in which the multiplexer elements should operate in order for antenna 3 to transceive only a 2.4 GHz Wi-Fi signal on channel 0. As another example, column 708 describes the states in which the multiplexer elements should operate in order for antenna 3 to transceive only a 2.4 GHz Wi-Fi signal on channel 1. As another example, column 710 describes the states in which the multiplexer elements should operate in order for antenna 3 to transceive only a 5 GHz Wi-Fi signal on channel 0. As another example, column 712 describes the states in which the multiplexer elements should operate in order for antenna 3 to transceive only a 5 GHz Wi-Fi signal on channel 1. As another example, column 714 describes the states in which the multiplexer elements should operate in order for antenna 3 to transceive a combined LTE signal and a 2.4 GHz Wi-Fi signal on channel 0. As another example, column 716 describes the states in which the multiplexer elements should operate in order for antenna 3 to transceive a combined LTE signal and a 2.4 GHz Wi-Fi signal on channel 1. As another example, column 718 describes the states in which the multiplexer elements should operate in order for antenna 3 to transceive a combined LTE signal a 5 GHz Wi-Fi signal on channel 0. As another example, column 720 describes the states in which the multiplexer elements should operate in order for antenna 3 to transceive a combined LTE signal and a 5 GHz Wi-Fi signal on channel 1.

As shown in FIG. 7 at column 704, if the optimal data stream configuration includes the third antenna transceiving only a data stream associated with the third LTE node 408 of FIG. 4, the dynamic antenna co-location control system may direct the dipole switch 444 to operate according to its first state, and may direct the dipole switch 454 to operate according to its second state. As shown in FIG. 4, placing the dipole switch 444 and the dipole switch 454 in their respective first states may cause the adaptive massive MIMO multiplexer to couple the third LTE node 408 directly to the third antenna 206.

As shown in column 706, if the optimal data stream configuration includes the third antenna transceiving only a 2.4 GHz data stream on channel 0, associated with the first Wi-Fi node 416 of FIG. 4, the dynamic antenna co-existence control system in an embodiment may direct the dipole switch 426 to operate according to its first state, the dipole switch 432 to operate according to its first state, the dipole switch 438 to operate according to its first state, the dipole switch 444 to operate according to its first state, and the dipole switch 454 to operate according to its second state. As shown in FIG. 4, placing the dipole switch 426 in its first state, the dipole switch 432 in its first state, and the dipole switch 438 in its first state in an embodiment may couple dipole switch 438 with the first Wi-Fi node 416. As also shown in FIG. 4, also placing the dipole switch 444 in its first state in an embodiment may effectively couple the diplexer 450 to only dipole switch 438 (since dipole switch 444 is not set to couple to the diplexer 450), and thus, to only the first Wi-Fi node 416. As also shown in FIG. 4, placing the dipole switch 454 in its second state couples it to the diplexer 450 without coupling it to the dipole switch 444, thus coupling dipole switch 454 only to the first Wi-Fi node 416, and coupling the third antenna 206 with the first Wi-Fi node 416 in order to transceive only the 2.4 GHz, Channel 0 Wi-Fi data stream.

As shown in column 708, if the optimal data stream configuration includes the third antenna transceiving only a 2.4 GHz data stream on channel 1, rather than channel 0, associated with the second Wi-Fi node 418 of FIG. 4, only one multiplexer/switch element needs to change states. For example, as seen by comparing columns 706 and 708, the only difference between the third antenna transceiving a 2.4 GHz data stream on channel 0 and transceiving a 2.4 GHz data stream on channel 1 is that the dipole switch element 426 should be set to its second state, rather than its first, thus coupling dipole switch 438 with the second Wi-Fi node 418, rather than the first Wi-Fi node 416.

If the optimal data stream configuration includes the third antenna transceiving only a 5 GHz data stream on channel 0, associated with the third Wi-Fi node 420 of FIG. 4, as shown in column 710, the dynamic antenna co-existence control system in an embodiment may direct the dipole switch 428 to operate according to its first state, the dipole switch 434 to operate according to its first state, the dipole switch 438 to operate according to its second state, the dipole switch 444 to operate according to its first state, and the dipole switch 454 to operate according to its second state. As shown in FIG. 4, placing the dipole switch 428 in its first state, the dipole switch 434 in its first state, and the dipole switch 438 in its second state in an embodiment may couple dipole switch 438 with the third Wi-Fi node 420. As also shown in FIG. 4, also placing the dipole switch 444 in its first state in an embodiment may effectively couple the diplexer 450 to only dipole switch 438 (since dipole switch 444 is not set to couple to the diplexer 450), and thus, to only the third Wi-Fi node 420. As also shown in FIG. 4, placing the dipole switch 454 in its second state couples it to the diplexer 450 without coupling it to the dipole switch 444, thus coupling dipole switch 454 only to the third Wi-Fi node 420, and coupling the third antenna 206 with the third Wi-Fi node 420 in order to transceive only the 5 GHz, Channel 0 Wi-Fi data stream.

As shown in column 712, if the optimal data stream configuration includes the third antenna transceiving only a 5 GHz data stream on channel 1, rather than channel 0, associated with the fourth Wi-Fi node 422 of FIG. 4, only one multiplexer/switch element needs to change states. For example, as seen by comparing columns 710 and 712, the only difference between the third antenna transceiving a 5 GHz data stream on channel 0 and transceiving a 5 GHz data stream on channel 1 is that the dipole switch element 428 should be set to its second state, rather than its first, thus coupling dipole switch 438 with the fourth Wi-Fi node 422, rather than the third Wi-Fi node 420.

Directing the third antenna to transceive an LTE signal in addition to a 2.4 GHz Wi-Fi signal on channel 0 requires only slight modification of the settings associated with transceiving only the 2.4 GHz Wi-Fi signal on channel 0, as shown by comparing columns 706 and 714. For example, the only change in multiplexer/switch element states between columns 706 and 714 is placing dipole switch 444 in its second state, rather than its first, thus causing the diplexer 450 to combine the data stream received from diplexer 438 with the data stream received from dipole switch 444. This combination couples the third antenna 206 with the diplexer 450, causing the third antenna 206 to transceive a combination of the cellular data stream associated with the third LTE node 408 and the 2.4 GHz channel 0 data stream associated with the first Wi-Fi node 416.

Directing the third antenna to transceive an LTE signal in addition to a 2.4 GHz Wi-Fi signal on channel 1 requires only slight modification of the settings associated with transceiving only the 2.4 GHz Wi-Fi signal on channel 1, as shown by comparing columns 708 and 716. For example, the only change in multiplexer/switch element states between columns 708 and 716 is placing dipole switch 444 in its second state, rather than its first, thus causing the diplexer 450 to combine the data stream received from diplexer 438 with the data stream received from dipole switch 444. This combination couples the third antenna 206 with the diplexer 450, causing the third antenna 206 to transceive a combination of the cellular data stream associated with the third LTE node 408 and the 2.4 GHz channel 1 data stream associated with the second Wi-Fi node 418.

Directing the third antenna to transceive an LTE signal in addition to a 5 GHz Wi-Fi signal on channel 0 requires only slight modification of the settings associated with transceiving only the 5 GHz Wi-Fi signal on channel 0, as shown by comparing columns 710 and 718. For example, the only change in multiplexer/switch element states between columns 710 and 718 is placing dipole switch 444 in its second state, rather than its first, thus causing the diplexer 450 to combine the data stream received from diplexer 438 with the data stream received from dipole switch 444. This combination couples the third antenna 206 with the diplexer 450, causing the third antenna 206 to transceive a combination of the cellular data stream associated with the third LTE node 408 and the 5 GHz channel 0 data stream associated with the third Wi-Fi node 420.

Directing the third antenna to transceive an LTE signal in addition to a 5 GHz Wi-Fi signal on channel 1 requires only slight modification of the settings associated with transceiving only the 5 GHz Wi-Fi signal on channel 1, as shown by comparing columns 712 and 720. For example, the only change in multiplexer/switch element states between columns 712 and 720 is placing dipole switch 444 in its second state, rather than its first, thus causing the diplexer 450 to combine the data stream received from diplexer 438 with the data stream received from dipole switch 444. This combination couples the third antenna 206 with the diplexer 450, causing the third antenna 206 to transceive a combination of the cellular data stream associated with the third LTE node 408 and the 5 GHz channel 1 data stream associated with the fourth Wi-Fi node 422.

FIG. 8 is a graphical illustration of a multiplexer state table describing the proper configuration of the adaptive massive MIMO multiplexer required to direct a fourth antenna to transceive an optimal signal according to an embodiment of the present disclosure. The multiplexer state table 802, as shown in FIG. 8 describes the state to which each of the dipole switches, tripole switches, diplexers, and triplexers within the adaptive massive MIMO multiplexer described above with reference to FIG. 4 may be set in order to cause antenna 4 of the mobile information handling system to transceive a given signal. Once the dynamic antenna co-location control system determines the optimal data stream configuration for a given set of parameters, as described in greater detail below, by referencing the standalone mode data stream configuration scheme table of FIG. 5 and/or the concurrent mode data stream configuration scheme table of FIG. 6, the dynamic antenna co-location control system in an embodiment may reference the multiplexer state table of FIG. 8 to determine which states the individual components within the adaptive massive MIMO multiplexer should be set in order to transceive the data stream(s) associated with antenna 4 in the optimal data stream configuration.

FIG. 8 in an embodiment may describe the states in which each of multiplexer elements 426, 428, 430, 432, 434, 436, 440, 442, 448, 456, 460, 462, and 464 should operate in order for antenna 4 to transceive in one of a plurality of standalone sub-modes. For example, column 804 describes the states in which the multiplexer elements should operate in order for antenna 4 to transceive only a LTE signal. As another example, column 806 describes the states in which the multiplexer elements should operate in order for antenna 4 to transceive only a 2.4 GHz Wi-Fi signal on channel 0. As another example, column 808 describes the states in which the multiplexer elements should operate in order for antenna 4 to transceive only a 2.4 GHz Wi-Fi signal on channel 1. As another example, column 810 describes the states in which the multiplexer elements should operate in order for antenna 4 to transceive only a 5 GHz Wi-Fi signal on channel 0. As another example, column 812 describes the states in which the multiplexer elements should operate in order for antenna 4 to transceive only a 5 GHz Wi-Fi signal on channel 1. As another example, column 814 describes the states in which the multiplexer elements should operate in order for antenna 4 to transceive only a GPS signal. As another example, column 816 describes the states in which the multiplexer elements should operate in order for antenna 4 to transceive only a Bluetooth signal.

FIG. 8 may also describe the states in which each of multiplexer elements 426, 428, 430, 432, 434, 436, 440, 442, 448, 456, 460, 462, and 464 should operate in order for antenna 4 to transceive a plurality of combined Wi-Fi, Bluetooth, and GPS data streams according to a concurrent sub-mode. For example, column 818 describes the states in which the multiplexer elements should operate in order for antenna 4 to transceive a combined Bluetooth, GPS, and a 2.4 GHz Wi-Fi signal on channel 0. As another example, column 812 describes the states in which the multiplexer elements should operate in order for antenna 4 to transceive a combined Bluetooth, GPS, and a 2.4 GHz Wi-Fi signal on channel 1. As another example, column 822 describes the states in which the multiplexer elements should operate in order for antenna 4 to transceive a combined Bluetooth, GPS, and a 5 GHz Wi-Fi signal on channel 0. As another example, column 824 describes the states in which the multiplexer elements should operate in order for antenna 4 to transceive a combined Bluetooth, GPS, and a 5 GHz Wi-Fi signal on channel 1.

FIG. 8 may also describe the states in which each of multiplexer elements 426, 428, 430, 432, 434, 436, 440, 442, 448, 456, 460, 462, and 464 should operate in order for antenna 4 to transceive a plurality of combined LTE, Wi-Fi, Bluetooth, and GPS data streams according to a concurrent sub-mode. For example, column 826 describes the states in which the multiplexer elements should operate in order for antenna 4 to transceive a combined LTE, Bluetooth, GPS, and a 2.4 GHz Wi-Fi signal on channel 0. As another example, column 828 describes the states in which the multiplexer elements should operate in order for antenna 4 to transceive a combined LTE, Bluetooth, GPS, and a 2.4 GHz Wi-Fi signal on channel 1. As another example, column 830 describes the states in which the multiplexer elements should operate in order for antenna 4 to transceive a combined LTE, Bluetooth, GPS, and a 5 GHz Wi-Fi signal on channel 0. As another example, column 832 describes the states in which the multiplexer elements should operate in order for antenna 4 to transceive a combined LTE, Bluetooth, GPS, and a 5 GHz Wi-Fi signal on channel 1.

As shown in column 804, if the optimal data stream configuration includes the fourth antenna transceiving only a data stream associated with the fourth LTE node 410 of FIG. 4, the dynamic antenna co-location control system may direct the dipole switch 430 to operate according to its first state, may direct the tripole switch 460 to operate according to its first state, and may direct the dipole switch 462 to operate according to its first state. As shown in FIG. 4, placing the dipole switch 430, the tripole switch 460, and the dipole switch 462 in their respective first states may cause the adaptive massive MIMO multiplexer to couple the fourth LTE node 410 directly to the fourth antenna 208.

As shown in column 806, if the optimal data stream configuration includes the fourth antenna transceiving only a 2.4 GHz data stream on channel 0, associated with the first Wi-Fi node 416 of FIG. 4, the dynamic antenna co-existence control system in an embodiment may direct the dipole switch 426 to operate according to its first state, the dipole switch 432 to operate according to its second state, the dipole switch 434 to operate according to its second state, the dipole switch 440 to operate according to its first state, the dipole switch 448 to operate according to its first state, the tripole switch 460 to operate according to its third state, and the dipole switch 462 to operate according to its first state. As shown in FIG. 4, placing the dipole switch 426 in its first state, the dipole switch 432 in its second state, and the dipole switch 440 in its second state in an embodiment may couple dipole switch 448 with the first Wi-Fi node 416. As also shown in FIG. 4, also placing the dipole switch 448 in its first state in an embodiment may effectively couple the triplexer 460 to the first Wi-Fi node 416. As also shown in FIG. 4, placing the tripole switch 460 in its third state couples it to the diplexer 462, and placing the diplexer 462 in its first state couples the fourth antenna 208 with the first Wi-Fi node 416 in order to transceive only the 2.4 GHz, Channel 0 Wi-Fi data stream.

If the optimal data stream configuration includes the fourth antenna transceiving only a 2.4 GHz data stream on channel 1, rather than channel 0, associated with the second Wi-Fi node 418 of FIG. 4, only one multiplexer/switch element needs to change states, as shown in column 808. For example, as seen by comparing columns 806 and 808, the only difference between the fourth antenna transceiving a 2.4 GHz data stream on channel 0 and transceiving a 2.4 GHz data stream on channel 1 is that the dipole switch element 426 should be set to its second state, rather than its first, thus coupling dipole switch 440 with the second Wi-Fi node 418, rather than the first Wi-Fi node 416.

As also shown in column 810, if the optimal data stream configuration includes the fourth antenna transceiving only a 5 GHz data stream on channel 0, associated with the third Wi-Fi node 420 of FIG. 4, the dynamic antenna co-existence control system in an embodiment may direct the dipole switch 428 to operate according to its first state, the dipole switch 432 to operate according to its second state, the dipole switch 434 to operate according to its second state, the dipole switch 440 to operate according to its second state, the dipole switch 448 to operate according to its first state, the tripole switch 460 to operate according to its third state, and the dipole switch 462 to operate according to its first state. As shown in FIG. 4, placing the dipole switch 428 in its second state, the dipole switch 432 in its second state, and the dipole switch 440 in its second state in an embodiment may couple dipole switch 448 with the third Wi-Fi node 420. As also shown in FIG. 4, also placing the dipole switch 448 in its first state in an embodiment may effectively couple the triplexer 460 to the third Wi-Fi node 420. As also shown in FIG. 4, placing the tripole switch 460 in its third state couples it to the diplexer 462, and placing the diplexer 462 in its first state couples the fourth antenna 208 with the third Wi-Fi node 420 in order to transceive only the 5 GHz, Channel 0 Wi-Fi data stream.

If the optimal data stream configuration includes the fourth antenna transceiving only a 5 GHz data stream on channel 1, rather than channel 0, associated with the fourth Wi-Fi node 422 of FIG. 4, only one multiplexer/switch element needs to change states, as shown in column 812. For example, as seen by comparing columns 810 and 812, the only difference between the fourth antenna transceiving a 5 GHz data stream on channel 0 and transceiving a 2.4 GHz data stream on channel 1 is that the dipole switch element 428 should be set to its second state, rather than its first, thus coupling dipole switch 440 with the fourth Wi-Fi node 422, rather than the third Wi-Fi node 420.

As shown in column 814, if the optimal data stream configuration includes the fourth antenna transceiving only a GPS data stream associated with the GPS node 412 of FIG. 4, the dynamic antenna co-location control system may direct the dipole switch 436 to operate according to its first state, may direct the tripole switch 460 to operate according to its second state, and may direct the dipole switch 462 to operate according to its first state. As shown in FIG. 4, placing the dipole switch 436 in its first state and placing the tripole switch 460 in its second state couples the tripole switch 460 to the GPS node 412. As also shown in FIG. 4, placing the dipole switch 462 in its first state couples it to the tripole switch 460, thus effectively coupling the fourth antenna 208 with the GPS node 412, causing the fourth antenna 208 to transceive only a GPS data stream.

If the optimal data stream configuration includes the fourth antenna transceiving only a Bluetooth data stream associated with the Bluetooth node 424 of FIG. 4, the dynamic antenna co-location control system may direct the dipole switch 442 to operate according to its second state, may direct the tripole switch 464 to operate according to its third state, and may direct the dipole switch 462 to operate according to its second state, as shown in column 816. As shown in FIG. 4, placing the dipole switch 442 in its second state and placing the tripole switch 464 in its third state couples the tripole switch 464 to the Bluetooth node 424, alone. As also shown in FIG. 4, placing the dipole switch 462 in its second state couples it to the tripole switch 464, thus effectively coupling the fourth antenna 208 with the Bluetooth node 424, causing the fourth antenna 208 to transceive only a Bluetooth data stream.

As shown in column 818, in order to combine the 2.4 GHz Wi-Fi data stream on channel 0 associated with the first Wi-Fi node 416 with the GPS data stream associated with the GPS node 412 and the Bluetooth data stream associated with the Bluetooth node 424, the dynamic antenna co-existence control system in an embodiment may move the dipole switch 436 to its second state, and move the dipole switch 442 to its first state, thus coupling the GPS node 412 and the Bluetooth node 424 with the triplexer 452. The dynamic antenna co-existence control system may also direct the dipole switch 426 to operate according to its first state, the dipole switch 432 to operate according to its second state, the dipole switch 434 to operate according to its second state, the dipole switch 440 to operate according to its first state, as described above with reference to coupling the fourth antenna 208 with only the first Wi-Fi node 416. In an embodiment, the dynamic antenna co-existence control system may then also place the dipole switch 448 in its second state, coupling the triplexer 452 with the first Wi-Fi node 416. In such a way, the triplexer 452 may be coupled with the GPS node 412, the Bluetooth node 424, and the first Wi-Fi node 416 and may combine all three signals into a single data stream for transmission to dipole switch 456, or may receive a combined data stream from dipole switch 456, demultiplex that combined signal, and transmit each of the separated data streams to the appropriate one of the GPS node 412, the Bluetooth node 424, and/or the first Wi-Fi node 416. The dynamic antenna co-existence control system in an embodiment may further place the dipole switch 456 in its first state, place the tripole switch 464 in its first state, and place the dipole switch 462 in its second state, effectively coupling the fourth antenna 208 to the triplexer 452, and causing the fourth antenna 208 to transceive a combined signal including the GPS data stream associated with the GPS node 412, the Bluetooth data stream associated with the Bluetooth node 424, and the 2.4 GHz Wi-Fi data stream on channel 0, associated with the first Wi-Fi node 416.

As can be seen by comparing columns 818 and 820, only one change in state is required to switch the fourth antenna 208 from transceiving a combined signal including the GPS data stream, the Bluetooth data stream, and the 2.4 GHz Wi-Fi data stream on channel 0, associated with the first Wi-Fi node 416 to transceiving a combined signal including the GPS data stream, the Bluetooth data stream, and the 2.4 GHz Wi-Fi data stream on channel 1, associated with the second Wi-Fi node 418 in an embodiment. The dynamic antenna co-existence control system may move the dipole switch 426 from its first state to its second state, effectively coupling the triplexer 452 with the second Wi-Fi node 418, rather than the first Wi-Fi node 416, and causing antenna 4 208 to transceive a combined signal including the GPS data stream associated with the GPS node 412, the Bluetooth data stream associated with the Bluetooth node 424, and a 2.4 GHz Wi-Fi data stream on channel 1, associated with the second Wi-Fi node 418.

As shown in column 822, in order to combine the 5 GHz Wi-Fi data stream on channel 0 associated with the third Wi-Fi node 420 with the GPS data stream associated with the GPS node 412 and the Bluetooth data stream associated with the Bluetooth node 424, the dynamic antenna co-existence control system in an embodiment may move the dipole switch 436 to its second state, and move the dipole switch 442 to its first state, thus coupling the GPS node 412 and the Bluetooth node 424 with the triplexer 452. The dynamic antenna co-existence control system may also direct the dipole switch 428 to operate according to its first state, the dipole switch 434 to operate according to its second state, and the dipole switch 440 to operate according to its second state, as described above with reference to coupling the fourth antenna 208 with only the third Wi-Fi node 420. In an embodiment, the dynamic antenna co-existence control system may then also place the dipole switch 448 in its second state, coupling the triplexer 452 with the third Wi-Fi node 420. In such a way, the triplexer 452 may be coupled with the GPS node 412, the Bluetooth node 424, and the third Wi-Fi node 420 and may combine all three signals into a single data stream for transmission to dipole switch 456, or may receive a combined data stream from dipole switch 456, demultiplex that combined signal, and transmit each of the separated data streams to the appropriate one of the GPS node 412, the Bluetooth node 424, and/or the third Wi-Fi node 420. The dynamic antenna co-existence control system in an embodiment may further place the dipole switch 456 in its first state, place the tripole switch 464 in its first state, and place the dipole switch 462 in its second state, effectively coupling the fourth antenna 208 to the triplexer 452, and causing the fourth antenna 208 to transceive a combined signal including the GPS data stream associated with the GPS node 412, the Bluetooth data stream associated with the Bluetooth node 424, and the 5 GHz Wi-Fi data stream on channel 0, associated with the third Wi-Fi node 420.

As can be seen by comparing columns 822 and 824, only one change in state is required to switch the fourth antenna 208 from transceiving a combined signal including the GPS data stream, the Bluetooth data stream, and the 5 GHz Wi-Fi data stream on channel 0, associated with the third Wi-Fi node 416 to transceiving a combined signal including the GPS data stream, the Bluetooth data stream, and the 5 GHz Wi-Fi data stream on channel 1, associated with the fourth Wi-Fi node 422 in an embodiment. The dynamic antenna co-existence control system may move the dipole switch 428 from its first state to its second state, effectively coupling the triplexer 452 with the fourth Wi-Fi node 422, rather than the third Wi-Fi node 420, and causing antenna 4 208 to transceive a combined signal including the GPS data stream associated with the GPS node 412, the Bluetooth data stream associated with the Bluetooth node 424, and a 5 GHz Wi-Fi data stream on channel 1, associated with the fourth Wi-Fi node 422.

As shown in column 826, in order to combine the LTE data stream associated with the fourth LTE node 410 with the 2.4 GHz Wi-Fi data stream on channel 0 associated with the first Wi-Fi node 416, the GPS data stream associated with the GPS node 412 and the Bluetooth data stream associated with the Bluetooth node 424, the dynamic antenna co-existence control system in an embodiment may move the dipole switch 436 to its second state, and move the dipole switch 442 to its first state, thus coupling the GPS node 412 and the Bluetooth node 424 with the triplexer 452. The dynamic antenna co-existence control system may also direct the dipole switch 426 to operate according to its first state, the dipole switch 432 to operate according to its second state, the dipole switch 434 to operate according to its second state, the dipole switch 440 to operate according to its first state, as described above with reference to coupling the fourth antenna 208 with only the first Wi-Fi node 416. In an embodiment, the dynamic antenna co-existence control system may then also place the dipole switch 448 in its second state, coupling the triplexer 452 with the first Wi-Fi node 416. In such a way, the triplexer 452 may be coupled with the GPS node 412, the Bluetooth node 424, and the first Wi-Fi node 416 and may combine all three signals into a single data stream for transmission to dipole switch 456, or may receive a combined data stream from dipole switch 456, demultiplex that combined signal, and transmit each of the separated data streams to the appropriate one of the GPS node 412, the Bluetooth node 424, and/or the first Wi-Fi node 416. The dynamic antenna co-existence control system in an embodiment may further place the dipole switch 456 in its second state, and place the dipole switch 430 in its second state, effectively coupling the diplexer 458 with both the triplexer 452 and the fourth LTE node 410. In such a way, the diplexer 458 may be coupled with the GPS node 412, the Bluetooth node 424, the first Wi-Fi node 416, and the fourth LTE node 410 and may combine all four signals into a single data stream for transmission to dipole switch 464, or may receive a combined data stream from dipole switch 464, demultiplex that combined signal, and transmit each of the separated data streams to the appropriate one of the GPS node 412, the Bluetooth node 424, the fourth LTE node 410, and/or the first Wi-Fi node 416. The dynamic antenna co-existence control system in an embodiment may then place the tripole switch 464 in its second state and the dipole switch 462 in its second state, effectively coupling the fourth antenna 208 to the diplexer 458, and causing the fourth antenna 208 to transceive a combined signal including the GPS data stream associated with the GPS node 412, the Bluetooth data stream associated with the Bluetooth node 424, the LTE data stream associated with the fourth LTE node 410, and the 2.4 GHz Wi-Fi data stream on channel 0, associated with the first Wi-Fi node 416.

As can be seen by comparing columns 826 and 828, only one change in state is required to switch the fourth antenna 208 from transceiving a combined signal including the GPS data stream, the Bluetooth data stream, the LTE data stream, and the 2.4 GHz Wi-Fi data stream on channel 0, associated with the first Wi-Fi node 416 to transceiving a combined signal including the GPS data stream, the Bluetooth data stream, the LTE data stream and the 2.4 GHz Wi-Fi data stream on channel 1, associated with the second Wi-Fi node 418 in an embodiment. As shown in FIG. 8, the dynamic antenna co-existence control system may move the dipole switch 426 from its first state to its second state, effectively coupling the triplexer 452 with the second Wi-Fi node 418, rather than the first Wi-Fi node 416, and causing antenna 4 208 to transceive a combined signal including the GPS data stream associated with the GPS node 412, the Bluetooth data stream associated with the Bluetooth node 424, the LTE data stream associated with the fourth LTE node 410, and a 2.4 GHz Wi-Fi data stream on channel 1, associated with the second Wi-Fi node 418.

As shown in 830, in order to combine the LTE data stream associated with the fourth LTE node 410 with the 5 GHz Wi-Fi data stream on channel 0 associated with the third Wi-Fi node 420, the GPS data stream associated with the GPS node 412 and the Bluetooth data stream associated with the Bluetooth node 424, the dynamic antenna co-existence control system in an embodiment may move the dipole switch 436 to its second state, and move the dipole switch 442 to its first state, thus coupling the GPS node 412 and the Bluetooth node 424 with the triplexer 452. The dynamic antenna co-existence control system may also direct the dipole switch 428 to operate according to its first state, the dipole switch 434 to operate according to its second state, and the dipole switch 440 to operate according to its second state, as described above with reference to coupling the fourth antenna 208 with only the third Wi-Fi node 420. In an embodiment, the dynamic antenna co-existence control system may then also place the dipole switch 448 in its second state, coupling the triplexer 452 with the first Wi-Fi node 416. In such a way, the triplexer 452 may be coupled with the GPS node 412, the Bluetooth node 424, and the third Wi-Fi node 420 and may combine all three signals into a single data stream for transmission to dipole switch 456, or may receive a combined data stream from dipole switch 456, demultiplex that combined signal, and transmit each of the separated data streams to the appropriate one of the GPS node 412, the Bluetooth node 424, and/or the third Wi-Fi node 420. The dynamic antenna co-existence control system in an embodiment may further place the dipole switch 456 in its second state, and place the dipole switch 430 in its second state, effectively coupling the diplexer 458 with both the triplexer 452 and the fourth LTE node 410. In such a way, the diplexer 458 may be coupled with the GPS node 412, the Bluetooth node 424, the third Wi-Fi node 420, and the fourth LTE node 410 and may combine all four signals into a single data stream for transmission to dipole switch 464, or may receive a combined data stream from dipole switch 464, demultiplex that combined signal, and transmit each of the separated data streams to the appropriate one of the GPS node 412, the Bluetooth node 424, the fourth LTE node 410, and/or the third Wi-Fi node 420. The dynamic antenna co-existence control system in an embodiment may then place the tripole switch 464 in its second state and the dipole switch 462 in its second state, effectively coupling the fourth antenna 208 to the diplexer 458, and causing the fourth antenna 208 to transceive a combined signal including the GPS data stream associated with the GPS node 412, the Bluetooth data stream associated with the Bluetooth node 424, the LTE data stream associated with the fourth LTE node 410, and the 5 GHz Wi-Fi data stream on channel 0, associated with the third Wi-Fi node 420.

As can be seen by comparing columns 830 and 832, only one change in state is required to switch the fourth antenna 208 from transceiving a combined signal including the GPS data stream, the Bluetooth data stream, the LTE data stream, and the 5 GHz Wi-Fi data stream on channel 0, associated with the third Wi-Fi node 416 to transceiving a combined signal including the GPS data stream, the Bluetooth data stream, the LTE data stream, and the 5 GHz Wi-Fi data stream on channel 1, associated with the fourth Wi-Fi node 422 in an embodiment. The dynamic antenna co-existence control system may move the dipole switch 428 from its first state to its second state, effectively coupling the triplexer 452 with the fourth Wi-Fi node 422, rather than the third Wi-Fi node 420, and causing antenna 4 208 to transceive a combined signal including the GPS data stream associated with the GPS node 412, the Bluetooth data stream associated with the Bluetooth node 424, the LTE data stream associated with the fourth LTE node 410, and a 5 GHz Wi-Fi data stream on channel 1, associated with the fourth Wi-Fi node 422.

Figure 9:
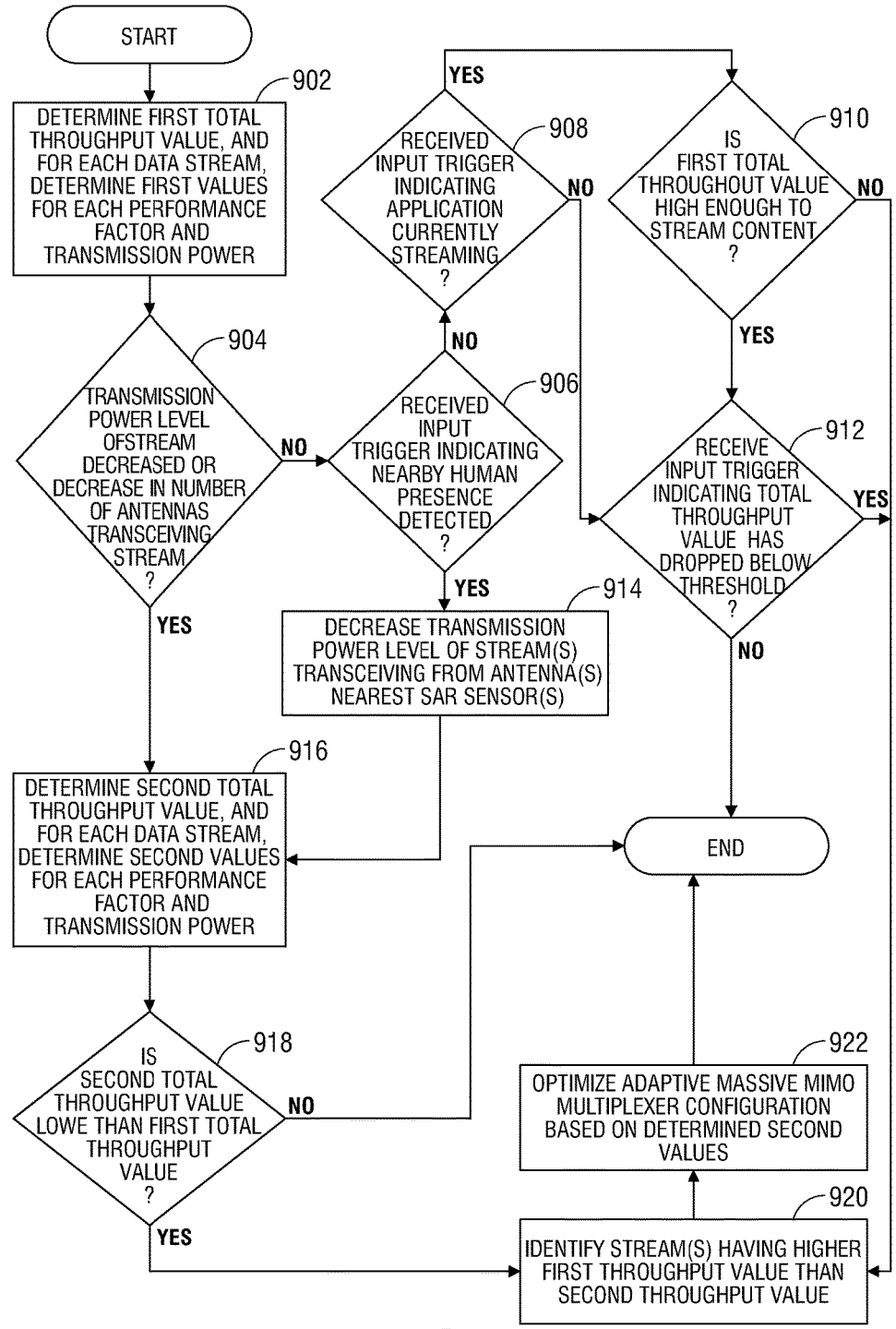
FIG. 9 is a flow diagram illustrating a method of determining when an input trigger requires a change in multiplexer configuration according to an embodiment of the present disclosure.

FIG. 9 is a flow diagram illustrating a method of determining when an input trigger requires a change in multiplexer configuration in order to optimize the adaptive massive MIMO multiplexer configuration according to an embodiment of the present disclosure. As described above, the dynamic antenna co-existence control system in an embodiment may respond to various input triggers that describe the operational and environmental circumstances of the mobile information handling system by determining the best data stream configuration for those particular circumstances. The dynamic antenna co-existence control system in an embodiment may use the method described in FIG. 9 to determine which input triggers are associated with a need to optimize the data stream configuration in order to maximize throughput of the mobile information handling system. In embodiments, a need to optimize the data stream configuration may arise, for example, in three situations: (1) where triggers indicate a high risk of decrease in throughput values measured across all data streams; (2) a decrease in throughput values measured across all data streams, below a pre-stored general throughput value threshold is actually detected; or (3) where throughput values remain steady, but throughput demands increase to an application-specific threshold value the current data stream configuration cannot meet.

At block 902, in an embodiment, the dynamic antenna co-existence control system may determine the first total throughput value, and for each data stream, determine first values for each performance factor and transmission power. The measured first total throughput value may be used later in the method of FIG. 9 to compare against the pre-stored general throughput value threshold described above (indicating throughput has dropped below a minimum threshold requirement), to compare against a second total throughput value measured at a later time in order to detect a decrease in throughput values, or to compare against an application-specific throughput value.

Each data stream in an embodiment may be transmitted alone or in combination with another data stream via one of the four antennas of the mobile information handling system. Certain performance factor values for each data stream in an embodiment may also be measured in order to gauge the signal quality of each individual stream, including throughput, signal to noise ratio (SNR), traffic, and error rate. For example, the dynamic antenna co-existence control system may measure the received signal strength indicator (RSSI) for each of the transceiving data streams to ascertain the signal to noise ratio, the Ec/Io to ascertain the level of traffic, and the packet error rate/bit error rate (PER/BER) to ascertain error rate. Additionally, the dynamic antenna co-existence control system may sum the measured throughputs for each of the transceiving data streams for each type of data stream (e.g. total LTE throughput sums throughput of all LTE data streams, total Wi-Fi throughput sums throughput of all Wi-Fi data streams), and/or may sum the measured throughputs for all transceiving data streams of all types. The dynamic antenna co-existence control system may also measure the transmission power used to transceive each signal. The dynamic antenna co-existence control system in an embodiment may measure these values prior to receipt of any input triggers for comparison to later measured values in order to identify decreases in throughput and other performance factors.

At block 904, in an embodiment, the dynamic antenna co-existence control system in an embodiment may determine, on a stream-by-stream basis, whether the transmission power level of the transceiving stream has decreased, or whether there has been a decrease in the number of antennas transceiving that type of stream (e.g. LTE or Wi-Fi). A drop in transmission power level and/or a decrease in the number of antennas may indicate a high-risk of decrease in throughput, thus potentially triggering a need to reconfigure the adaptive massive MIMO multiplexer.

For example, the dynamic antenna co-existence control system in an embodiment may receive an indication or may directly initiate a change in operating mode of the four antennas, affecting the number of antennas transceiving LTE streams or Wi-Fi streams. With reference to FIG. 6, for example, the adaptive massive MIMO multiplexer in an embodiment may switch from a concurrent cellular 4×4, Wi-Fi 2×2, BT 1×1, GPS 1×1 sub-mode in which antennas 1 through 4 are each transmitting an LTE signal to a concurrent cellular 2×2, Wi-Fi 2×2, BT 1×1, GPS 1×1 sub-mode in which only antennas 1 and 2 are each transmitting an LTE signal. With reference to FIG. 3, as another example, the adaptive massive MIMO multiplexer in an embodiment may switch from a concurrent cellular 4×4 and Wi-Fi 2×2 sub-mode in which antennas 3 and 4 are transmitting both LTE and Wi-Fi streams to a standalone cellular 4×4 MIMO sub-mode in which antennas 3 and 4 transmit only LTE streams. A change in the number of antennas transceiving a type of data stream, or a change in the transmission power of the stream may directly impact the per stream throughput, the per stream type (e.g. Wi-Fi or LTE), and/or the total throughput of the mobile information handling system. If the dynamic antenna coexistence control system detects a decrease in transmission power level or a decrease in the number of antennas transceiving a given stream, the method may proceed to block 910. If the dynamic antenna coexistence control system does not detect a decrease in transmission power level or a decrease in the number of antennas transceiving a given stream, the method may proceed to block 906.

As shown in FIG. 9 at block 906, if the dynamic antenna coexistence control system does not detect a decrease in transmission power level or a decrease in the number of antennas transceiving a given stream, it may then be determined whether an input trigger has been detected indicating a nearby human presence has been detected. Detection of a nearby human presence may prompt a decrease in transmission power level of one or more transceiving antennas, thus potentially decreasing total throughput. Federal regulations may require transmission power levels for an antenna to fall within a specified range when operating nearby a human body part in order to ensure the human body part is exposed to a specific absorption rate (SAR) that falls within regulations. A SAR sensor may be operatively connected to the dynamic antenna coexistence control system in an embodiment, and may be capable of detecting a nearby human body part, triggering a need to keep the transmitting power of any antenna nearby the human body part within the federally mandated range. In such a scenario, the SAR sensor may transmit an indication to the dynamic antenna coexistence control system to reduce the transmission power of one or more of antennas 1 through 4. If the dynamic antenna coexistence control system receives an indication that a nearby human presence has been detected in an embodiment, the method may proceed to block 914. If the dynamic antenna coexistence control system does not receive an indication that a nearby human presence has been detected in an embodiment, the method may proceed to block 908.

At block 908, in an embodiment, if the dynamic antenna coexistence control system does not receive an indication that a nearby human presence has been detected in an embodiment, it may be determined whether an input trigger has been received indicating an application of the mobile information handling system is currently streaming data content. If an application is currently streaming content, this may indicate a need for increased or above average throughput, because streaming applications require higher throughput values in order to perform properly. Each streaming application available on the mobile information handling system may be associated with a preset application-specific throughput threshold value. The preset application-specific throughput threshold value in an embodiment may be the same value for all streaming applications, or each application may be associated with a separate preset throughput threshold value. If the dynamic antenna coexistence control system in an embodiment determines an input trigger has been received indicating an application is currently streaming, the method may proceed to block 910. If the dynamic antenna coexistence control system in an embodiment determines an input trigger has not been received indicating an application is currently streaming, the method may proceed to block 912.

At block 910, in an embodiment, if the dynamic antenna coexistence control system determines an input trigger has been received indicating an application is currently streaming, it may be determined whether the first measured total throughput value meets the preset throughput threshold value associated with that streaming application, indicating the throughput is high enough to successfully stream the content. As described above, applications streaming content may only operate properly if throughput values are at are above a threshold value. Each application may be associated with a preset threshold throughput value stored in main memory and accessible by the dynamic antenna coexistence control system. Upon notification that an application is currently streaming, the dynamic antenna coexistence control system in an embodiment may compare the preset threshold throughput value associated with that application with the first measured total throughput values measured at block 902 to determine whether the measured values reach or exceed the required preset threshold throughput value. If the dynamic antenna coexistence control system in an embodiment determines the first total throughput value is not high enough to stream the current content, the method may proceed to block 920. If the dynamic antenna coexistence control system in an embodiment determines the first total throughput value is high enough to stream the current content, the method may proceed to block 912.

At block 912, in an embodiment, it may be determined whether an input trigger has been received indicating the total throughput value does not currently meet a preset general throughput value. As described above, a need to optimize the data stream configuration may arise, for example, where a decrease in throughput values measured across all data streams is below a preset general throughput value threshold, even if an application-specific preset throughput threshold value is not currently in effect (e.g. if the answer to block 910 is yes). For example, the dynamic antenna coexistence control system may have access to a preset overall threshold throughput value stored in memory. The preset overall threshold throughput value may indicate the total throughput value below which the dynamic antenna coexistence control system will automatically attempt to reconfigure the data streams to achieve a higher throughput. This value may be preset at the factory, or may be configurable by the user of the mobile information handling system. If the dynamic antenna coexistence control system in an embodiment determines an input trigger has been received indicating the total throughput value has dropped below the preset overall threshold throughput value, the method may proceed to block 920. If the dynamic antenna coexistence control system in an embodiment determines an input trigger has not been received indicating the total throughput value has dropped below the preset overall threshold throughput value, the dynamic antenna coexistence control system may determine a reconfiguration of the transceiving data streams is not necessary and the method may end.

Returning to block 914, if the dynamic antenna coexistence control system receives an indication that a nearby human presence has been detected in an embodiment, the dynamic antenna coexistence control system may decrease the transmission power level of the stream or streams transceiving from the antenna or antennas located nearest the SAR sensor that originated the indication. As described above, the detection of a nearby human body part may indicate the need to reduce transmission power of the one or more antennas nearest the SAR sensor in order to comply with federal guidelines. As also mentioned above, decreasing transmission power level of one or more data streams may cause a coincident decrease in overall throughput.

At block 916, if the transmission power level has been decreased, or if the number of antennas transceiving a type of data stream has decreased (e.g. due to the SAR requirements described with reference to block 914 or as detected at block 904), the dynamic antenna coexistence control system in an embodiment may determine second total throughput value, and for each data stream, determine second values for each performance factor and transmission power. As described above, a need to optimize the data stream configuration may arise, for example, where triggers indicate a high risk of decrease in throughput values measured across all data streams. Trigger inputs indicating high risk of decrease in throughput values include, but are not limited to a decrease in transmission power level and/or a decrease in the number of antennas transceiving one or more data streams. Detection of either of these triggers in an embodiment may prompt the dynamic antenna coexistence control system to take a second measurement, following detection of these triggers, of the total throughput value. By testing the throughput value following receipt of these triggers, the dynamic antenna coexistence control system in an embodiment may determine whether the detected decrease in transmission power or decrease in the number of antennas transceiving a given data stream actually caused the total throughput to decrease.

Certain performance factor values for each data stream in an embodiment may be measured in order to gauge the signal quality of each individual stream following receipt of one of the above described triggers, including throughput, signal to noise ratio (SNR), traffic, and error rate. The dynamic antenna co-existence control system in an embodiment may measure these values following receipt of any input triggers for comparison to the earlier measured values in order to identify decreases in throughput and other performance factors.

At block 918, the dynamic antenna coexistence control system in an embodiment may determine whether the second total throughput value is lower than the first total throughput value. As described above, the dynamic antenna co-existence control system may sum the measured throughputs for each of the transceiving data streams for each type of data stream (e.g. total LTE throughput sums throughput of all LTE data streams, total Wi-Fi throughput sums throughput of all Wi-Fi data streams), and/or may sum the measured throughputs for all transceiving data streams of all types. The total throughput value across all LTE and Wi-Fi data streams in an embodiment may serve as a rough estimate of the total amount of data coming and going from the mobile information handling system over time. If this total throughput value decreases (e.g. due to power reduction or reduction in number of antennas transceiving a given data stream), the dynamic antenna coexistence control system in an embodiment may need to reconfigure the adaptive massive MIMO multiplexer to transceive a different combination of streams in order to optimize the total throughput. If the dynamic antenna coexistence control system in an embodiment determines the second total throughput value is lower than the first total throughput value, indicating a drop in the amount of data coming and going from the mobile information handling system over time (e.g. slower communication), the method may proceed to block 920. If the dynamic antenna coexistence control system in an embodiment determines the second total throughput value is not lower than the first total throughput value, indicating no drop in the amount of data coming and going from the mobile information handling system over time (e.g. faster communication, or communication at the same rate), a reconfiguration of the adaptive massive MIMO multiplexer may not be necessary, and the method may end.

At block 920, in an embodiment, the dynamic antenna coexistence control system may identify the data stream or data streams that have a higher first throughput value than second throughput value. By identifying the data stream or streams that have a higher first throughput value than second, the dynamic antenna coexistence control system in an embodiment may identify which of the data streams may be attributed to the drop in overall throughput, which may assist in finding a more optimal adaptive massive MIMO multiplexer configuration, as described in greater detail below. A drop in total throughput in an embodiment may be caused by a drop in throughput on only one data stream, a drop in throughput across all data streams, and/or a drop in throughput across one or more data streams of a certain type (e.g. Wi-Fi, cellular). For example, if the transmission power across all antennas were reduced, the dynamic antenna coexistence control system may identify a drop in throughput of all data streams. As another example, if the number of antennas transmitting cellular data streams were reduced from four to two, the dynamic antenna coexistence control system may identify a drop in throughput of all cellular data streams. As yet another example, if the number of antennas transmitting cellular data streams were reduced from four to two, but the number of antennas transmitting Wi-Fi data streams were increased from zero to two, the dynamic antenna coexistence control system in an embodiment may detect a drop in the throughput on cellular data streams, but an increase in the total throughput across all data streams (e.g. if the Wi-Fi signals were stronger than the available cellular signals).

At block 924, the dynamic antenna coexistence control system in an embodiment may optimize the adaptive massive MIMO multiplexer configuration based on the determined second values. The indication that the second throughput values are lower than the first throughput values, determination that the current throughput value is not high enough to successfully stream desired content, or receipt of an indication that the total throughput value has dropped below a preset threshold value may all indicate a need to change the data stream configuration, and thus reconfigure the adaptive massive MIMO multiplexer. Each of these scenarios in an embodiment may indicate a need to increase throughput, which may be achieved by rerouting resources away from transmission of lower performing data streams to transmission of higher performing data streams. As several different configurations for the adaptive massive MIMO multiplexer and data streams transceived are available, the dynamic antenna coexistence control system may gather information regarding the performance factors associated with each of the current data streams, as described above with reference to block 918, and based on these measurements, may identify the optimal data stream configuration for that specific scenario, according to embodiments herein.

Figure 10A:
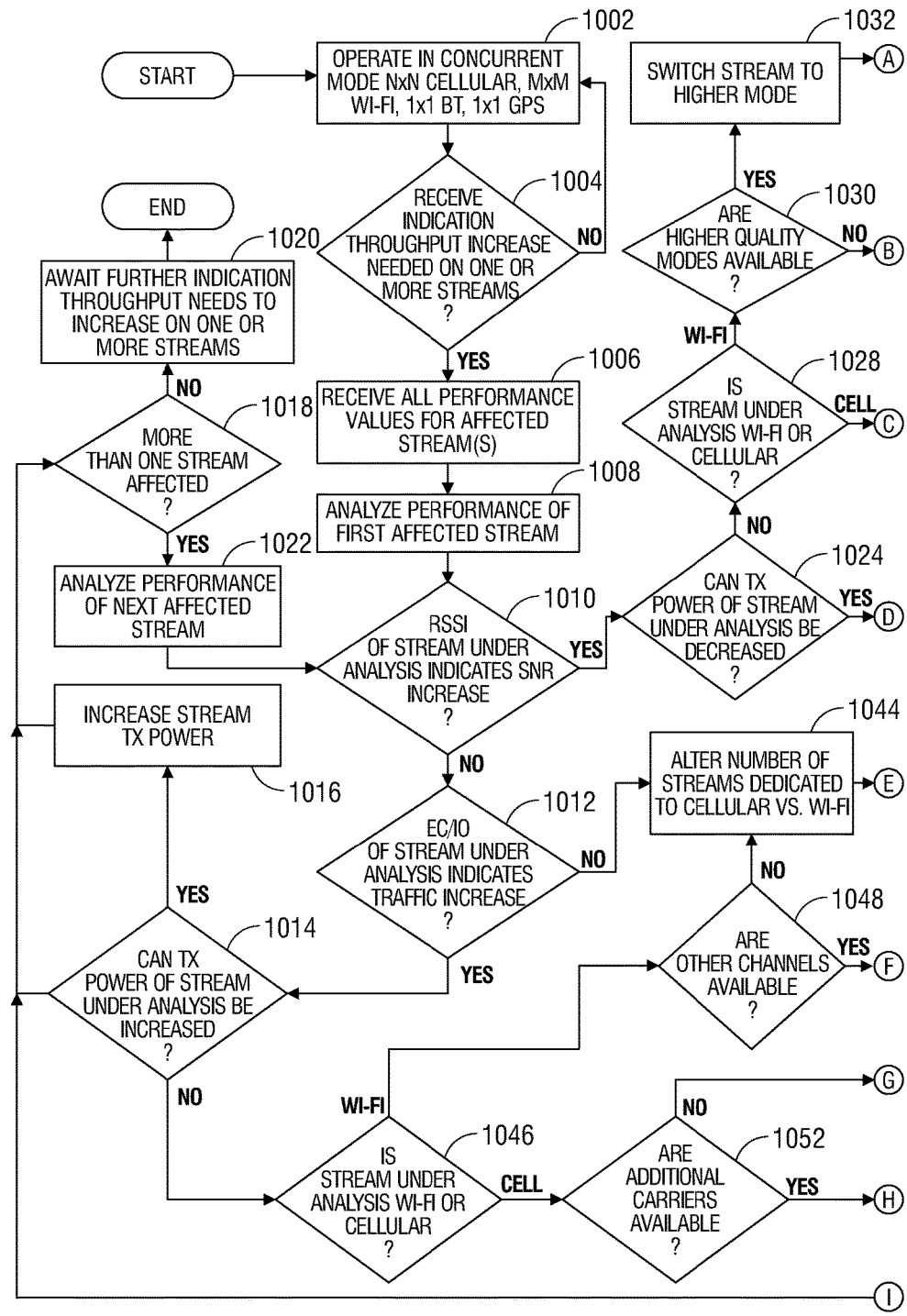
FIG. 10A is a flow diagram illustrating a first portion of a method of optimizing data stream configuration according to an embodiment of the present disclosure.

FIG. 10A is a flow diagram illustrating a first portion of a method of optimizing data stream configuration to increase total throughput across all data streams according to an embodiment of the present disclosure. At block 1002, in an embodiment, the dynamic antenna coexistence control system may direct the adaptive massive MIMO multiplexer to operate in a concurrent mode including N×N cellular, M×M Wi-Fi, 1×1 GPS and 1×1 Bluetooth data streams. For example, if N=4, and M=2, the adaptive massive MIMO multiplexer may operate in the concurrent cellular 4×4, Wi-Fi 2×2, GPS 1×1, and Bluetooth 1×1 sub-mode. As another example, if N=3, and M=2, the adaptive massive MIMO multiplexer may operate in the concurrent cellular 3×3, Wi-Fi 2×2, GPS 1×1, and Bluetooth 1×1 sub-mode. As yet another example, if N=2, and M=2, the adaptive massive MIMO multiplexer may operate in the concurrent cellular 2×2, Wi-Fi 2×2, GPS 1×1, and Bluetooth 1×1 sub-mode.

At block 1004 in an embodiment, the dynamic antenna coexistence control system may determine whether an indication of a need to increase throughput on one or more identified streams has been received. As described above, determination that current throughput does not meet a threshold requirement, and/or determination that throughput has decreased may indicate the data stream configuration may need to be optimized to increase throughput. In order to increase throughput, the dynamic antenna coexistence control system in an embodiment may measure current performance factors for each data stream in order to determine where to devote resources (e.g. to the higher performing data streams), and may identify the data stream or data streams that have a experienced a decrease in throughput. If the dynamic antenna coexistence control system in an embodiment has not received an indication that throughput needs to increase on one or more streams, reconfiguration of the data streams may not be necessary, and the method may return to block 1002. The dynamic antenna coexistence control system may continuously monitor alteration to throughput in some embodiments. If the dynamic antenna coexistence control system in an embodiment has received an indication that throughput needs to increase on one or more streams, the method may proceed to block 1006.

At block 1006, in an embodiment, the dynamic antenna coexistence control system may receive all performance values for the affected streams. As described above, the dynamic antenna coexistence control system in an embodiment may have measured the performance factor values prior to any indication that throughput needs to increase. By measuring the performance factor values after receiving such an indication, the dynamic antenna coexistence control system in an embodiment may compare the prior values to the current values in order to determine a potential cause for a decrease in throughput, or to identify which data streams are higher performing so that more resources may be directed there. For example, if performance factors across all cellular streams indicated low throughput, but performance factors across Wi-Fi data streams indicated high throughput, the dynamic antenna coexistence control system in an embodiment may determine the current operational characteristics of the mobile information handling system to be more conducive to Wi-Fi communication than cellular communication, and divert more resources to Wi-Fi data streams than cellular. Performance factor values in embodiments may include, but may not be limited to traffic levels, signal-to-noise ratios (SNR), transmission power levels, number of cellular carriers, mode of Wi-Fi transmission, and bandwidth of cellular transmission.

At block 1008, the dynamic antenna coexistence control system in an embodiment may analyze performance of the first affected data stream. As described above, if a decrease in throughput is detected, indicating a need to increase throughput, the total decrease in throughput could be caused by drops in throughput in only one or across multiple separate data streams. Decreases in throughput for one type of data stream may be solved by a different reconfiguration than that chosen to solve a drop in throughput in another type of data stream. Thus, the dynamic antenna coexistence control system in an embodiment may analyze each affected data stream in turn.

At block 1010, the dynamic antenna coexistence control system in an embodiment may determine whether the RSSI of the stream under analysis indicates an increase in signal to noise ratio (SNR). An increase in signal to noise ratio may be associated with an increase in transmission power, as well as a decrease in throughput. If the decrease in throughput is caused by an increase in signal to noise ratio, the RSSI of the stream under analysis should indicate such. This may lead the dynamic antenna coexistence control system to identify solutions known to decrease the signal to noise ratio as potential solutions to the need to increase throughput. If the RSSI of the stream under analysis indicates an increase in SNR, the method may proceed to block 1024. If the RSSI of the stream under analysis does not indicate an increase in SNR, the need to increase throughput may be attributable to a performance factor other than SNR, and the method may proceed to block 1012.

With no increase in SNR, at block 1012, the dynamic antenna coexistence control system in an embodiment may determine whether the Ec/Io of the stream under analysis indicates an increase in traffic. An increase in traffic may be associated with a decrease in throughput. If the decrease in throughput is caused by an increase in traffic, the Ec/IO of the stream under analysis should indicate such. This may lead the dynamic antenna coexistence control system to identify solutions known to decrease traffic as potential solutions to the need to increase throughput. If the Ec/Io of the stream under analysis indicates an increase in traffic, the method may proceed to block 1014. If the Ec/Io of the stream under analysis does not indicate an increase in traffic, this may indicate the drop in throughput is not easily attributed to only one performance factor, and the method may proceed to block 1044.

With an increase in traffic, at block 1014, the dynamic antenna coexistence control system in an embodiment may determine whether the transmission power of the stream under analysis can be increased. As described above, if the Ec/Io of the stream under analysis indicates higher traffic, the drop in throughput may be attributable to this increased traffic. One solution to increased traffic is to increase the transmitting power of that data stream. However, increasing transmitting power may also have unintended consequences, or may not be a viable option given current power levels of the mobile information handling system. For example, if the mobile information handling system is currently operating according to a low power mode, or an SAR sensor has detected a human body part nearby the transmitting antenna, increasing transmitting power may not be an option. As another example, increasing transmitting power may also increase the signal to noise ratio of the data stream. In an embodiment, the dynamic antenna coexistence control system may only consider increasing the transmitting power of the data stream if the RSSI of the data stream (indicating signal to noise ratio) is also below a preset threshold value. If increasing the transmitting power of the antenna transmitting the data stream is a viable option in an embodiment, the method may proceed to block 1016. If increasing the transmitting power of the antenna transmitting the data stream is not a viable option in an embodiment, the method may proceed to block 1046.

At block 1016, if increasing the transmitting power of the antenna transmitting the data stream is a viable option in an embodiment, the dynamic antenna coexistence control system may generate an instruction to increase the transmission power of the antenna transmitting the data stream under analysis. As described above, multiple data streams may be involved in the drop of total throughput, and the solution to the drop in throughput across one data stream may conflict with the solution to the drop in throughput across another. As such, the dynamic antenna coexistence control system in an embodiment may determine an optimal configuration for all data streams, based on receipt of one or more instructions generated as a solution to a drop in throughput detected across a single data stream. The instruction of block 1016 to increase the transmission power of the antenna transmitting the data stream under analysis is an example of a solution to a drop in throughput detected across a single data stream.

At block 1018, the dynamic antenna coexistence control system in an embodiment may determine whether more than one stream has been affected, resulting in the identified drop in total throughput. If only one data stream has been affected, employing the potential solution for that single data stream may be the best way to increase throughput. If more than one data stream has been affected, the dynamic antenna coexistence control system in an embodiment may need to employ a more nuanced reconfiguration of all data streams to increase throughput. If only one data stream has been affected by a decrease in throughput, the method may proceed to block 1020. If more than one data stream has been affected by a decrease in throughput, the method may proceed to block 1022.

At block 1020, if only one data stream has been affected by a decrease in throughput, the dynamic antenna coexistence control system in an embodiment may await further indication throughput needs to increase on one or more streams. As described above, if only one data stream has been affected, employing the potential solution for that single data stream may be the best way to increase throughput. For example, if only one data stream has been affected, and the dynamic antenna coexistence control system determines at block 1016 a need to increase the data stream transmission power for the only affected data stream, this increase in transmission power may be the best possible solution to the drop in throughput. Thus, having already made that determination at block 1016, the dynamic antenna coexistence control system in an embodiment may conclude no further reconfiguration of the data streams is necessary and await further indication that other reconfigurations may be needed. The method may then end in some embodiments.

At block 1022, if more than one data stream has been affected by a decrease in throughput, the dynamic antenna coexistence control system may analyze performance of the next affected stream. As described above, if more than one data stream has been affected, the dynamic antenna coexistence control system in an embodiment may need to employ a more nuanced reconfiguration of all data streams to increase throughput, which may require analysis of the performance factor values for each of the streams. Upon moving to the next affected stream in an embodiment, the method may proceed back to block 1010 for further analysis.

Returning to block 1024, if the dynamic antenna coexistence control system determines at block 1010 that the RSSI of the stream under analysis indicates the signal to noise ratio has increased, the dynamic antenna coexistence control system in an embodiment may determine whether the transmission power of the stream under analysis can be decreased. Decreasing transmission power of a data stream may cause an increase in traffic issues, and ultimately a drop in throughput. As a consequence, the dynamic antenna coexistence control system in an embodiment may only consider decreasing the transmission power of the affected data stream if the traffic values for the data stream also meet a preset threshold requirement. If the dynamic antenna coexistence control system in an embodiment determines the transmission power of the stream under analysis may be decreased (e.g., doing so would not decrease the throughput of that data stream below the preset threshold requirement), the method may proceed to block 1026 of FIG. 10B. If the dynamic antenna coexistence control system in an embodiment determines the transmission power of the stream under analysis may not be decreased, the method may proceed to block 1028.

At block 1028, the dynamic antenna coexistence control system in an embodiment may determine whether the data stream under analysis is a Wi-Fi or cellular stream. Differing potential solutions to a need to increase throughput may be available dependent upon whether the data stream under analysis is a Wi-Fi stream or a cellular stream. If the data stream under analysis is a Wi-Fi stream, the method may proceed to block 1030. If the data stream under analysis is a cellular stream, the method may proceed to block 1040 of FIG. 10B.

At block 1030, the dynamic antenna coexistence control system in an embodiment may determine whether Wi-Fi modes of a higher quality than the current mode of the affected stream are available. Each Wi-Fi mode is associated with a different wireless Internet protocol standard. For example, known Wi-Fi modes include, but are not limited to IEEE 802.11a-g (the oldest standards), IEEE 802.11n, IEEE 802.11ac, and IEEE 802.11ax (the currently newest standard). Each new standard provides further capabilities than the preceding standard, as they are released. For example, the IEEE 802.11ac standard allows Wi-Fi access points adhering to this standard to transceive on one of two channels for each frequency, whereas older standards only allowed transceiving on one channel per frequency. In addition, IEEE 802.11ac uses higher quality modulation schemes that make it ideal for use in urban areas with a high density of Wi-Fi access points. Further, traffic or proximity on Wi-Fi access points in the vicinity may provide for other, better Wi-Fi mode options. These may be higher or lower modes in various embodiments, but may be streams with better wireless connectivity in some modes or others. If the dynamic antenna configuration control system in an embodiment determines higher quality Wi-Fi modes are available, the method may proceed to block 1032. If the dynamic antenna configuration control system in an embodiment determines higher quality Wi-Fi modes are not available, the method may proceed to block 1034 of FIG. 10B.

At block 1032, in an embodiment, if the dynamic antenna configuration control system in an embodiment determines higher quality Wi-Fi modes are available, the dynamic antenna coexistence control system in an embodiment may generate an instruction to switch the affected data stream to the alternate available Wi-Fi mode. For example, if the current Wi-Fi data stream under analysis is operating according to Wi-Fi g or n modes and it is determined Wi-Fi modes ac or ax are available and improved, the dynamic antenna coexistence control system in an embodiment may generate an instruction to switch the affected data stream to the higher level ac or ax Wi-Fi mode. The dynamic antenna coexistence control system in an embodiment may later determine an optimal configuration for all data streams, based on receipt of the instruction to switch the affected data stream to the available higher Wi-Fi mode, generated as a solution to a drop in throughput detected across a single data stream. The method may then proceed back to block 1018, to determine if other wireless data streams are to be assessed.

Returning to block 1044, if the dynamic antenna coexistence control system in an embodiment determines the Ec/Io of the stream under analysis indicates the traffic has not increased at 1012, the dynamic antenna coexistence control system may generate an instruction to alter the number of streams dedicated to cellular vs. Wi-Fi. As described above, if the Ec/Io of the stream under analysis does not indicate an increase in traffic, this may indicate the drop in throughput is not easily attributed to only one performance factor, and the dynamic antenna coexistence control system may determine the most optimal solution is to dedicate fewer resources to the Wi-Fi data streams, and more resources to the cellular data streams, or vice versa, as described in greater detail with respect to block 1038. The method may then proceed back to block 1018, to determine if other wireless streams are to be assessed.

At block 1046, if the dynamic antenna coexistence control system identifies increased traffic on the stream under analysis at 1012 and determines the transmission power of that stream cannot be increased at 1014, the dynamic antenna coexistence control system may determine whether the stream under analysis is a Wi-Fi or cellular stream. Differing potential solutions to a need to increase throughput may be available dependent upon whether the data stream under analysis is a Wi-Fi stream or a cellular stream. If the data stream under analysis is a Wi-Fi stream, the method may proceed to block 1048. If the data stream under analysis is a cellular stream, the method may proceed to block 1052.

At block 1048, if the data stream under analysis is a Wi-Fi data stream, the dynamic antenna coexistence control system in an embodiment may determine whether other Wi-Fi channels are available. As described above, changing channels may decrease impacts of high traffic values, or high signal to noise ratio, and may consequently increase throughput on the affected channel. However, multiple channels are not always available. If the dynamic antenna coexistence control system in an embodiment determines other channels are not available, the method may proceed to block 1044, and the dynamic antenna coexistence control system may generate an instruction to alter the number of streams dedicated to cellular vs. Wi-Fi. If the dynamic antenna coexistence control system in an embodiment determines other channels are available, the method may proceed to block 1050 of FIG. 10B.

At block 1052, if the stream under analysis is a cellular signal, as determined at 1046, the dynamic antenna coexistence control system in an embodiment may determine whether additional cellular carriers are available. The number of carriers available may depend upon the type of cellular signals and base stations in the mobile information handling system's coverage area are capable of transceiving (e.g. GSM, CDMA, LTE, etc.), or upon the current data stream configuration in which the adaptive massive MIMO multiplexer is operating. For example, if the adaptive massive MIMO multiplexer is operating in concurrent 3×3 cellular, 2×2 Wi-Fi, 1×1 GPS, 1×1 BT, only one carrier is supported, and other carriers would not be available without changing the data stream configuration of the adaptive massive MIMO multiplexer. If additional carriers for the stream under analysis are not available, the method may proceed to block 1056 of FIG. 10B. If additional carriers for the stream under analysis are available, the method may proceed to block 1054 of FIG. 10B.

Figure 10B:
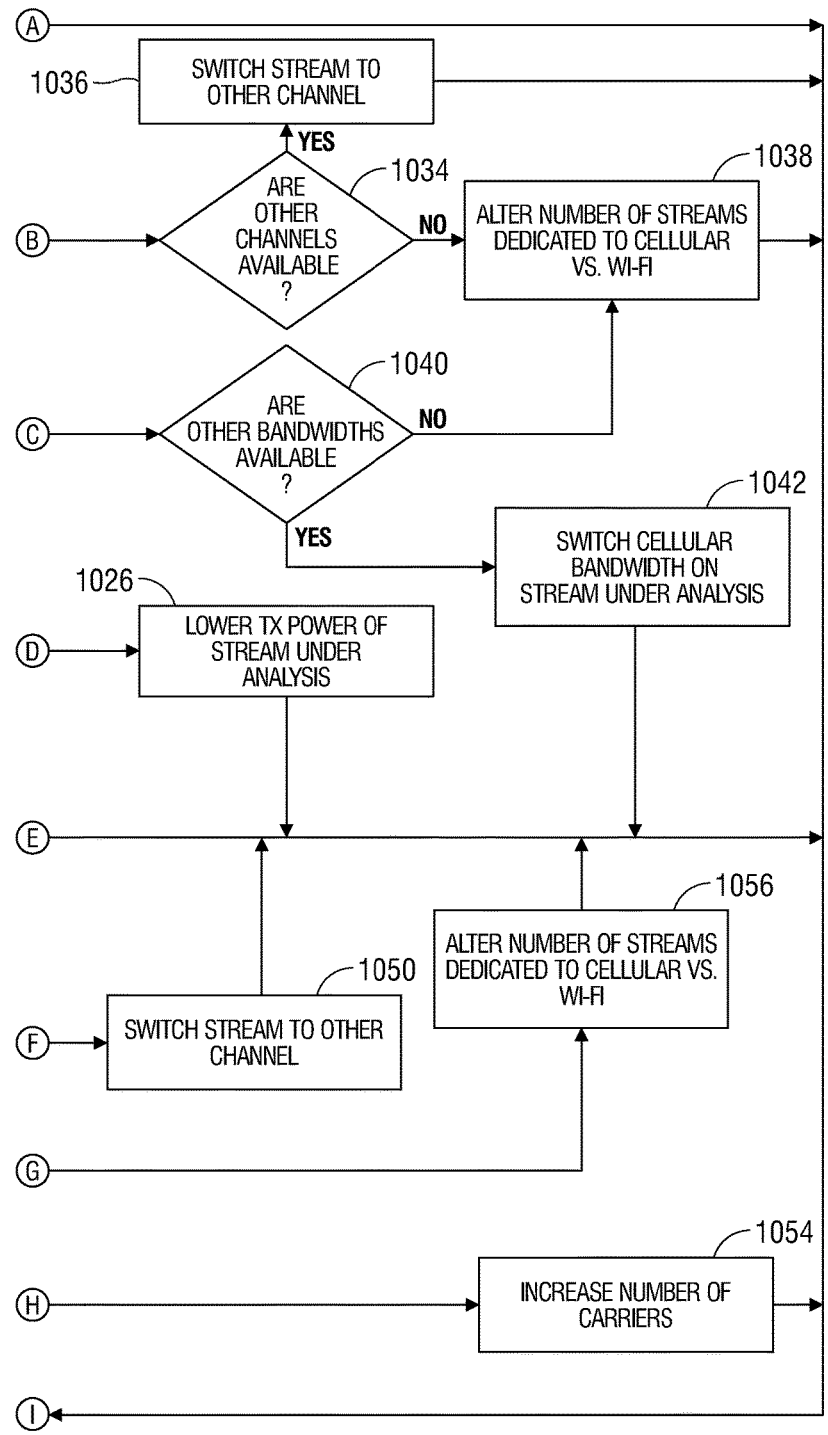
FIG. 10B is a flow diagram illustrating a second portion of a method of optimizing data stream configuration according to an embodiment of the present disclosure.

FIG. 10B is a flow diagram illustrating a second portion of a method of optimizing data stream configuration to increase total throughput across all data streams according to an embodiment of the present disclosure. At block 1026, if the transmission power of the stream under analysis can be decreased (e.g. as established at block 1024 of FIG. 10A), the dynamic antenna coexistence control system in an embodiment may generate an instruction to lower the transmission power of the stream under analysis. As described above, if only one data stream has been affected, employing the potential solution for that single data stream may be the best way to increase throughput. As described above, multiple data streams may be involved in the drop of total throughput, and the solution to the drop in throughput across one data stream may conflict with the solution to the drop in throughput across another. As such, the dynamic antenna coexistence control system in an embodiment may determine an optimal configuration for all data streams, based on receipt of one or more instructions generated as a solution to a drop in throughput detected across a single data stream. The instruction of block 1026 to decrease the data stream transmission power for the only affected data stream is an example of a solution to a drop in throughput detected across a single data stream. The method may then proceed to block 1018 of FIG. 10A to assess if any other data streams must be analyzed.

At block 1034, in an embodiment, if the dynamic antenna coexistence control system in an embodiment determines higher quality Wi-Fi modes are not available (e.g. as established at block 1030 of FIG. 10A), the dynamic antenna coexistence control system may determine whether other, better Wi-Fi channels are available. For example, if the affected data stream is a 2.4 GHz Wi-Fi stream operating on channel 1, the dynamic antenna coexistence control system in an embodiment may determine whether channel 0 is available at the 2.4 GHz frequency. Changing channels may decrease impacts of high traffic values, or high signal to noise ratio, and may consequently increase throughput on the affected channel. However, multiple channels are not always available. For example, Wi-Fi modes g and n do not support multiple channels, while Wi-Fi modes ac and higher do. Thus, if the Wi-Fi access point with which the mobile information handling system is communicating does not support mode ac or higher, multiple channels may not be available. If the dynamic antenna coexistence control system in an embodiment determines that multiple Wi-Fi channels are available, the method may proceed to block 1036. If the dynamic antenna coexistence control system in an embodiment determines that multiple Wi-Fi channels are not available, the method may proceed to block 1038.

At block 1036 in an embodiment, if the dynamic antenna coexistence control system in an embodiment determines that multiple Wi-Fi channels are available (e.g. as established at block 1034 of FIG. 10B), the dynamic antenna coexistence control system may generate an instruction to switch the affected Wi-Fi stream to another channel on the same frequency. For example, if the data stream under analysis is a 2.4 GHz Wi-Fi data stream on channel 1, and it is determined channel 0 is available on the 2.4 GHz frequency, the dynamic antenna coexistence control system in an embodiment may generate an instruction to switch from channel 1 to channel 0 on the 2.4 GHz frequency. The dynamic antenna coexistence control system in an embodiment may later determine an optimal configuration for all data streams, based on receipt of the instruction to switch the affected Wi-Fi stream to another channel on the same frequency, generated as a solution to a drop in throughput detected across a single data stream. The method may then proceed back to block 1018 of FIG. 10A, to assess other streams if necessary.

At block 1038 in an embodiment, if the dynamic antenna coexistence control system in an embodiment determines that multiple Wi-Fi channels are not available (e.g. as established at block 1034 of FIG. 10B), the dynamic antenna coexistence control system in an embodiment may generate an instruction to alter the number of streams dedicated to cellular vs. Wi-Fi signals. If the dynamic antenna coexistence control system in an embodiment has determined the affected signal is a Wi-Fi signal, and has identified that each of the potential solutions for a decrease in throughput for a Wi-Fi signal are either unavailable or unlikely to solve the problem, the dynamic antenna coexistence control system may determine the most optimal solution is to dedicate fewer resources to the Wi-Fi data streams, and more resources to the cellular data streams. For example, if the adaptive massive MIMO multiplexer is operating in concurrent 2×2 cellular, 2×2 Wi-Fi, 1×1 BT, and 1×1 GPS sub-mode, and the dynamic antenna coexistence control system determines a decrease in throughput in one or both of the Wi-Fi data streams that cannot be easily corrected, the dynamic antenna coexistence control system may direct the adaptive massive MIMO multiplexer to operate in a stand-alone 4×4 cellular sub-mode. By moving to standalone mode, the adaptive massive MIMO multiplexer in such an embodiment may dedicate all transmission power of all four antennas to transceiving cellular signals (which presumably have higher performance factors than the underperforming Wi-Fi data streams), and may increase total throughput. The method may then proceed back to block 1018 of FIG. 10A, to assess other streams if necessary.

As another example, if the adaptive massive MIMO multiplexer is operating in concurrent 4×4 cellular, 2×2 Wi-Fi, 1×1 BT, and 1×1 GPS sub-mode, and the dynamic antenna coexistence control system determines a decrease in throughput in one or more of the cellular data streams that cannot be easily corrected, the dynamic antenna coexistence control system may direct the adaptive massive MIMO multiplexer to operate in the concurrent 4×4 cellular, 2×2 Wi-Fi, 1×1 BT, and 1×1 GPS sub-mode or in the standalone 2×2 Wi-Fi sub-mode. By moving to the concurrent 4×4 cellular, 2×2 Wi-Fi, 1×1 BT, and 1×1 GPS sub-mode or to standalone mode, the adaptive massive MIMO multiplexer in such an embodiment may dedicate fewer antennas to transceiving cellular signals (which presumably have lower performance factors than the Wi-Fi data streams), and may increase total throughput. The method may then proceed back to block 1018 of FIG. 10A, to assess other streams if necessary.

Returning to block 1040, if the stream under analysis is cellular, instead of Wi-Fi as determined at 1028 of FIG. 10A, the dynamic antenna coexistence control system in an embodiment may determine whether bandwidths other than the one in which the affected streams is currently transmitting are available. Different cellular bandwidths may experience higher or lower levels of signal to noise ratios at varying times. However, the availability of varying bandwidths may also vary. For example, some areas may only provide coverage in lower bandwidths associated with older cellular standards. Additionally, the bandwidths the antennas are capable of transceiving on may depend upon the mode in which the adaptive massive MIMO multiplexer is currently set. For example, if the adaptive massive MIMO multiplexer is operating in concurrent cellular 3×3, Wi-Fi 2×2, Bluetooth 1×1, GPS 1×1 sub-mode, the antennas are capable of only transceiving in the high and unlicensed LTE bandwidths. If the dynamic antenna coexistence control system in an embodiment determines other bandwidths are not available, either due to a lack in coverage or because a change in data stream configuration would be required, the method may proceed to block 1038, and the dynamic antenna coexistence control system may generate an instruction to alter the number of streams dedicated to cellular vs. Wi-Fi signals. If the dynamic antenna coexistence control system in an embodiment determines other bandwidths are available, the method may proceed to block 1042.

At block 1042, if the dynamic antenna coexistence control system in an embodiment determines other bandwidths are available (e.g. as established at block 1040 of FIG. 10B), the dynamic antenna coexistence control system may determine a need to switch cellular bandwidth on the stream under analysis. For example, if the data stream under analysis is currently transceiving in the unlicensed LTE-U bandwidth, and a high band HB LTE bandwidth is available, the dynamic antenna coexistence control system in an embodiment may determine a need to switch the data stream under analysis to the HB LTE bandwidth in order to increase throughput. The method may then proceed back to block 1018 of FIG. 10A to determine if other wireless streams are to be assessed.

At block 1050, if the Wi-Fi channels other than the one on which the affected data stream is transmitting are available (e.g. as established at block 1048 of FIG. 10A), the dynamic antenna coexistence control system in an embodiment may determine a need to switch the affected stream to the other available channel. For example, if the affected data stream is a 5 GHz Wi-Fi stream transmitting on channel 1 and channel 0 is available on the 5 GHz frequency, the dynamic antenna coexistence control system in an embodiment may determine a need to change the 5 GHz affected Wi-Fi stream over to channel 0 in an effort to increase throughput. The method may then proceed back to block 1018 of FIG. 10A.

At block 1054, if other carriers are available for the cellular stream affected (e.g. as established at block 1052 of FIG. 10A), the dynamic antenna coexistence control system in an embodiment may generate an instruction to increase the number of carriers on an affected cellular stream. Increasing carriers on a cellular stream may solve problems with traffic and increase throughput. For example, if the affected cellular data stream is transceiving with only two carriers, and up to five are available, the dynamic antenna coexistence control system may generate an instruction to increase the number of carriers to between three and five. The dynamic antenna coexistence control system in an embodiment may later determine an optimal configuration for all data streams, based on receipt of the instruction to increase the number of carriers, generated as a solution to a drop in throughput detected across a single data stream. The method may then proceed back to block 1018 of FIG. 10A, to assess other wireless streams, if necessary.

At block 1056, if other carriers are not available for the cellular stream affected (e.g. as established at block 1052 of FIG. 10A), the dynamic antenna coexistence control system in an embodiment may generate an instruction to alter the number of streams dedicated to cellular vs. Wi-Fi. As described above, if the drop in throughput is not easily attributed to only one performance factor, the dynamic antenna coexistence control system may determine the most optimal solution is to dedicate fewer resources to the Wi-Fi data streams, and more resources to the cellular data streams, or vice versa, as described in greater detail with respect to block 1038. The method may then proceed back to block 1018 of FIG. 10A to assess other data streams if necessary.

Figure 11A:
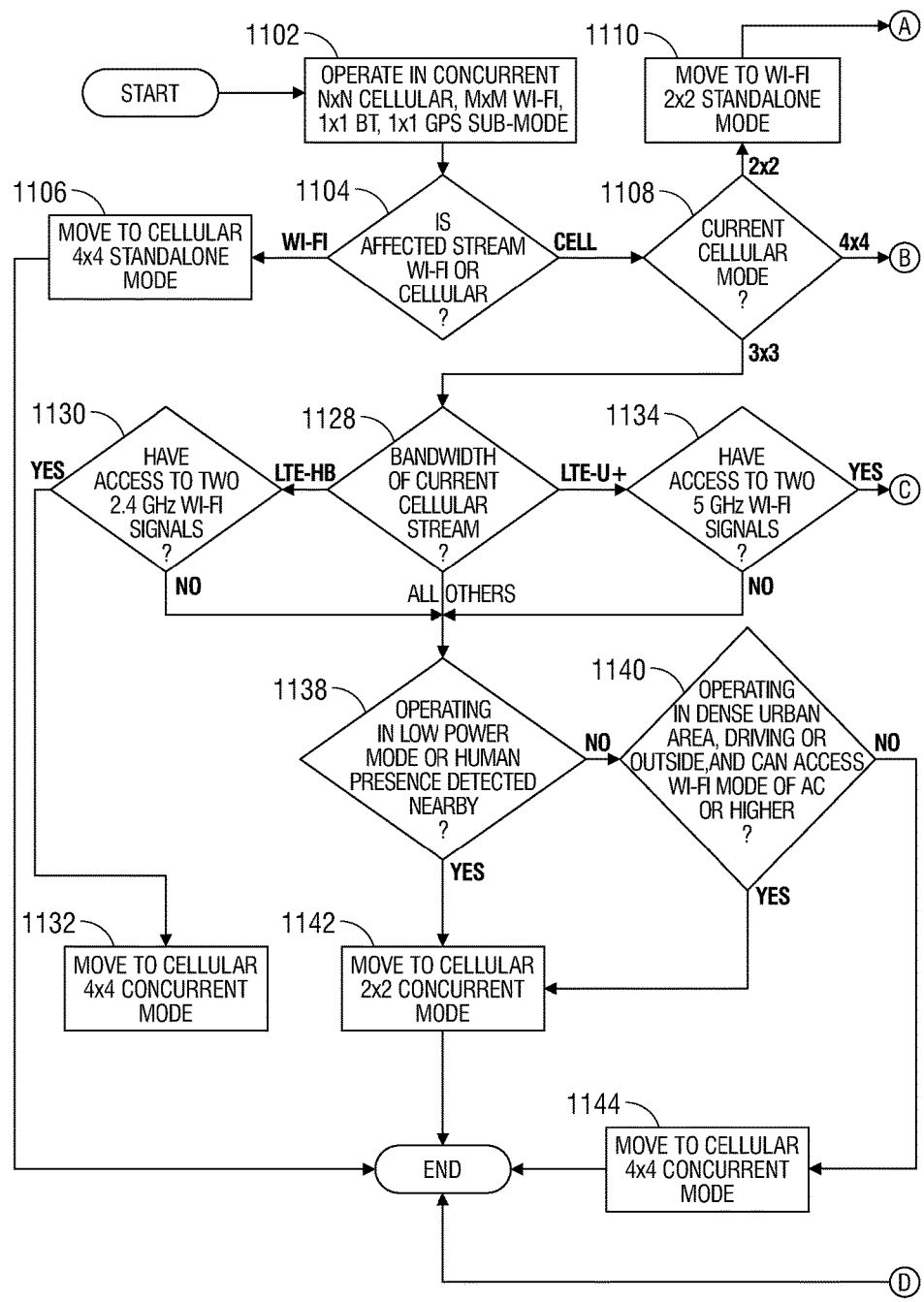
FIG. 11A is a flow diagram illustrating a first portion of a method of optimizing data stream configurations for an adaptive massive MIMO multiplexer according to an embodiment of the present disclosure.
Figure 11B:
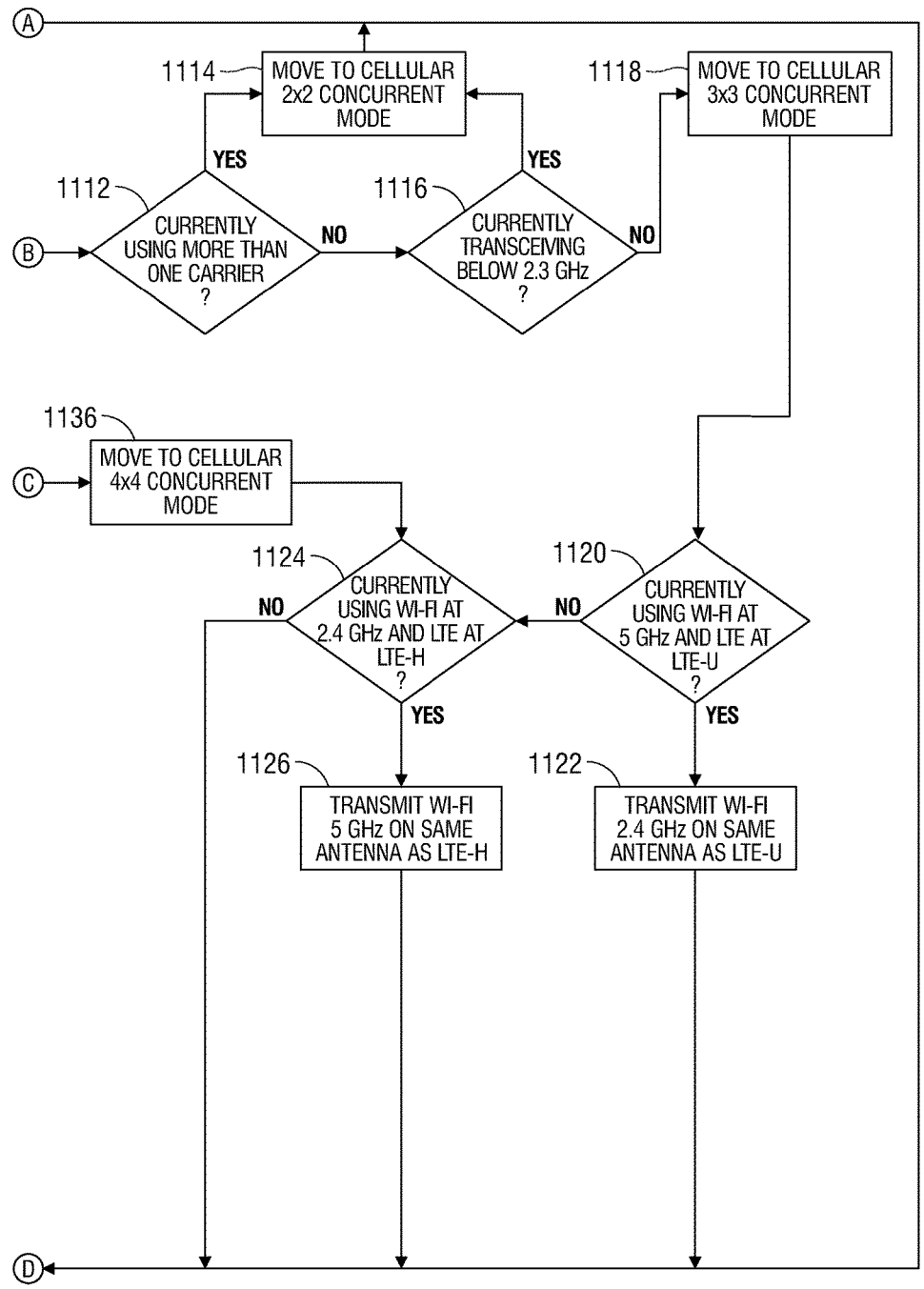
FIG. 11B is a flow diagram illustrating a second portion of a method of optimizing data stream configurations for an adaptive massive MIMO multiplexer according to an embodiment of the present disclosure.

FIG. 11A is a flow diagram illustrating a first portion of a method for optimizing data stream configuration for an adaptive massive MIMO multiplexer. In one example embodiment, an adaptive massive MIMO multiplexer may have between seven and ten inputs and four outputs according to an embodiment of the present disclosure. The adaptive massive MIMO multiplexer in an embodiment may adaptively alter the configuration of the data streams being transceived by a plurality of antennas in order to maximize throughput in varying environmental and operating conditions. As described above, a need to optimize the data stream configuration may arise, for example, in three situations: (1) where triggers indicate a high risk of decrease in throughput values measured across all data streams; (2) a decrease in throughput values measured across all data streams, below a pre-stored general throughput value threshold is actually detected; or (3) where throughput values remain steady, but throughput demands increase to an application-specific threshold value the current data stream configuration cannot meet. As also described above, when more than one performance factor in a data stream, more than one data stream (e.g. two separate cellular data streams), or more than one type of data stream (e.g. Wi-Fi and cellular data streams) is identified as a potential source of the throughput not meeting expectations, the optimal solution may involve reconfiguring the types of data streams transceived, as described with respect to FIGS. 10A and 10B at blocks 1038, 1044, and 1056. This reconfiguration may involve changing the number of antennas transmitting Wi-Fi versus cellular data streams while remaining in a concurrent mode, or shifting to one of several standalone modes in which the antennas do not simultaneously transmit Wi-Fi and cellular data streams. FIGS. 11A and 11B describes one method by which the dynamic antenna coexistence control system in an embodiment may determine an optimal configuration of the number of transceiving Wi-Fi data streams and cellular data streams.

At block 1102 in an embodiment, the adaptive massive MIMO multiplexer may be operating according to a concurrent N×N cellular, 2×2 Wi-Fi, 1×1 GPS, and 1×1 Bluetooth sub-mode, in which N equals any value between two and four. For example, if N=4, and M=2, the adaptive massive MIMO multiplexer may operate in the concurrent cellular 4×4, Wi-Fi 2×2, GPS 1×1, and Bluetooth 1×1 sub-mode. As another example, if N=3, and M=2, the adaptive massive MIMO multiplexer may operate in the concurrent cellular 3×3, Wi-Fi 2×2, GPS 1×1, and Bluetooth 1×1 sub-mode. As yet another example, if N=2, and M=2, the adaptive massive MIMO multiplexer may operate in the concurrent cellular 2×2, Wi-Fi 2×2, GPS 1×1, and Bluetooth 1×1 sub-mode. A determination is made of the present operating status of the adaptive massive MIMO multiplexer.

At block 1104 in an embodiment, the dynamic antenna coexistence control system in an embodiment may determine whether the affected data stream (in which the decrease in throughput was detected) is a cellular stream or a Wi-Fi stream. The potential solutions to a detected decrease in throughput in a single type of data stream may vary depending on the type of data stream affected in an embodiment (e.g. Wi-Fi or cellular). As described above with respect to FIG. 9, the dynamic antenna coexistence control system in an embodiment may determine at block 922 which of the data streams has been affected by a drop in throughput. If the type of data streams affected is Wi-Fi, this may indicate the Wi-Fi data streams are underperforming in comparison to the cellular data streams, and the method may proceed to block 1106. If the type of data stream affected is cellular, this may indicate the cellular data streams are underperforming in comparison to the Wi-Fi data streams, and the method may proceed to block 1108.

At block 1106, if the dynamic antenna coexistence control system in an embodiment determines the affected data stream is a Wi-Fi data stream, the dynamic antenna coexistence control system may instruct the adaptive massive MIMO multiplexer to shift to a cellular 4×4 standalone mode. In determining the affected stream or streams are Wi-Fi streams, and that only one type of stream is affected, the dynamic antenna coexistence control system effectively determines the Wi-Fi data streams are currently providing lower throughput than the cellular data streams in such an embodiment. Thus, the dynamic antenna coexistence control system in an embodiment may shift more antenna resources toward transceiving cellular data streams rather than the underperforming Wi-Fi data streams.

The adaptive massive MIMO multiplexer in an embodiment may move to the cellular 4×4 standalone mode. For example, if the adaptive massive MIMO multiplexer were operating in a concurrent 2×2 cellular, 2×2 Wi-Fi, 1×1 Bluetooth, 1×1 GPS sub-mode, and the dynamic antenna coexistence control system detected a decrease in throughput only across one or more of the two Wi-Fi data streams, the dynamic antenna coexistence control system in an embodiment may shift the adaptive massive MIMO multiplexer at block 1106 to the standalone cellular 4×4 mode, thus transceiving four different cellular signals from four different antennas rather than two cellular signals from two antennas.

At block 1108, in an embodiment, if the dynamic antenna coexistence control system determines the affected data stream is a cellular data stream, the dynamic antenna coexistence control system may determine which sub-mode the adaptive massive MIMO multiplexer is currently operating in. The dynamic antenna coexistence control system may determine at block 1108 how many cellular data streams are currently being transceived (e.g. the value of N for a N×N cellular sub-mode). The potential solutions to a detected decrease in throughput in a cellular data stream may vary depending on the number of cellular data streams currently transceiving. If the adaptive massive MIMO multiplexer in an embodiment is currently transceiving 2×2 cellular data streams, the method may proceed to block 1110. If the adaptive massive MIMO multiplexer in an embodiment is currently transceiving 3×3 cellular data streams, the method may proceed to block 1128. If the adaptive massive MIMO multiplexer in an embodiment is currently transceiving 4×4 cellular data streams, the method may proceed to block 1112 of FIG. 11B.

At block 1110, if the adaptive massive MIMO multiplexer in an embodiment is currently transceiving 2×2 cellular data streams in a concurrent mode, the dynamic antenna coexistence control system may direct the adaptive massive MIMO multiplexer to shift to a Wi-Fi 2×2 standalone mode. In determining the affected stream or streams are cellular streams, and that only one type of stream is affected, the dynamic antenna coexistence control system in an embodiment effectively determines the cellular data streams are currently providing lower throughput than the Wi-Fi data streams. Thus, the dynamic antenna coexistence control system in an embodiment may shift more antenna resources toward transceiving Wi-Fi data streams rather than the underperforming cellular data streams. By shifting the adaptive massive MIMO multiplexer to a standalone 2×2 Wi-Fi mode, the dynamic antenna coexistence control system in an embodiment may decrease the antenna resources dedicated to the underperforming cellular data streams and divert more resources to the Wi-Fi data streams. For example, the mobile information handling system power that had been dedicated to the underperforming cellular signal transmission may shift toward transmission of the higher performing Wi-Fi data streams, potentially strengthening those signals. The method may then come to an end.

Returning to block 1128, in an embodiment, if the adaptive massive MIMO multiplexer in an embodiment is currently transceiving 3×3 cellular data streams as determined at 1108, the dynamic antenna coexistence control system may determine the bandwidth in which the current cellular data streams are transceiving. The concurrent 3×3 cellular, 2×2 Wi-Fi, 1×1 GPS, 1×1 Bluetooth sub-mode in an embodiment may be associated with more restrictions than the other concurrent modes. For example, in an embodiment, the concurrent 3×3 cellular mode may only allow for one carrier on the cellular data streams, and/or may only support cellular data streams transceived at a frequency at or above 2.3 GHz. If it is determined the cellular data streams underwent a drop in throughput while in a concurrent 3×3 cellular, 2×2 Wi-Fi, 1×1 GPS, 1×1 Bluetooth sub-mode, throughput may be increased by rerouting resources from the cellular data streams to the Wi-Fi streams (e.g. decreasing the number of cellular data streams), or by increasing the number of cellular data streams and simultaneously increasing the number of carriers used.

The choice of which of these options is likely to provide the optimal or highest throughput may depend upon the bandwidth at which the current cellular data streams are being transceived. Concurrent modes in which the antennas transceive a plurality of Wi-Fi data streams and the highest possible number of cellular data streams simultaneously are generally preferable to concurrent modes using a lower number of cellular data streams, as reflected in the requirement of newly emerging communications standards requiring the ability to transceive four cellular data streams simultaneously, rather than the previous standard's two. Thus, moving from the concurrent 3×3 cellular sub-mode to the concurrent 4×4 sub-mode is generally preferable, if it does not present side effects likely to cause an unintentional decrease in throughput. For example, moving to the concurrent 4×4 sub-mode may not be sub-optimal if doing so caused an inability to transceive on one of two available Wi-Fi data streams or frequencies. Because cellular data streams transceiving at certain bandwidths cannot be combined with Wi-Fi data streams transceiving at certain frequencies due to antenna co-location issues, moving to the concurrent 4×4 cellular sub-mode may only be a viable option if doing so does not involve the need to transmit these conflicting data streams on the same antenna. If the current cellular data streams are being transceived at the high bandwidth LTE-HB as determined at 1128 in an embodiment, the method may proceed to 1130. If the current cellular data streams are being transceived in the unlicensed bandwidth LTE-U as determined at 1128 in another embodiment, the method may proceed to block 1134. If the current cellular data streams are being transceived in any bandwidths other than LTE-HB or LTE-U, the method may proceed to block 1138.

At block 1130, if the current cellular data streams are being transceived at the high bandwidth LTE-HB in an embodiment, the dynamic antenna coexistence control system may determine whether Wi-Fi access points within range can support more than one 2.4 GHz Wi-Fi signals. If both of the two Wi-Fi data streams may be transceived effectively on the 2.4 GHz frequency, both of the Wi-Fi data streams may be transceived from the same antennas as the cellular data streams in the LTE-HB bandwidth. In other words, shifting to the concurrent 4×4 cellular sub-mode would not present any antenna co-location interference issues. However, if Wi-Fi access points within range of the mobile information handling system are only capable of transceiving one data stream on the 2.4 GHz frequency, and one data stream on the 5 GHz frequency, in order to shift to the concurrent 4×4 cellular sub-mode, the 5 GHz Wi-Fi data stream would have to be sacrificed, potentially causing a decrease in throughput (from the loss of the second Wi-Fi data stream), rather than an increase in throughput (from the addition of the fourth cellular data stream). If Wi-Fi access points within range of the mobile information handling system can support more than one 2.4 GHz Wi-Fi signal, the method may proceed to block 1132. If Wi-Fi access points within range of the mobile information handling system cannot support more than one 2.4 GHz Wi-Fi signal, the method may proceed to block 1138.

At block 1132, if the data stream causing total throughput to decrease is a cellular data stream, the adaptive massive MIMO multiplexer is currently operating in a concurrent 3×3 cellular, 2×2 Wi-Fi, 1×1 GPS, 1×1 Bluetooth sub-mode, the bandwidth in which the cellular data streams are being transceived are in the high band LTE-H, and Wi-Fi access points within range of the mobile information handling system are capable of supporting two or more 2.4 GHz Wi-Fi signals, the dynamic antenna coexistence control system in an embodiment may direct the adaptive massive MIMO multiplexer to shift to the concurrent 4×4 cellular, 2×2 Wi-Fi, 1×1 GPS, 1×1 Bluetooth sub-mode. As described above, moving from the concurrent 3×3 cellular sub-mode to the concurrent 4×4 sub-mode is generally preferable to moving to the concurrent 2×2 cellular sub-mode, if it does not present side effects likely to cause an unintentional decrease in throughput. As also described above, if it is possible to transceive two Wi-Fi data streams at the 2.4 GHz frequency while simultaneously transceiving cellular signals in the high bandwidth LTE-H, no side effects likely to cause an unintentional decrease in throughput would be presented. Upon moving to the concurrent 4×4 cellular, 2×2 Wi-Fi, 1×1 GPS, 1×1 Bluetooth sub-mode, the method may stop.

At block 1134, if the current cellular data streams are being transceived in the unlicensed bandwidth LTE-U in an embodiment, the dynamic antenna coexistence control system may determine whether Wi-Fi access points within range can support more than one 5 GHz Wi-Fi signals. If both of the two Wi-Fi data streams may be transceived effectively on the 5 GHz frequency, both of the Wi-Fi data streams may be transceived from the same antennas as the cellular data streams in the LTE-U bandwidth. In other words, shifting to the concurrent 4×4 cellular sub-mode would not present any antenna co-location interference issues. However, if Wi-Fi access points within range of the mobile information handling system are only capable of transceiving one data stream on the 2.4 GHz frequency, and one data stream on the 5 GHz frequency, in order to shift to the concurrent 4×4 cellular sub-mode, the 2.4 GHz Wi-Fi data stream would have to be sacrificed, potentially causing a decrease in throughput (from the loss of the second Wi-Fi data stream), rather than an increase in throughput (from the addition of the fourth cellular data stream). If Wi-Fi access points within range of the mobile information handling system can support more than one 5 GHz Wi-Fi signal, the method may proceed to block 1136 of FIG. 11B. If Wi-Fi access points within range of the mobile information handling system cannot support more than one 5 GHz Wi-Fi signal, the method may proceed to block 1138.

At block 1138, if the current cellular data streams are being transceived in any bandwidths other than LTE-HB or LTE-U, the dynamic antenna coexistence control system in an embodiment may determine whether the mobile information handling system is currently operating in a low-power mode or whether a SAR sensor has detected presence of a human body part nearby antenna 3 or antenna 4. If the current cellular data streams are being transceived in bandwidths other than LTE-HB or LTE-U, potential interference between the Wi-Fi data streams and cellular data streams may not be a concern. However, it may still be preferable to shift from a concurrent 3×3 cellular sub-mode to a concurrent cellular 2×2 mode, rather than a concurrent cellular 4×4 mode if it is desirable to lower the transmission power of one or more antennas. This may be the case when the mobile information handling system is currently operating in a low power mode (e.g. conserving battery power remaining), or when an SAR sensor detects a human body part nearby antenna 3 or antenna 4. If the dynamic antenna coexistence control system in an embodiment determines the mobile information handling system is not currently operating in a low-power mode and a SAR sensor has not detected presence of a human body part nearby antenna 3 or antenna 4, the method may proceed to block 1140. If the dynamic antenna coexistence control system in an embodiment determines the mobile information handling system is currently operating in a low-power mode or a SAR sensor has detected presence of a human body part nearby antenna 3 or antenna 4, the method may proceed to block 1144.

At block 1140, if the dynamic antenna coexistence control system in an embodiment determines the mobile information handling system is not currently operating in a low-power mode and a SAR sensor has not detected presence of a human body part nearby antenna 3 or antenna 4, the dynamic antenna coexistence control system may determine whether the mobile information handling system is operating in an urban area, an area with a dense population of Wi-Fi access points, while travelling (e.g. driving or flying), or outside and a Wi-Fi access point supporting Wi-Fi ac mode or higher is within range. Wi-Fi access points operating according to the ac mode or higher operate best in environments in which one or more of these circumstances are present. Thus, if one or more of these circumstances are present and a Wi-Fi access point operating according to the ac mode or higher is within range, diverting more resources to the Wi-Fi data streams may yield significantly higher total throughput than diverting resources to a higher number of cellular data streams. If the dynamic antenna coexistence control system in an embodiment determines the mobile information handling system is operating in an urban area, an area with a dense population of Wi-Fi access points, while travelling (e.g. driving or flying), or outside, and a Wi-Fi access point supporting Wi-Fi ac mode or higher is within range, the method may proceed to block 1142. If the dynamic antenna coexistence control system in an embodiment determines the mobile information handling system is not operating in an urban area, an area with a dense population of Wi-Fi access points, while travelling (e.g. driving or flying), or outside, or that a Wi-Fi access point supporting Wi-Fi ac mode or higher is not within range, the method may proceed to block 1144.

At block 1142, if the dynamic antenna coexistence control system in an embodiment determines the mobile information handling system is operating in an urban area, an area with a dense population of Wi-Fi access points, while travelling (e.g. driving or flying), or outside, and a Wi-Fi access point supporting Wi-Fi ac mode or higher is within range, the dynamic antenna coexistence control system may direct the adaptive massive MIMO multiplexer to shift to a concurrent 2×2 cellular, 2×2 Wi-Fi, 1×1 GPS, 1×1 Bluetooth sub-mode. As described above, Wi-Fi access points operating according to the ac mode or higher operate best in environments in which one or more of these circumstances are present. Thus, if one or more of these circumstances are present and a Wi-Fi access point operating according to the ac mode or higher is within range, diverting more resources to the Wi-Fi data streams by shifting to the concurrent 2×2 cellular, 2×2 Wi-Fi, 1×1 GPS, 1×1 Bluetooth sub-mode may yield significantly higher total throughput than diverting resources to a higher number of cellular data streams by shifting to the concurrent 4×4 cellular, 2×2 Wi-Fi, 1×1 GPS, 1×1 Bluetooth sub-mode. The method may then end.

At block 1144, if the dynamic antenna coexistence control system in an embodiment determines the mobile information handling system is not operating in an urban area, an area with a dense population of Wi-Fi access points, while travelling (e.g. driving or flying), or outside, or that a Wi-Fi access point supporting Wi-Fi ac mode or higher is within range, the dynamic antenna coexistence control system may direct the adaptive massive MIMO multiplexer to shift to a concurrent 2×2 cellular, 2×2 Wi-Fi, 1×1 GPS, 1×1 Bluetooth sub-mode. Only Wi-Fi access points operating according to the ac mode or higher operates particularly well under these circumstances. Thus, if none of these circumstances apply, or if a Wi-Fi access point operating according to the ac mode or higher is not available, diverting more resources to the cellular data streams by shifting to the concurrent 4×4 cellular, 2×2 Wi-Fi, 1×1 GPS, 1×1 Bluetooth sub-mode may yield higher total throughput than diverting resources to Wi-Fi data streams by shifting to the concurrent 2×2 cellular, 2×2 Wi-Fi, 1×1 GPS, 1×1 Bluetooth sub-mode. The method may then end.

FIG. 11B is a flow diagram illustrating a second portion of a method for optimizing data stream configuration for an adaptive massive MIMO multiplexer. At block 1112, if the adaptive massive MIMO multiplexer in an embodiment is currently transceiving 4×4 cellular data streams in a concurrent mode (e.g. as established at block 1108 of FIG. 11A), the dynamic antenna coexistence control system may determine whether the concurrent cellular 4×4 data streams are currently using more than one carrier. As described above, if the cellular data streams are underperforming in comparison to the Wi-Fi data streams, the dynamic antenna coexistence control system in an embodiment may shift resources away from the cellular data streams and toward the Wi-Fi data streams. If the adaptive massive MIMO multiplexer in such an embodiment is currently transmitting in a concurrent 4×4 cellular, 2×2 Wi-Fi sub-mode when such a determination is made, the dynamic antenna coexistence control system may decrease the resources allocated to the underperforming cellular data streams by shifting to a concurrent 3×3 cellular, 2×2 Wi-Fi sub-mode, shifting to a concurrent 2×2 cellular, 2×2 Wi-Fi sub-mode, or shifting to a standalone 2×2 Wi-Fi sub-mode. The determination of which of these sub-modes is most optimal may vary based on the number of carriers are being used in the currently underperforming cellular data streams. By decreasing the number of carriers used, the dynamic antenna coexistence control system in an embodiment may further decrease the throughput on the cellular data streams. As such, the dynamic antenna coexistence control system may attempt to choose the sub-mode having at least as many carriers as are currently being used. If the dynamic antenna coexistence control system in an embodiment determines more than one carrier is in use, the method may proceed to block 1114. If the dynamic antenna coexistence control system in an embodiment determines only one carrier is in use, the method may proceed to block 1116.

At block 1114, if the dynamic antenna coexistence control system in an embodiment determines more than one carrier is in use, the dynamic antenna coexistence control system may shift the adaptive massive MIMO multiplexer to a concurrent 2×2 cellular, 2×2 Wi-Fi, 1×1 GPS, 1×1 Bluetooth sub-mode. The concurrent 3×3 cellular, 2×2 sub-mode may support one carrier, while the concurrent 2×2 cellular, 2×2 Wi-Fi sub-mode may supports up to five. Because the dynamic antenna coexistence control system in such an embodiment has already determined more than one carrier is currently in use, decreasing the number of carriers to one may further degrade the throughput on the affected cellular data streams, and the concurrent 3×3 cellular, 2×2 Wi-Fi, 1×1 GPS, 1×1 Bluetooth sub-mode would require decreasing the number of carriers, the dynamic antenna coexistence control system effectively may determine the concurrent 2×2 cellular, 2×2 Wi-Fi, 1×1 GPS, 1×1 Bluetooth sub-mode is more desirable than the concurrent 3×3 cellular, 2×2 Wi-Fi, 1×1 GPS, 1×1 Bluetooth sub-mode. Upon shifting the adaptive massive MIMO multiplexer to the concurrent 2×2 cellular, 2×2 Wi-Fi, 1×1 GPS, 1×1 Bluetooth sub-mode, the method may end.

Further, concurrent modes in which the antennas transceive a plurality of Wi-Fi data streams and cellular data streams simultaneously are generally preferable to stand-alone modes in which these streams are not simultaneously transceived, as reflected in the requirement of newly emerging communications standards requiring the ability to transceive six data streams simultaneously, rather than the previous standard's four. Thus, the dynamic antenna coexistence control system in an embodiment may shift the adaptive massive MIMO multiplexer data stream configuration from a concurrent mode to a standalone mode (e.g. from a concurrent N×N cellular, 2×2 Wi-Fi, 1×1 GPS, 1×1 Bluetooth to a 2×2 Wi-Fi standalone mode) only when the concurrent mode with the lowest number of data streams dedicated to the underperforming data stream type has shown low throughput values. In other words, the dynamic antenna coexistence control system in an embodiment may shift from a concurrent 4×4 cellular, 2×2 Wi-Fi, 1×1 GPS, 1×1 Bluetooth sub-mode to a standalone mode only after measuring low throughput values in the 3×3 cellular, 2×2 Wi-Fi, 1×1 GPS 1×1 Bluetooth sub-mode and the 2×2 cellular, 2×2 Wi-Fi, 1×1 GPS, 1×1 Bluetooth sub-mode.

At block 1116 in an embodiment, if the dynamic antenna coexistence control system determines only one carrier is currently being used, the dynamic antenna coexistence control system may determine whether one or more of the unaffected cellular data streams are currently transceiving at a frequency below 2.3 GHz. As described above, the concurrent 3×3 cellular, 2×2 Wi-Fi, 1×1 GPS, 1×1 Bluetooth sub-mode may support frequencies at or above 2.3 GHz. If the dynamic antenna coexistence control system in an embodiment determines one or more of the unaffected cellular data streams are currently transceiving at a frequency below 2.3 GHz, the method may proceed to block 1114, described above. If the dynamic antenna coexistence control system in an embodiment determines one or more of the unaffected cellular data streams are not currently transceiving at a frequency below 2.3 GHz, the method may proceed to block 1118.

At block 1118, if the dynamic antenna coexistence control system in an embodiment determines one or more of the unaffected cellular data streams are not currently transceiving at a frequency below 2.3 GHz, the dynamic antenna coexistence control system may direct the adaptive massive MIMO multiplexer to shift to the concurrent 3×3 cellular, 2×2 Wi-Fi, 1×1 GPS, 1×1 Bluetooth sub-mode. Concurrent modes in which the antennas transceive a plurality of Wi-Fi data streams and the highest possible number of cellular data streams simultaneously are generally preferable to concurrent modes using a lower number of cellular data streams, as reflected in the requirement of newly emerging communications standards requiring the ability to transceive four cellular data streams simultaneously, rather than the previous standard's two. Thus, the dynamic antenna coexistence control system in an embodiment may decrease the number of cellular data streams being transceived by an increment of one at a time when a decrease is optimal. In other words, the dynamic antenna coexistence control system in an embodiment may shift from a concurrent 4×4 cellular, 2×2 Wi-Fi, 1×1 GPS, 1×1 Bluetooth sub-mode to a concurrent 3×3 cellular, 2×2 Wi-Fi, 1×1 GPS, 1×1 Bluetooth rather than a concurrent 2×2 cellular, 2×2 Wi-Fi, 1×1 GPS, 1×1 Bluetooth sub-mode, when possible, and when doing so does not present potentially negative consequences to total throughput. For example, the dynamic antenna co-existence control system in an embodiment may direct the adaptive massive MIMO multiplexer to shift from a concurrent 4×4 cellular, 2×2 Wi-Fi, 1×1 GPS, 1×1 Bluetooth sub-mode to a concurrent 3×3 cellular, 2×2 Wi-Fi, 1×1 GPS, 1×1 Bluetooth sub-mode rather than a 2×2 cellular 2×2 Wi-Fi, 1×1 GPS, 1×1 Bluetooth sub-mode when transmission frequencies at or above 2.3 GHz are available (as required for 3×3 cellular), and when only one carrier is currently in use (indicating switching to 3×3 cellular which only supports one carrier is not likely to decrease throughput).

At block 1120, in an embodiment, the dynamic antenna coexistence control system may determine whether the currently transceiving Wi-Fi data streams are operating at a 5 GHz frequency and the cellular signal is simultaneously transmitting in the unlicensed bandwidth LTE-U. The choice of which of the antennas upon which to transceive a 2.4 GHz data stream in an embodiment may depend upon whether the currently transceiving Wi-Fi data streams are operating at a 5 GHz frequency and the cellular signal is simultaneously transmitting in the unlicensed bandwidth LTE-U. If the currently transceiving Wi-Fi data streams are operating at a 5 GHz frequency and the cellular signal is simultaneously transmitting in the unlicensed bandwidth LTE-U in an embodiment, the method may proceed the block 1122. If the currently transceiving Wi-Fi data streams are not operating at a 5 GHz frequency or the cellular signal is not simultaneously transmitting in the unlicensed bandwidth LTE-U in an embodiment, the method may proceed the block 1124.

At block 1122, if the currently transceiving Wi-Fi data streams are operating at a 5 GHz frequency and the cellular signal is simultaneously transmitting in the unlicensed bandwidth LTE-U, the dynamic antenna coexistence control system in an embodiment may direct the adaptive massive MIMO multiplexer to transceive the 2.4 GHz Wi-Fi data stream on the same antenna that is transceiving the cellular stream on the LTE-U bandwidth. As described above, while operating in the cellular 4×4, Wi-Fi 2×2, Bluetooth 1×1, GPS 1×1 concurrent sub-mode, antennas 3 and 4 may transceive either the 2.4 GHz or 5 GHz Wi-Fi signals along with the LTE signals at most LTE bandwidths. However, when transceiving an unlicensed-band (LTE-U+) LTE signal in the cellular 3×3, Wi-Fi 2×2, Bluetooth 1×1, GPS 1×1 concurrent sub-mode, only antenna 3 may transceive the 2.4 GHz Wi-Fi signal, and antenna 3 may not transceive the 5 GHz Wi-Fi signal. Thus, if the dynamic antenna coexistence control system in an embodiment determines antenna 3 is transceiving a cellular data stream in the LTE-U bandwidth and both 2.4 GHz and 5 GHz Wi-Fi data streams also need to be transceived according to the concurrent 3×3 cellular, 2×2 Wi-Fi, 1×1 GPS, 1×1 Bluetooth sub-mode, the dynamic antenna coexistence control system may direct the adaptive massive MIMO multiplexer to transceive the 2.4 GHz Wi-Fi data stream on the same antenna (e.g. antenna 3) that is transceiving the cellular data stream in the LTE-U bandwidth. The method may then stop.

At block 1124, in an embodiment, the dynamic antenna coexistence control system may determine whether the currently transceiving Wi-Fi data streams are operating at a 2.4 GHz frequency and the cellular signal is simultaneously transmitting in the high bandwidth LTE-H. The choice of which of the antennas upon which to transceive a 5 GHz data stream in an embodiment may depend upon whether the currently transceiving Wi-Fi data streams are operating at a 2.4 GHz frequency and the cellular signal is simultaneously transmitting in the high bandwidth LTE-H. If the currently transceiving Wi-Fi data streams are operating at a 2.4 GHz frequency and the cellular signal is simultaneously transmitting in the high bandwidth LTE-H in an embodiment, the method may proceed the block 1126. If the currently transceiving Wi-Fi data streams are not operating at a 2.4 GHz frequency or the cellular signal is not simultaneously transmitting in the high bandwidth LTE-H in an embodiment, the method may proceed the block 1140.

At block 1126, if the currently transceiving Wi-Fi data streams are operating at a 2.4 GHz frequency and the cellular signal is simultaneously transmitting in the high bandwidth LTE-H in an embodiment, the dynamic antenna coexistence control system may direct the adaptive massive MIMO multiplexer to transceive the 5 GHz Wi-Fi data stream on the same antenna that is transceiving the cellular stream on the LTE-H bandwidth. As described above, when transceiving a high-band LTE signal in the cellular 3×3, Wi-Fi 2×2, Bluetooth 1×1, GPS 1×1 concurrent sub-mode, only antenna 3 may transceive the 5 GHz Wi-Fi signal, and antenna 3 may not transceive the 2.4 GHz Wi-Fi signal. Thus, if the dynamic antenna coexistence control system in an embodiment determines antenna 3 is transceiving a cellular data stream in the LTE-H bandwidth and both 2.4 GHz and 5 GHz Wi-Fi data streams also need to be transceived according to the concurrent 3×3 cellular, 2×2 Wi-Fi, 1×1 GPS, 1×1 Bluetooth sub-mode, the dynamic antenna coexistence control system may direct the adaptive massive MIMO multiplexer to transceive the 5 GHz Wi-Fi data stream on the same antenna (e.g. antenna 3) that is transceiving the cellular data stream in the LTE-H bandwidth. The method may then stop.

At block 1136, if the data stream causing total throughput to decrease is a cellular data stream, the adaptive massive MIMO multiplexer is currently operating in a concurrent 3×3 cellular, 2×2 Wi-Fi, 1×1 GPS, 1×1 Bluetooth sub-mode, the bandwidth in which the cellular data streams are being transceived are in the unlicensed band LTE-U, and Wi-Fi access points within range of the mobile information handling system are capable of supporting two or more 5 GHz Wi-Fi signals, the dynamic antenna coexistence control system in an embodiment may direct the adaptive massive MIMO multiplexer to shift to the concurrent 4×4 cellular, 2×2 Wi-Fi, 1×1 GPS, 1×1 Bluetooth sub-mode. As described above, moving from the concurrent 3×3 cellular sub-mode to the concurrent 4×4 sub-mode is generally preferable to moving to the concurrent 2×2 cellular sub-mode, if it does not present side effects likely to cause an unintentional decrease in throughput. As also described above, if it is possible to transceive two Wi-Fi data streams at the 5 GHz frequency while simultaneously transceiving cellular signals in the unlicensed bandwidth LTE-U (e.g. as established at block 1135 of FIG. 11A), no side effects likely to cause an unintentional decrease in throughput would be presented. Upon moving to the concurrent 4×4 cellular, 2×2 Wi-Fi, 1×1 GPS, 1×1 Bluetooth sub-mode, the method may stop.

The blocks of the flow diagrams of FIGS. 9-11B or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mobile information handling system executing code instructions of a dynamic antenna co-existence control system comprising:
    a plurality of communications modules, including a cellular communication module, and a wireless fidelity (Wi-Fi) communication module, wherein the plurality of communications modules, in combination, transceive signals according to a plurality of data streams;
    an adaptive massive multiple-input and multiple output (MIMO) multiplexer coupling the plurality of communications modules to at least four transceiving antennas, wherein the adaptive massive MIMO multiplexer directs each of the at least four transceiving antennas to transceive a selection of up to a 4×4 MIMO array of Long-Term Evolution (LTE) data streams and up to a 2×2 MIMO array of Wi-Fi data streams according to a preset data stream multiplexing configuration for either a standalone mode to toggle between an LTE data stream and a Wi-Fi data stream for at least one transceiving antenna or a concurrent mode to provide for concurrent transceiving of an LTE data stream and a Wi-Fi data stream on at least one tranceiving antenna;

a memory storing a data stream multiplexing configuration table associating each of the plurality of data streams with one or more of the at least four transceiving antennas in an optimal configuration based on either the standalone mode or the concurrent mode and trigger inputs; and a processor executing machine readable code instructions of the dynamic antenna coexistence control system to:
receive one or more trigger inputs describing an operational condition of the mobile information handling system, wherein trigger inputs include Wi-Fi radio conditions, LTE radio conditions, proximity detection, power levels, or application conditions for wireless communications demands;
identify the standalone mode or the concurrent mode and the optimal configuration of the plurality of data streams for enhancing throughput based on the one or more received trigger inputs;
instruct the adaptive massive MIMO multiplexer to operate according to the optimal configuration.

2. The mobile information handling system operating the system of claim 1, wherein the plurality of data streams includes at least six available data streams selected depending upon the trigger inputs received indicating the operating conditions of the information handling system.

3. The mobile information handling system operating the system of claim 2, wherein the plurality of data streams includes at least ten available data streams, and the plurality of communications modules further includes a Bluetooth communication module operable to transcieve Bluetooth data streams on one of the at least four transceiving antennas in some optimal configurations of either standalone or concurrent mode operation.

4. The mobile information handling system operating the system of claim 1, wherein the one or more trigger inputs comprises an indication the transmission power level of one of the four antennas has decreased.

5. The mobile information handling system operating the system of claim 1, wherein the one or more trigger inputs comprises an indication received from a standard absorption rate proximity sensor that a human body part has been detected nearby one or more of the four antennas.

6. The mobile information handling system operating the system of claim 1, wherein the one or more trigger inputs comprises an indication an application operating on the information handling system is currently streaming data indicating an increased wireless transceiving bandwidth demand.

7. The mobile information handling system operating the system of claim 1, wherein the plurality of data streams associated with one optimal data stream configuration in the concurrent mode includes four LTE data streams, and two Wi-Fi data streams and wherein each of the four transceiving antennas transceives one of the four LTE data streams and two of the four transceiving antennas each additionally transceives one of the two Wi-Fi data streams simultaneously.

8. A method of optimizing a data stream configuration of an adaptive massive multiple-input and multiple output (MIMO) multiplexer comprising:
receiving one or more trigger inputs describing an operational condition of an information handling system, wherein trigger inputs include wireless fidelity (Wi-Fi) radio conditions, Long-Term Evolution (LTE) radio conditions, proximity detection, power levels, or application conditions for wireless communications demands;
identifying, via processor executing code instructions, one of a plurality of configurations of a plurality of data streams for selection of up to 4×4 MIMO LTE available data streams and up to 2×2 MIMO Wi-Fi available data streams for an optimal configuration to enhance throughput based on the one or more trigger inputs, wherein the plurality of data streams are associated with at least a cellular communications module and a Wi-Fi communications module;
coupling, via the adaptive massive MIMO multiplexer, each of the plurality of data streams to one of at least four transceiving antennas according to the optimal data stream configuration in a standalone mode to toggle between an LTE data stream and a Wi-Fi data stream for at least one transceiving antenna or a concurrent mode to provide for concurrent transceiving of an LTE data stream and a Wi-Fi data stream on at least one transceiving antenna;
wherein the plurality of data streams includes at least six available data streams selected depending upon the trigger inputs received indicating the operating conditions of the information handling system.

9. The method of claim 8, wherein the plurality of data streams includes at least ten available data streams, and the plurality of plurality of data streams further includes a datastream associated with a Bluetooth communication module and selection of up to the ten available data streams depending upon the trigger inputs received indicating the operating conditions of the information handling system.

10. The method of claim 8, wherein the one or more trigger inputs comprises an indication the transmission power level of one of the four antennas has decreased.

11. The method of claim 8, wherein the one or more trigger inputs comprises an indication that an application operating on the information handling system is currently streaming data.

12. The method of claim 8, wherein the one or more trigger inputs comprises an indication the total throughput of all data streams, in combination, has decreased below a preset threshold value.

13. The method of claim 8, wherein the plurality of data streams associated with the optimal data stream configuration includes a first LTE data stream, a second LTE data stream, a third LTE data stream, and a fourth LTE data stream, a global positioning system (GPS) data stream, a first Wi-Fi data stream, and a second Wi-Fi data stream, and the plurality of transceiving antennas comprises a first antenna, second antenna, third antenna, and fourth antenna.

14. The method of claim 13, wherein the first antenna transceives the first LTE data stream, the second antenna transceives a second LTE data stream, the third antenna transceives a combination of the third LTE data stream and the first Wi-Fi data stream, and the fourth antenna transceives a combination of the fourth LTE data stream, the second Wi-Fi data stream, and the GPS data stream.

15. An information handling system executing code instructions of a dynamic antenna co-existence control system comprising:
a plurality of communications modules, including a Long-Term Evolution (LTE) communication module, a wireless fidelity (Wi-Fi) communication module, a global positioning system (GPS) communication location module, and a Bluetooth communication module, wherein the plurality of communications modules, in combination, transceive signals on four transceiving antennas and selecting available data streams up to 4×4 MIMO LTE available data streams, up to 2×2 MIMO Wi-Fi available data streams, and an available GPS data stream depending upon trigger inputs received indicating the operating conditions of the information handling system;

an adaptive massive multiple-input and multiple output (MIMO) multiplexer coupling the plurality of communications modules to the four transceiving antennas, wherein the adaptive massive MIMO multiplexer directs each of the four transceiving antennas to transceive one or more of the plurality of data streams according to a preset data stream multiplexing configuration for either a standalone mode to toggle between an LTE data stream, a Wi-Fi data stream, and a GPS datastream for at least one transceiving antenna or a concurrent mode to provide for concurrent transceiving of an LTE data stream, a Wi-Fi data stream, and a GPS datastream on at least one transceiving antenna; and a processor executing machine readable code instructions of the dynamic antenna coexistence control system to:
 receive one or more trigger inputs describing an operational condition of the information handling system, wherein trigger inputs include Wi-Fi radio conditions, LTE radio conditions, proximity detection, power levels, or application conditions for wireless communications demands;
 identify one or more of the plurality of configurations of the plurality of data streams as an optimal configuration in either the standalone mode or the concurrent mode based on the one or more trigger inputs; and
 instruct the adaptive massive MIMO multiplexer to operate according to the optimal configuration for higher throughput.

16. The information handling system operating the system of claim 15, wherein the one or more trigger inputs comprises an indication the information handling system is operating in a low-power mode.

17. The information handling system operating the system of claim 15, wherein the one or more trigger inputs comprises one or more of an indication the number of Wi-Fi access points operating within communications range of the information handling system exceeds a preset Wi-Fi density threshold value.

18. The information handling system operating the system of claim 15, wherein the one or more trigger inputs comprises an indication the information handling system is operating in one or more of the following conditions: moving at a high speed associated with vehicular travel; operating outside; and operating within communications range of a Wi-Fi access point operating according to the IEEE standard 802.11ac or a newer standard.

19. The information handling system of claim 15, wherein the plurality of data streams associated with the optimal data stream configuration includes a first LTE data stream, a second LTE data stream, a third LTE data stream, and a fourth LTE data stream, a GPS data stream, a Bluetooth data stream, a first Wi-Fi data stream, and a second Wi-Fi data stream, and the plurality of transceiving antennas comprises a first antenna, second antenna, third antenna, and fourth antenna.

20. The information handling system of claim 19, wherein the first antenna transceives the first LTE data stream, the second antenna transceives a second LTE data stream, the third antenna transceives a combination of the third LTE data stream and the first Wi-Fi data stream, and the fourth antenna transceives a combination of the fourth LTE data stream, the second Wi-Fi data stream, the Bluetooth data stream, and the GPS data stream.

* * * * *